(12) United States Patent
Hirano

(10) Patent No.: US 11,561,371 B2
(45) Date of Patent: Jan. 24, 2023

(54) IMAGING LENS

(71) Applicant: TOKYO VISIONARY OPTICS CO., LTD., Tokyo (JP)

(72) Inventor: Hitoshi Hirano, Tokyo (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 169 days.

(21) Appl. No.: 16/818,577

(22) Filed: Mar. 13, 2020

(65) Prior Publication Data

US 2020/0400922 A1 Dec. 24, 2020

(30) Foreign Application Priority Data

Jun. 20, 2019 (JP) .............................. JP2019-114667

(51) Int. Cl.
*G02B 13/00* (2006.01)
*G02B 9/64* (2006.01)
*G02B 27/00* (2006.01)
*H04N 5/225* (2006.01)

(52) U.S. Cl.
CPC ........... *G02B 13/0045* (2013.01); *G02B 9/64* (2013.01); *G02B 27/0025* (2013.01); *H04N 5/2254* (2013.01)

(58) Field of Classification Search
CPC .. G02B 9/64; G02B 13/0045; G02B 27/0025; H04N 5/2254
See application file for complete search history.

(56) References Cited

U.S. PATENT DOCUMENTS 10,353,183 B2 * 7/2019 Chang ................ G02B 13/0045

FOREIGN PATENT DOCUMENTS

JP 2006-154481 A 6/2006

* cited by examiner

*Primary Examiner* — Jack Dinh
(74) *Attorney, Agent, or Firm* — Hamre, Schumann, Mueller & Larson, P.C.

(57) ABSTRACT

An imaging lens includes, in order from an object side to an image side, a first lens L1 having negative refractive power, a second lens L2 having positive refractive power, a third lens L3 having positive refractive power, a fourth lens L4, a fifth lens L5, a sixth lens L6, a seventh lens L7, and an eighth lens L8 having negative refractive power, wherein said eighth lens L8 has an aspheric image-side surface having at least one inflection point.

9 Claims, 36 Drawing Sheets

IMAGING LENS

BACKGROUND OF THE INVENTION AND RELATED ART STATEMENT

The present invention relates to an imaging lens for forming an image of an object on an image sensor such as a CCD sensor and a CMOS sensor. Particularly, the present invention relates to an imaging lens suitable for mounting in a relatively small camera to be built in portable devices such as cellular phones and portable information terminals, digital still cameras, security cameras, onboard cameras and network cameras, and so on.

Multifunctional cellular phones, so-called smartphones, have been more widely used that allow use of various functions as well as a voice call function. One of the most frequently used functions among them is a camera function. To implement such a camera function, one or more cameras are mounted in a smartphone. In recent years, with the improvement in image processing capability and the development of the image processing technique, the number of cameras mounted in such a smartphone tends to increase. In the smartphone in which two or more cameras are mounted with different resolutions, a field of view, and the like, images taken through the imaging lenses of the respective cameras are synthesized by software to achieve higher resolution of images and a zoom function. Such a camera to be mounted in the smartphone is expected to grow in demand in the future as well.

To take a picture of an object with high definition or acquire more information on the object, the camera has to have a high-resolution imaging lens as well as an image sensor with high pixel count. As a method for achieving higher resolution of an imaging lens, there is a method of increasing the number of lenses that compose the imaging lens in accordance with the difficulty of correcting aberrations. However, an irresponsible increase in the number of lenses is prone to cause an increase in size of the imaging lens. In development of the imaging lens, an extension of the total track length should be prevented and the resolution has to be improved.

A lens configuration including eight lenses has, due to the large number of lenses of the imaging lens, high flexibility in design and thus allows proper correction of aberrations. As the imaging lens having the eight-lens configuration, for example, an imaging lens described in Patent Document 1 has been known.

Patent Document 1 discloses an imaging lens comprising a first lens with negative refractive power having a meniscus shape with a convex object-side surface, a second lens having a biconvex shape, a third lens having a biconcave shape, a fourth lens with positive refractive power having a meniscus shape with a convex object-side surface, a fifth lens having a biconvex shape, a sixth lens having a biconcave shape, a seventh lens with the negative refractive power having a meniscus shape with a convex image-side surface, and a eighth lens having a biconvex shape.

Patent Document 1: Japanese Patent Application Publication No. 2006-154481

According to the conventional imaging lens of Patent Document 1, although the field of view is as wide as 64° at a wide-angle end, aberrations can be relatively properly corrected. However, having a long total track length relative to the focal length of the overall optical system of the imaging lens, it is unsuitable for mounting in a small camera to be built in a thin device such as a smartphone. In the case of the conventional imaging lens described in Patent Document 1, it is difficult to achieve more proper aberration correction while achieving downsizing and a low profile.

Such a problem is not specific to the imaging lens to be mounted in smartphones. Rather, it is a common problem for imaging lenses to be mounted in such as the cellular phone, the portable information terminal, the digital still camera, the security camera, the onboard cameras, and the network camera.

An object of the present invention is to provide an imaging lens that can achieve both downsizing of the imaging lens and proper correction of aberrations while achieving a wide field of view.

SUMMARY OF THE INVENTION

An imaging lens according to the present invention forms an image of an object on an image sensor and comprises, in order from an object side to an image side, a first lens with negative refractive power, a second lens with positive refractive power, a third lens with positive refractive power, a fourth lens, a fifth lens, a sixth lens, a seventh lens and an eighth lens with negative refractive power. The eighth lens has an aspheric image-side surface having at least one inflection point.

In the imaging lens according to the present invention, the first lens arranged closest to the object side has negative refractive power and can secure a back focus while preferably achieving a wide field of view of the imaging lens. On the other hand, the second lens and the third lens arranged on an image side of the first lens have positive refractive power. While the second lens and the third lens tend to have stronger refractive power with the downsizing of the imaging lens, the positive refractive power is shared between the two lenses and thus an increase in deviation from the uniformity of the thickness between the center of the lens and a peripheral area of the lens, so-called a thickness deviation ratio is suppressed in the second lens and the third lens. It is thus possible to preferably prevent the increase in the thickness deviation ratio of the second lens and the third lens that often causes a problem in lowering the F-number of the imaging lens.

When an image-side surface of the eighth lens closest to the image side is formed as an aspheric surface having at least one inflection point, a back focus can be secured, and field curvature and distortion at an image periphery can be properly corrected. According to such a shape of the eighth lens, it is also possible to control an incident angle of a light ray emitted from the imaging lens to the image plane of the image sensor to be within the range of chief ray angle (CRA), and to properly correct the aberrations in the paraxial region and at the peripheral area.

Regarding terms used in the present invention, "lens" refers to an optical element that has refractive power. Therefore, the term "lens" used herein does not include the optical element such as a prism changing a traveling direction of a light, a flat filter, and the like. Those optical elements may be arranged in front of or behind the imaging lens, or between respective lenses, as necessary.

According to the imaging lens having the above-described configuration, it is preferable that an image-side surface of the first lens is formed as an aspheric surface having at least one inflection point.

Providing at least one inflection point on the image-side surface of the first lens, it is possible to properly correct aberration components of a central light flux at the periphery of the pupil that are prone to be generated with lowering of the F-number of the imaging lens. It is also possible to preferably reduce flares due to total reflection light generated by the lenses arranged on the image side relative to the first lens.

According to the imaging lens having the above-described configuration, it is preferable that an image-side surface of the second lens is formed as an aspheric surface having at least one inflection point.

Providing at least one inflection point on the image-side surface of the second lens, it is possible to properly correct aberration components of a central light flux at the periphery of the pupil that are prone to be generated with lowering of the F-number of the imaging lens. It is also possible to preferably reduce flares due to total reflection light generated by the lenses arranged on the image side relative to the second lens.

According to the imaging lens having the above-described configuration, it is preferable that the following conditional expression (1) is satisfied:

$$0.7 < R1f/R1r < 1.6 \qquad (1)$$

where

R1f: a curvature radius of an object-side surface of the first lens, and

R1r: a curvature radius of an image-side surface of the first lens.

When the conditional expression (1) is satisfied, downsizing the imaging lens and wide field of view can be achieved. In addition, a back focus can be secured.

According to the imaging lens having the above-described configuration, it is more preferable that the following conditional expression (1a) is satisfied.

$$1.0 < R1f/R1r < 1.6 \qquad (1a)$$

According to the imaging lens having the above-described configuration, it is preferable that the first lens is formed in a shape having a convex object-side surface. When the first lens is formed in such a shape, downsizing the imaging lens can be more preferably achieved.

According to the imaging lens having the above-described configuration, it is preferable that the following conditional expression (2) is satisfied:

$$-10.0 < f1/f2 < -0.8 \qquad (2)$$

where f1: a focal length of the first lens, and f2: a focal length of the second lens.

When the conditional expression (2) is satisfied, downsizing the imaging lens can be achieved and spherical aberration and chromatic aberration can be properly corrected.

According to the imaging lens having the above-described configuration, it is more preferable that the following conditional expression (2a) is satisfied.

$$-8.0 < f1/f2 < -0.8 \qquad (2a)$$

According to the imaging lens having the above-described configuration, it is further preferable that the following conditional expression (2b) is satisfied.

$$-6.0 < f1/f2 < -1.0 \qquad (2b)$$

According to the imaging lens having the above-described configuration, it is preferable that the following conditional expression (3) is satisfied:

$$0.05 < D12/f < 0.20 \qquad (3)$$

where f: a focal length of the overall optical system of the imaging lens, and

D12: a distance along the optical axis between the first lens and the second lens.

When the conditional expression (3) is satisfied, downsizing the imaging lens can be achieved and the chromatic aberration can be properly corrected.

According to the imaging lens having the above-described configuration, it is preferable that the following conditional expression (4) is satisfied:

$$1.0 < f2/f3 < 6.5 \qquad (4)$$

where f2: a focal length of the second lens, and f3: a focal length of the third lens.

When the conditional expression (4) is satisfied, downsizing the imaging lens can be achieved and coma aberration, field curvature and distortion can be properly corrected in well balance. In addition, the back focus can be preferably secured.

According to the imaging lens having the above-described configuration, it is more preferable that the following conditional expression (4a) is satisfied.

$$1.2 < f2/f3 < 5.5 \qquad (4a)$$

According to the imaging lens having the above-described configuration, it is further preferable that the following conditional expression (4b) is satisfied.

$$1.4 < f2/f3 < 4.5 \qquad (4b)$$

According to the imaging lens having the above-described configuration, it is preferable that the following conditional expression (5) is satisfied:

$$0.3 < f3/f < 3.5 \qquad (5)$$

where f: a focal length of the overall optical system of the imaging lens, and f3: a focal length of the third lens.

When the conditional expression (5) is satisfied, downsizing the imaging lens can be achieved and the spherical aberration can be properly corrected.

According to the imaging lens having the above-described configuration, it is more preferable that the following conditional expression (5a) is satisfied.

$$0.5 < f3/f < 2.5 \qquad (5a)$$

According to the imaging lens having the above-described configuration, it is preferable that the third lens is formed in a biconvex shape in the paraxial region, namely a shape that a curvature radius of the object-side surface thereof is positive and a curvature radius of the image-side surface thereof is negative.

According to the imaging lens having the above-described configuration, it is preferable that the following conditional expression (6) is satisfied:

$$0.2 < R4r/f < 1.0 \qquad (6)$$

where f: a focal length of the overall optical system of the imaging lens, and

R4r: a curvature radius of an image-side surface of the fourth lens.

When the conditional expression (6) is satisfied, it is possible to prevent an increase in sensitivity to deterioration in image-forming performance (sensitivity to a manufacturing error) to decentering (eccentricity), tilting, and the like occurred upon manufacturing of the imaging lens. In addition, it is also possible to properly correct the chromatic aberration and to preferably reduce flares due to total reflection light generated by the lenses arranged on the image side relative to the fourth lens.

According to the imaging lens having the above-described configuration, it is preferable that the fourth lens is formed in a meniscus shape having a convex object-side surface in the paraxial region, namely a shape that curvature radii of the object-side surface and the image-side surface thereof are positive.

According to the imaging lens having the above-described configuration, it is preferable that the following conditional expression (7) is satisfied:

$$0.08 < D45/f < 0.20 \quad (7)$$

where f: a focal length of the overall optical system of the imaging lens, and

D45: a distance along the optical axis between the fourth lens and the fifth lens.

When the conditional expression (7) is satisfied, an incident angle of a light ray emitted from the imaging lens to the image plane can be controlled to be within the range of chief ray angle (CRA), and the field curvature and the distortion can be properly corrected. Moreover, the back focus can be secured.

According to the imaging lens having the above-described configuration, it is preferable that the sixth lens has a convex image-side surface in the paraxial region.

According to the imaging lens having the above-described configuration, it is preferable that the following conditional expression (8) is satisfied:

$$0.5 < D56/D67 < 4.0 \quad (8)$$

where

D56: a distance along the optical axis between the fifth lens and the sixth lens, and D67: a distance along the optical axis between the sixth lens and the seventh lens.

When the conditional expression (8) is satisfied, downsizing the imaging lens can be achieved and an incident angle of a light ray emitted from the imaging lens to the image plane can be preferably controlled to be within the range of chief ray angle (CRA).

According to the imaging lens having the above-described configuration, it is preferable that the following conditional expression (9) is satisfied:

$$0.4 < T7/T8 < 3.5 \quad (9)$$

where

T7: a thickness along the optical axis of the seventh lens, and

T8: a thickness along the optical axis of the eighth lens.

When the profile of the imaging lens is reduced, a lens arranged in a position closer to the image plane tends to have a greater effective diameter. When the conditional expression (9) is satisfied, thicknesses along the optical axis of the seventh lens and the eighth lens that are likely to have relatively large effective diameters are properly maintained. It is thus possible to properly correct aberrations while reducing the profile of the imaging lens. It is also possible to secure a back focus. When the seventh lens and the eighth lens are formed from a plastic material, it is possible to reduce the manufacturing cost of the lenses and also to secure the formability of the lenses by satisfying the conditional expression (9).

According to the imaging lens having the above-described configuration, it is preferable that the following conditional expression (10) is satisfied:

$$0.04 < D78/f < 0.16 \quad (10)$$

where f: a focal length of the overall optical system of the imaging lens, and

D78: a distance along the optical axis between the seventh lens and the eighth lens.

When the conditional expression (10) is satisfied, the back focus can be secured and the field curvature, astigmatism and the distortion can be properly corrected in well balance.

According to the imaging lens having the above-described configuration, it is preferable that the following conditional expression (11) is satisfied:

$$-3.0 < f8/f < -0.3 \quad (11)$$

where f: a focal length of the overall optical system of the imaging lens, and f8: a focal length of the eighth lens.

When the conditional expression (11) is satisfied, the back focus can be secured and the field curvature and the distortion can be properly corrected. Furthermore, the incident angle of a light ray emitted from the imaging lens to the image plane can be preferably controlled to be within the range of chief ray angle (CRA).

According to the imaging lens having the above-described configuration, it is preferable that the following conditional expression (12) is satisfied:

$$0.2 < R8f/f < 1.8 \quad (12)$$

where f: a focal length of the overall optical system of the imaging lens, and

R8f: a curvature radius of an object-side surface of the eighth lens.

When the conditional expression (12) is satisfied, downsizing the imaging lens can be achieved and the astigmatism, the coma aberration and the distortion can be properly corrected in well balance. Furthermore, the back focus can be secured.

According to the imaging lens having the above-described configuration, it is preferable that the eighth lens is formed in a meniscus shape having a concave image-side surface. When the eighth lens is formed in such a shape, the low profile of the imaging lens can be preferably achieved.

According to the imaging lens having the above-described configuration, it is preferable that the following conditional expression (13) is satisfied:

$$0.1 < R8r/f < 0.5 \quad (13)$$

where f: a focal length of the overall optical system of the imaging lens, and

R8r: a curvature radius of an image-side surface of the eighth lens.

The image-side surface of the eighth lens is located closest to the image plane in the imaging lens. The magnitude of the refractive power of this surface causes difference in the difficulty of correcting the astigmatism, the coma aberration, and the distortion. When the conditional expression (13) is satisfied, downsizing the imaging lens can be achieved and the astigmatism, the coma aberration and the distortion can be properly corrected. In addition, satisfying the conditional expression (13) is also effective from the standpoint of securing the back focus.

According to the imaging lens having the above-described configuration, it is preferable for properly correcting the chromatic aberration that the following conditional expressions (14) to (16) are satisfied:

$$10 < vd1 < 35 \quad (14)$$

$$35 < vd2 < 85 \quad (15)$$

$$35 < vd3 < 85 \quad (16)$$

where vd1: an abbe number at d-ray of the first lens,
vd2: an abbe number at d-ray of the second lens, and
vd3: an abbe number at d-ray of the third lens.

According to the imaging lens having the above-described configuration, it is preferable that the following conditional expression (17) is satisfied:

$$1.0 < TL/f < 1.5 \quad (17)$$

where f: a focal length of the overall optical system of the imaging lens, and
TL: a distance along the optical axis from an object-side surface of the first lens to an image plane.

When the conditional expression (17) is satisfied, downsizing the imaging lens can be preferably achieved.

Generally, an IR cut filter, a cover glass or the like are arranged between the imaging lens and the image plane, however a distance thereof along the optical axis is converted into an air-converted distance in the present specification.

In the case of an imaging lens to be built in a thin portable device, such as the smartphone, an imaging lens has to be contained in a limited space. Therefore, there is often a strict limitation in a length of the imaging lens in the direction of the optical axis relative to the size of the image sensor. That is, reduction in profile of the imaging lens is strongly expected. Therefore, according to the imaging lens of the present invention, it is preferable that the following conditional expression (18) is satisfied:

$$1.2 < TL/H\max < 2.2 \quad (18)$$

where

TL: a distance along the optical axis from an object-side surface of the first lens to an image plane, and
Hmax: a maximum image height.

According to the imaging lens having the above-described configuration, it is preferable that the following conditional expression (19) is satisfied:

$$-25.0 < f4/f5 < -5.0 \quad (19)$$

where f4: a focal length of the fourth lens, and
f5: a focal length of the fifth lens.

When the conditional expression (19) is satisfied, the second lens, the third lens and the fourth lens have positive refractive power and positive refractive powers of respective lenses become relatively weak and the chromatic aberration can be properly corrected.

According to the imaging lens having the above-described configuration, it is more preferable that the following conditional expression (19a) is satisfied.

$$-22.0 < f4/f5 < -7.0 \quad (19a)$$

According to the imaging lens having the above-described configuration, when the fourth lens has the positive refractive power, it is preferable that the fifth lens has an object-side surface being concave in the paraxial region.

According to the imaging lens having the above-described configuration, when the fourth lens has the positive refractive power, it is preferable that the following conditional expression (20) is satisfied:

$$-4.0 < f5/f < -0.2 \quad (20)$$

where f: a focal length of the overall optical system of the imaging lens, and
f5: a focal length of the fifth lens.

When the conditional expression (20) is satisfied, downsizing the imaging lens can be achieved and the chromatic aberration can be properly corrected.

According to the imaging lens having the above-described configuration, it is more preferable that the following conditional expression (20a) is satisfied.

$$-3.0 < f5/f < -0.2 \quad (20a)$$

According to the imaging lens having the above-described configuration, it is further preferable that the following conditional expression (20b) is satisfied.

$$-2.0 < f5/f < -0.3 \quad (20b)$$

According to the imaging lens having the above-described configuration, when the sixth lens has the positive refractive power, it is preferable that the following conditional expression (21) is satisfied:

$$0.3 < f6/f < 3.0 \quad (21)$$

where f: a focal length of the overall optical system of the imaging lens, and
f6: a focal length of the sixth lens.

When the conditional expression (21) is satisfied, the field curvature, the distortion and the chromatic aberration can be properly corrected in well balance.

According to the imaging lens having the above-described configuration, it is more preferable that the following conditional expression (21a) is satisfied.

$$0.5 < f6/f < 2.0 \quad (21a)$$

According to the imaging lens having the above-described configuration, when the fifth lens is formed in a meniscus shape having an object-side surface being convex in the paraxial region and the sixth lens has the positive refractive power, it is preferable that the following conditional expression (22) is satisfied:

$$0.5 < f56/f < 4.0 \quad (22)$$

where f: a focal length of the overall optical system of the imaging lens, and
f56: a composite focal length of the fifth lens and the sixth lens.

When the conditional expression (22) is satisfied, downsizing the imaging lens can be achieved and the coma aberration and the astigmatism can be properly corrected.

According to the imaging lens having the above-described configuration, when both the sixth lens and the seventh lens have the negative refractive power, it is preferable that the following conditional expression (23) is satisfied:

$$-14.0 < f67/f < -2.0 \quad (23)$$

where f: a focal length of the overall optical system of the imaging lens, and
f67: a composite focal length of the sixth lens and the seventh lens.

When the conditional expression (23) is satisfied, the back focus can be secured and the field curvature and the distortion can be properly corrected. Furthermore, the incident angle of a light ray emitted from the imaging lens to the image plane can be preferably controlled to be within the range of chief ray angle (CRA).

According to the imaging lens having the above-described configuration, when the seventh lens have the negative refractive power, it is preferable that the seventh lens has an object-side surface being concave in the paraxial region.

According to the imaging lens of the present invention, it is preferable that each lens of the first to the eighth lenses is arranged with an air gap. When each lens is arranged with an air gap, the imaging lens according to the present invention has a lens configuration without any cemented lenses. According to such lens configuration, all of eight lenses composing the imaging lens can be formed from a plastic material and it is possible to preferably reduce the manufacturing cost of the imaging lens.

According to the imaging lens of the present invention, it is preferable that both surfaces of each lens of the first to the eighth lenses are formed as aspheric surfaces. When the both surfaces of each lens are formed as aspheric surfaces, aberrations from the paraxial region to a peripheral area of the lens can be properly corrected. Particularly, the aberrations at the peripheral area of the lens can be properly corrected.

According to the imaging lens having the above-described configuration, it is preferable that at least two surfaces of the seventh lens and the eighth lens are formed as the aspheric surfaces having at least one inflection point. In addition to the image-side surface of the eighth lens, when one more aspheric surface having at least one inflection point is provided, it is also possible to control an incident angle of a light ray emitted from the imaging lens to the image plane to be within the range of chief ray angle (CRA), and to properly correct the aberrations at image periphery.

According to the imaging lens of the present invention, when a field of view is shown as 2ω, it is preferable that a conditional expression, $60° \leq 2ω$ is satisfied. When the conditional expression is satisfied, a wide field of view of the imaging lens can be achieved and downsizing the imaging lens and the wide field of view can be preferably co-achieved.

In an image sensor with high pixel count, a light-receiving area of each pixel decreases and thus the image to be taken tends to be dark. As a method for correcting the darkness, there is a method of improving light-receiving sensitivity of the image sensor using an electrical circuit. However, with an increase in the light-receiving sensitivity, noise components not directly contributing to formation of an image are also amplified. Therefore, in order to obtain a sufficiently bright image without providing the electrical circuit, according to the imaging lens having the above-described configuration, it is preferable that the following conditional expression (24) is satisfied:

$$f/Dep < 2.4 \qquad (24)$$

where f: a focal length of the overall optical system of the imaging lens, and

Dep: an entrance pupil diameter of the imaging lens.

According to the present invention, as described above, the shapes of the lenses are specified using signs of the curvature radii. Whether the curvature radius of the lens is positive or negative is determined based on general definition.

More specifically, taking a traveling direction of the light as positive, if a center of a curvature radius is on the image side when viewed from a lens surface, the curvature radius is positive. If a center of a curvature radius is on the object side, the curvature radius is negative. Therefore, "an object-side surface having a positive curvature radius" means that the object-side surface is a convex surface. "An object-side surface having a negative curvature radius" means that the object side surface is a concave surface. In addition, "an image-side surface having a positive curvature radius" means that the image-side surface is a concave surface. "An image-side surface having a negative curvature radius" means that the image-side surface is a convex surface. Here, a curvature radius used herein refers to a paraxial curvature radius, and may not be consistent with general shapes of the lenses in their sectional views.

According to the imaging lens of the present invention, it is achievable to provide a compact imaging lens having a wide field of view, which is especially suitable for mounting in a small-sized camera, while having high resolution with proper correction of aberrations.

DETAILED DESCRIPTION OF EMBODIMENTS

Hereunder, referring to the accompanying drawings, an embodiment of the present invention will be fully described. FIGS. 1, 4, 7, 10, 13, 16, 19, 22, 25, 28, 31 and 34 are schematic sectional views of the imaging lenses in Examples 1 to 12 according to the embodiment, respectively. Since the imaging lenses in those Examples have the same basic configuration, the lens configuration of the embodiment will be described with reference to the illustrative sectional view of Example 1.

Figure 1:
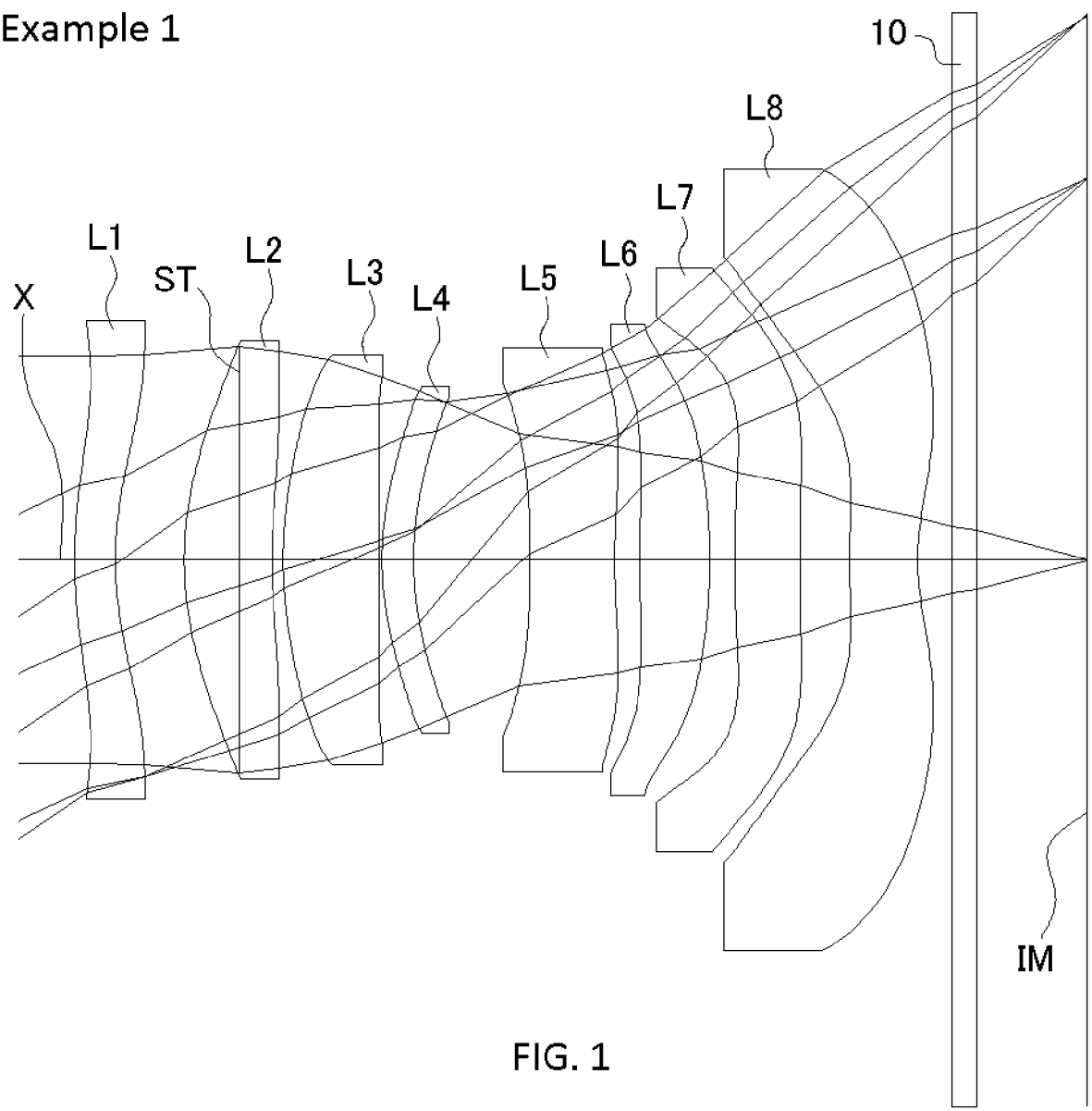
FIG. 1 is a sectional view of a schematic configuration of an imaging lens in Example 1 of the present invention.

As shown in FIG. 1, the imaging lens according to the present embodiment comprises, in order from an object side to an image side, a first lens L1 with negative refractive power, a second lens L2 with positive refractive power, a third lens L3 with positive refractive power, a fourth lens L4, a fifth lens L5, a sixth lens L6, a seventh lens L7 and an eighth lens L8 with negative refractive power. Each lens of the first lens L1 to the eighth lens L8 is arranged with an air gap. A filter 10 is arranged between the eighth lens L8 and an image plane IM of an image sensor. The filter 10 is omissible.

The first lens L1 has a shape that a curvature radius r1 of an object-side surface (=R1f) and a curvature radius r2 of an image-side surface (=R1r) of the first lens are both positive. The first lens L1 is formed in a meniscus shape having the object-side surface being convex in the paraxial region. The shape of the first lens L1 is not limited to the one in the Example 1. The shape of the first lens L1 can be formed in any shape, as long as refractive power of the first lens L1 is negative. Other than the shape of the Example 1, the first lens L1 may be formed in a shape which both the curvature radii r1 and r2 are negative or a shape which the curvature radius r1 is negative and the curvature radius r2 is positive. The lens having the former shape is a meniscus lens having the object-side surface being concave in the paraxial region, and the lens having the latter shape is a biconcave lens in the paraxial region. It is preferable that the curvature radius r1 of the first lens L1 is positive from the standpoint of downsizing the imaging lens.

In the Example 1, an aperture stop ST is disposed between the first lens L1 and the second lens L2. A location of the aperture stop ST is not limited to the one of the Example 1. The aperture stop ST may be disposed on the object side relative to the first lens L1. Otherwise, the aperture stop ST may be disposed between the second lens L2 and the third lens L3, between the third lens L3 and the fourth lens L4, between the fourth lens L4 and the fifth lens L5 or the like.

The second lens L2 has a shape that a curvature radius r4 of an object-side surface and a curvature radius r5 of an image-side surface of the second lens are both positive. The second lens L2 is formed in a meniscus shape having the object-side surface being convex in the paraxial region. The shape of the second lens L2 is not limited to the one in the Example 1. The shape of the second lens L2 can be formed in any shape, as long as refractive power of the second lens L2 is positive. Other than the shape of the Example 1, the second lens L2 may be formed in a shape which both the curvature radii r4 and r5 are negative or a shape which the curvature radius r4 is positive and the curvature radius r5 is negative. The lens having the former shape is a meniscus lens having the object-side surface being concave in the paraxial region, and the lens having the latter shape is a biconvex lens in the paraxial region. It is preferable that the curvature radius r4 of the second lens L2 is positive from the standpoint of downsizing the imaging lens.

The third lens L3 has a shape that a curvature radius r6 of an object-side surface is positive and a curvature radius r7 of an image-side surface is negative. The third lens L3 is formed in a biconvex shape in the paraxial region. The shape of the third lens L3 is not limited to the one in the Example 1. The shape of the third lens L3 can be formed in any shape, as long as refractive power of the third lens L3 is positive. Other than the shape of the Example 1, the third lens L3 may be formed in a shape which both the curvature radii r6 and r7 are positive or a shape which both the curvature radii r6 and r7 are negative. The lens having the former shape is a meniscus lens having an object-side surface being convex in the paraxial region, and the lens having the latter shape is a meniscus lens having the object-side surface being concave in the paraxial region. It is preferable that the curvature radius r6 of the third lens L3 is positive from the standpoint of downsizing the imaging lens.

The fourth lens L4 has positive refractive power. The refractive power of the fourth lens L4 is not limited to the positive refractive power. Examples of the lens configuration which the refractive power of the fourth lens L4 is negative are shown in Examples 5 to 12. The fourth lens L4 is formed in a shape which both a curvature radius r8 of an object-side surface and a curvature radius r9 of an image-side surface (=R4r) are positive. The fourth lens L4 is formed in a meniscus shape having the object-side surface being convex in the paraxial region. In addition, the fourth lens L4 is formed in a shape having a concave surface facing the fifth lens at a peripheral area of the lens. The shape of the fourth lens L4 is not limited to the one in the Example 1. Other than the shape of the Example 1, the fourth lens L4 may be formed in a shape which both the curvature radii r8 and r9 are negative or a shape which the curvature radius r8 is positive and the curvature radius r9 is negative. The lens having the former shape is a meniscus lens having the object-side surface being concave in the paraxial region, and the lens having the latter shape is a biconvex lens in the paraxial region. Furthermore, the shape of the fourth lens L4 may be a biconcave lens in the paraxial region which the curvature radius r8 is negative and the curvature radius r9 is positive. It is preferable that the curvature radius r8 of the fourth lens L4 is positive from the standpoint of downsizing the imaging lens.

The imaging lens according to the present embodiment satisfies the following conditional expression regarding the third lens L3 and the fourth lens L4.

$$0 < f34$$

where, f34: a composite focal length of the third lens L3 and the fourth lens L4.

The fifth lens L5 has negative refractive power. The refractive power of the fifth lens L5 is not limited to the negative refractive power. Examples of the lens configuration which the refractive power of the fifth lens L5 is positive are shown in Examples 5 to 8.

The fifth lens L5 is formed in a shape which a curvature radius r10 of an object-side surface is negative and a curvature radius r11 of an image-side surface is positive. The fifth lens L5 is formed in a shape of a biconcave lens in the paraxial region. In addition, the fifth lens L5 is formed in a shape having a concave surface facing the fourth lens L4 at a peripheral area of the lens. Therefore, the fourth lens L4 and the fifth lens L5 are arranged in a manner that the concave surfaces of the fourth lens L4 and the fifth lens L5 are faced each other at the peripheral area of the lens. When the fourth lens L4 and the fifth lens L5 are formed in such a shape, the field curvature and the astigmatism are properly corrected.

The shape of the fifth lens L5 is not limited to the one in the Example 1. Examples 5 to 12 show a shape which both the curvature radii r10 and r11 are positive, namely an example of a meniscus lens having the object-side surface being convex in the paraxial region. Other than such shape, the fifth lens L5 may be formed in a shape which both the curvature radii r10 and r11 are negative or a shape which the curvature radius r10 is positive and the curvature radius r11 is negative. The lens having the former shape is a meniscus lens having the object-side surface being concave in the paraxial region, and the lens having the latter shape is a biconvex lens in the paraxial region. Furthermore, the fifth lens L5 may be formed in a shape having both the curvature radii r10 and r11 of infinity in the paraxial region and refractive power at a peripheral area of the lens.

The imaging lens according to the present embodiment satisfies the following conditional expression regarding the fourth lens L4 and the fifth lens L5.

$$f45 < 0$$

where, f45: a composite focal length of the fourth lens L4 and the fifth lens L5.

The sixth lens L6 has positive refractive power. The refractive power of the sixth lens L6 is not limited to the positive refractive power. Examples of the lens configuration which the refractive power of the sixth lens L6 is negative are shown in Examples 3, 4, 7, 8 and 11. The sixth lens L6 is formed in a shape which a curvature radius r12 of an object-side surface is positive and a curvature radius r13 of an image-side surface is negative. The sixth lens L6 is formed in a shape of a biconvex lens in the paraxial region. In addition, the shape of the sixth lens L6 is not limited to the one in the Example 1. Examples 3, 4, 7, 8 and 11 show a shape which both the curvature radii r12 and r13 are negative, namely an example of a meniscus lens having the object-side surface being concave in the paraxial region. Other than such shape, the sixth lens L6 may be formed in a shape which both the curvature radii r12 and r13 are positive or a shape which the curvature radius r12 is negative and the curvature radius r13 is positive. The lens having the former shape is a meniscus lens having the object-side surface being convex in the paraxial region, and the lens having the latter shape is a biconcave lens in the paraxial region. Furthermore, the sixth lens L6 may be formed in a shape having both the curvature radii r12 and r13 of infinity in the paraxial region and refractive power at a peripheral area of the lens.

The seventh lens L7 has positive refractive power. The refractive power of the seventh lens L7 is not limited to the positive refractive power. Examples of the lens configuration which the refractive power of the seventh lens L7 is negative are shown in Examples 2, 4, 6, 8, and 10. In addition, an example of the seventh lens L7 which the refractive power becomes zero on the optical axis is shown in the Example 12.

The seventh lens L7 is formed in a shape which a curvature radius r14 of an object-side surface is positive and a curvature radius r15 of an image-side surface is negative. The seventh lens L7 is formed in a shape of a biconvex lens in the paraxial region. The shape of the seventh lens L7 is not limited to the one in the Example 1. Examples 2 and 6 show a shape which both the curvature radii r14 and r15 are negative, namely an example of a meniscus lens having the object-side surface being concave in the paraxial region. Examples 4, 8 and 10 show a shape which the curvature radius r14 is negative and the curvature radius r15 is positive, namely an example of a biconcave lens in the paraxial region. Example 12 is an example of a shape having both curvature radii r14 and r15 of infinity.

Other than such shapes, the seventh lens L7 may be formed in a shape which both the curvature radii r14 and r15 are positive, namely a shape of a meniscus lens having the object-side surface being convex in the paraxial region.

The eighth lens L8 is formed in a shape which a curvature radius r16 of an object-side surface (=R8f) and a curvature radius r17 of an image-side surface (=R8r) are positive. The eighth lens L8 is formed in a shape of a meniscus lens having the object-side surface being convex in the paraxial region. The shape of the eighth lens L8 is not limited to the one in the Example 1. The shape of the eighth lens L8 may be a shape the curvature radius r16 is negative and the curvature radius r17 is positive, namely a shape of a biconcave lens in the paraxial region. Other than such shapes, the eighth lens L8 may be formed in a shape which both the curvature radii r16 and r17 are negative. Furthermore, the eighth lens L8 may be formed in a shape which refractive power of the eighth lens L8 is negative.

Regarding the eighth lens L8, the image-side surface is formed as an aspheric surface having at least one inflection point. Here, the "inflection point" means a point where the positive/negative sign of a curvature changes on the curve, i.e., a point where a direction of curving of the curve on the lens surface changes. The image-side surface of the eighth lens L8 of the imaging lens according to the present embodiment is the aspheric surface having at least one pole. With such shape of the eighth lens L8, an off-axial chromatic aberration of magnification as well as an axial chromatic aberration can be properly corrected, and an incident angle of a light ray emitted from the imaging lens to the image plane IM can be preferably controlled to be within the range of chief ray angle (CRA). According to the imaging lens in the Example 1, both surfaces of the seventh lens L7 and the eighth lens L8 are formed as aspheric surfaces having at least one inflection point. Therefore, aberrations at image periphery can be properly corrected. Depending on the required optical performance and extent of downsizing of the imaging lens, among lens surfaces of the seventh lens L7 and the eighth lens L8, lens surfaces other than the image-side surface of the eighth lens L8 may be formed as an aspheric surface without the inflection point.

The imaging lens according to the present embodiment satisfies the following conditional expression regarding the seventh lens L7 and the eighth lens L8:

$$f78<0$$

where
f78: a composite focal length of the seventh lens L7 and the eighth lens L8.

According to the embodiment, the imaging lens satisfies the following conditional expressions (1) to (18):

$$0.7<R1f/R1r<1.6 \tag{1}$$

$$1.0<R1f/R1r<1.6 \tag{1a}$$

$$-10.0<f1/f2<-0.8 \tag{2}$$

$$-8.0<f1/f2<-0.8 \tag{2a}$$

$$-6.0<f1/f2<-1.0 \tag{2b}$$

$$0.05<D12/f<0.20 \tag{3}$$

$$1.0<f2/f3<6.5 \tag{4}$$

$$1.2<f2/f3<5.5 \tag{4a}$$

$$1.4<f2/f3<4.5 \tag{4b}$$

$$0.3<f3/f<3.5 \tag{5}$$

$$0.5<f3/f<2.5 \tag{5a}$$

$$0.2<R4r/f<1.0 \tag{6}$$

$$0.08<D45/f<0.20 \tag{7}$$

$$0.5<D56/D67<4.0 \tag{8}$$

$$0.4<T7/T8<3.5 \tag{9}$$

$$0.04<D78/f<0.16 \tag{10}$$

$$-3.0<f8/f<-0.3 \tag{11}$$

$$0.2<R8f/f<1.8 \tag{12}$$

$$0.1<R8r/f<0.5 \tag{13}$$

$$10<vd1<35 \tag{14}$$

$$35<vd2<85 \tag{15}$$

$$35<vd3<85 \tag{16}$$

$$1.0<TL/f<1.5 \tag{17}$$

$$1.2<TL/H\,max<2.2 \tag{18}$$

where
f: a focal length of the overall optical system of the imaging lens,
f1: a focal length of the first lens L1,
f2: a focal length of the second lens L2,
f3: a focal length of the third lens L3,
f8: a focal length of the eighth lens L8,
T7: a thickness along the optical axis X of the seventh lens L7,
T8: a thickness along the optical axis X of the eighth lens L8,
vd1: an abbe number at d-ray of the first lens L1,
vd2: an abbe number at d-ray of the second lens L2,
vd3: an abbe number at d-ray of the third lens L3,
R1f: a curvature radius of an object-side surface of the first lens L1,
R1r: a curvature radius of an image-side surface of the first lens L1,
R4r: a curvature radius of an image-side surface of the fourth lens L4,
R8f: a curvature radius of an object-side surface of the eighth lens L8,
R8r: a curvature radius of an image-side surface of the eighth lens L8,
D12: a distance along the optical axis X between the first lens L1 and the second lens L2,
D45: a distance along the optical axis X between the fourth lens L4 and the fifth lens L5,
D56: a distance along the optical axis X between the fifth lens L5 and the sixth lens L6,
D67: a distance along the optical axis X between the sixth lens L6 and the seventh lens L7,
D78: a distance along the optical axis X between the seventh lens L7 and the eighth lens L8,
Hmax: a maximum image height, and
TL: a distance along the optical axis X from an object-side surface of the first lens L1 to an image plane. (Filter 10 is an air-converted distance)

When the fourth lens L4 has positive refractive power as in the lens configurations in Examples 1 to 4, the following conditional expressions (19) and (19a) are further satisfied:

$$-25.0<f4/f5<-5.0 \tag{19}$$

$$-22.0<f4/f5<-7.0 \tag{19a}$$

where
f4: a focal length of the fourth lens L4, and
f5: a focal length of the fifth lens L5.

When the fourth lens L4 has positive refractive power as in the lens configurations in Examples 1 to 4, the following conditional expressions (20), (20a) and (20b) are further satisfied:

$$-4.0<f5/f<-0.2 \tag{20}$$

$$-3.0<f5/f<-0.2 \tag{20a}$$

$$-2.0<f5/f<-0.3. \tag{20b}$$

When the sixth lens L6 has positive refractive power as in the lens configurations in Examples 1, 2, 5, 6, 9, 10 and 12, the following conditional expressions (21) and (21a) are further satisfied:

$$0.3<f6/f<3.0 \tag{21}$$

$$0.5<f6/f<2.0 \tag{21a}$$

where f6: a focal length of the sixth lens L6.

When the fifth lens L5 is formed in a meniscus shape having an object-side surface being convex in the paraxial region and the sixth lens L6 has the positive refractive power as in the lens configurations in Examples 5, 6, 9, 10 and 12, the following conditional expression (22) is further satisfied:

$$0.5 < f56/f < 4.0 \quad (22)$$

where f56: a composite focal length of the fifth lens L5 and the sixth lens L6.

When the sixth lens L6 and the seventh lens L7 have negative refractive power as in the lens configurations in Examples 4 and 8, the following conditional expression (23) is further satisfied:

$$-14.0 < f67/f < -2.0 \quad (23)$$

where f67: a composite focal length of the sixth lens L6 and the seventh lens L7.

Furthermore, the imaging lens according to the present embodiment satisfies the following conditional expression (24):

$$f/Dep < 2.4 \quad (24)$$

where

Dep: an entrance pupil diameter of the imaging lens.

It is not necessary to satisfy the above all conditional expressions, and when any one of the conditional expressions is individually satisfied, operational advantage corresponding to each conditional expression can be obtained.

According to the present embodiment, lens surfaces of the respective lenses are formed as aspheric surfaces. An equation that expresses these aspheric surfaces is shown below:

$$Z = \frac{C \cdot H^2}{1 + \sqrt{1 - (1+k) \cdot C^2 \cdot H^2}} + \Sigma(An \cdot H^n) \quad \text{[Equation 1]}$$

where

Z: a distance in a direction of the optical axis,

H: a distance from the optical axis in a direction perpendicular to the optical axis, C: a paraxial curvature (=1/r, r: paraxial curvature radius), k: conic constant, and An: the nth aspheric coefficient.

Next, examples of the imaging lens according to the present embodiment will be described. In each example, f represents a focal length of the overall optical system of the imaging lens, Fno represents an F-number, ω represents a half field of view. Additionally, i represents a surface number counted from the object side, r represents a paraxial curvature radius, d represents a distance of lenses along the optical axis (surface distance), nd represents a refractive index at a reference wavelength of 588 nm, and vd represents an abbe number at the reference wavelength, respectively. Here, surfaces indicated with surface numbers i affixed with an asterisk (*) are aspheric surfaces.

Example 1

The basic lens data is shown below in Table 1.

TABLE 1

| f = 6.91 mm Fno = 1.9 ω = 33.9° | | | | | | |
|---|---|---|---|---|---|---|
| | i | r | d | nd | vd | [mm] |
| | | ∞ | ∞ | | | |
| L1 | 1* | 4.463 | 0.357 | 1.6707 | 19.2 | f1 = −18.426 |
| | 2* | 3.174 | 1.070 | | | |
| | 3(ST) | ∞ | −0.472 | | | |
| L2 | 4* | 3.040 | 0.759 | 1.5445 | 56.4 | f2 = 12.098 |
| | 5* | 5.147 | 0.097 | | | |
| L3 | 6* | 3.586 | 0.835 | 1.5445 | 56.4 | f3 = 6.265 |
| | 7* | −64.148 | 0.022 | | | |
| L4 | 8* | 2.724 | 0.273 | 1.5348 | 55.7 | f4 = 103.899 |
| | 9* | 2.764 | 1.014 | | | |
| L5 | 10* | −13.759 | 0.734 | 1.6707 | 19.2 | f5 = −6.245 |
| | 11* | 6.151 | 0.224 | | | |
| L6 | 12* | 22.973 | 0.603 | 1.5348 | 55.7 | f6 = 6.809 |
| | 13* | −4.288 | 0.223 | | | |
| L7 | 14* | 84.904 | 0.559 | 1.6707 | 19.2 | f7 = 109.139 |
| | 15* | −529.818 | 0.430 | | | |
| L8 | 16* | 6.235 | 0.591 | 1.5445 | 56.4 | f8 = −5.739 |
| | 17* | 2.012 | 0.300 | | | |
| | 18 | ∞ | 0.210 | 1.5168 | 64.2 | |
| | 19 | ∞ | 0.961 | | | |
| (IM) | | ∞ | | | | |

R1f=4.463 mm
R1r=3.174 mm
R4r=2.764 mm
R8f=6.235 mm
R8r=2.012 mm
D12=0.598 mm
D45=1.014 mm
D56=0.224 mm
D67=0.223 mm
D78=0.430 mm
T7=0.559 mm
T8=0.591 mm
TL=8.718 mm
Hmax=4.65 mm
Dep=3.606 mm

TABLE 2

| Aspheric Surface Data | | | | | |
|---|---|---|---|---|---|
| i | k | A4 | A6 | A8 | A10 |
| 1 | 0.000E+00 | −1.985E−02 | −1.902E−03 | −1.033E−03 | 1.004E−03 |
| 2 | 0.000E+00 | −2.318E−02 | −6.132E−03 | 3.517E−03 | −3.093E−03 |
| 4 | −3.661E+00 | 4.547E−03 | −2.292E−03 | 3.094E−03 | −4.119E−03 |
| 5 | −1.000E+02 | 1.083E−02 | −4.614E−02 | 4.721E−02 | −2.991E−02 |
| 6 | −4.879E+00 | −2.229E−02 | 2.230E−02 | −2.287E−02 | 1.896E−02 |
| 7 | 0.000E+00 | 2.633E−02 | −1.959E−02 | −1.223E−02 | 2.473E−02 |
| 8 | 0.000E+00 | −2.957E−02 | 2.902E−02 | −6.277E−02 | 5.859E−02 |
| 9 | −4.853E+00 | −1.671E−02 | 4.449E−02 | −5.636E−02 | 3.964E−02 |
| 10 | 0.000E+00 | −5.010E−02 | 1.413E−02 | 1.860E−03 | −6.658E−03 |
| 11 | 0.000E+00 | −5.418E−02 | −2.096E−02 | 6.020E−02 | −6.730E−02 |
| 12 | 2.400E+01 | −1.703E−02 | 3.128E−03 | −1.992E−02 | 1.968E−02 |

TABLE 2-continued

Aspheric Surface Data

| i | | | | | |
|---|---|---|---|---|---|
| 13 | 2.009E+00 | 6.809E-02 | -5.940E-02 | 1.043E-02 | 1.212E-02 |
| 14 | 0.000E+00 | 9.296E-02 | -1.042E-01 | 3.934E-02 | -6.510E-03 |
| 15 | 0.000E+00 | 5.939E-02 | -7.388E-02 | 3.213E-02 | -8.520E-03 |
| 16 | -2.976E-02 | -1.512E-01 | 3.835E-02 | -6.094E-03 | 9.474E-04 |
| 17 | -9.794E+00 | -7.501E-02 | 2.500E-02 | -5.499E-03 | 8.384E-04 |

| i | A12 | A14 | A16 | A18 | A20 |
|---|---|---|---|---|---|
| 1 | -3.618E-04 | 8.265E-05 | -1.198E-05 | 1.008E-06 | -3.769E-08 |
| 2 | 2.044E-03 | -7.747E-04 | 1.703E-04 | -2.038E-05 | 1.038E-06 |
| 4 | 2.567E-03 | -8.969E-04 | 1.826E-04 | -2.037E-05 | 1.031E-06 |
| 5 | 1.318E-02 | -3.963E-03 | 7.557E-04 | -8.135E-05 | 3.842E-06 |
| 6 | -9.432E-03 | 2.951E-03 | -5.833E-04 | 6.670E-05 | -3.205E-06 |
| 7 | -1.566E-02 | 5.697E-03 | -1.280E-03 | 1.645E-04 | -8.567E-06 |
| 8 | -2.947E-02 | 9.010E-03 | -1.713E-03 | 1.998E-04 | -1.140E-05 |
| 9 | -1.525E-02 | 2.736E-03 | 8.767E-05 | -1.180E-04 | 1.520E-05 |
| 10 | 5.093E-03 | -2.516E-03 | 9.211E-04 | -2.195E-04 | 2.317E-05 |
| 11 | 4.544E-02 | -1.930E-02 | 5.042E-03 | -7.394E-04 | 4.671E-05 |
| 12 | -1.049E-02 | 3.119E-03 | -4.666E-04 | 2.373E-05 | 8.757E-07 |
| 13 | -9.763E-03 | 3.364E-03 | -6.223E-04 | 6.052E-05 | -2.419E-06 |
| 14 | -7.580E-04 | 5.847E-04 | -1.209E-04 | 1.147E-05 | -3.337E-07 |
| 15 | 1.448E-03 | -1.557E-04 | 1.027E-05 | -3.713E-07 | 4.579E-09 |
| 16 | -1.420E-04 | 1.454E-05 | -8.865E-07 | 3.662E-08 | -1.277E-09 |
| 17 | -8.925E-05 | 6.378E-06 | -2.875E-07 | 7.382E-09 | -8.692E-11 |

The values of the respective conditional expressions are as follows:

R1f/R1r=1.4
f1/f2=-1.5
D12/f=0.09
f2/f3=1.9
f3/f=0.9
R4r/f=0.4
D45/f=0.15
D56/D67=1.0
T7/T8=0.9
D78/f=0.06
f8/f=-0.8
R8f/f=0.9
R8r/f=0.3
TL/f=1.3
TL/Hmax=1.9
f/Dep=1.9
f4/f5=-16.6
f5/f=-0.9
f6/f=1.0

Accordingly, the imaging lens according to the Example 1 satisfies the above-described conditional expressions.

Figure 2:
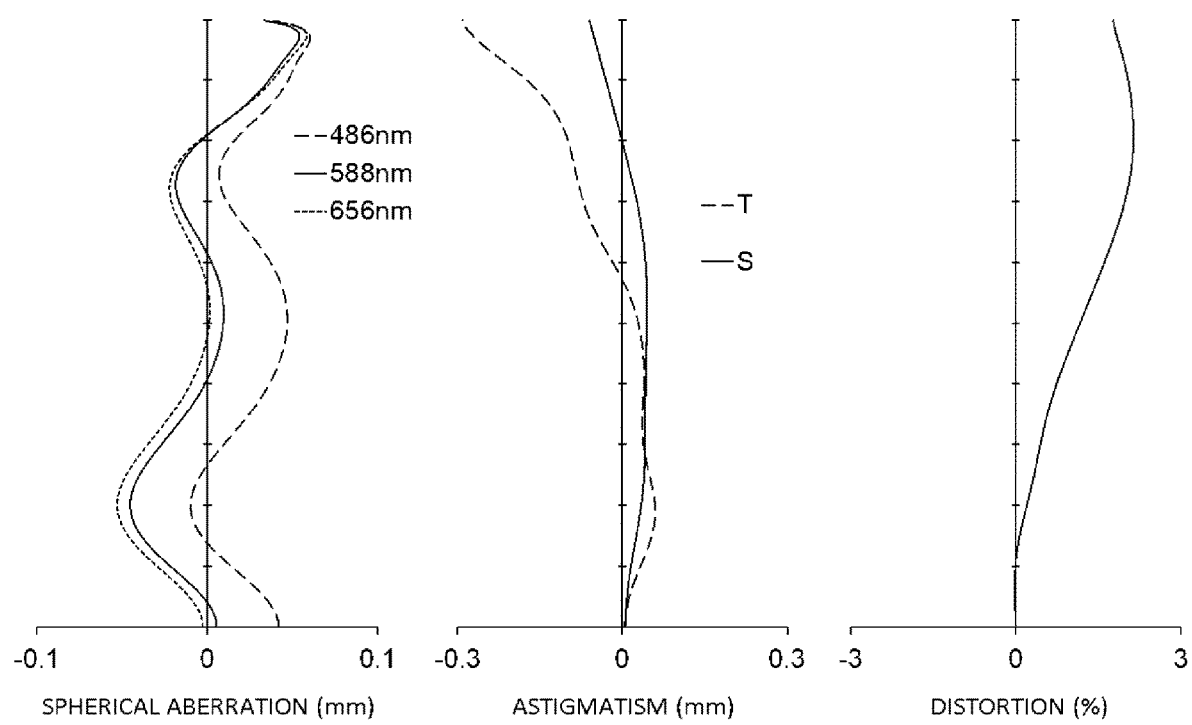
FIG. 2 is an aberration diagram showing spherical aberration, astigmatism, and distortion of the imaging lens of FIG. 1.
Figure 3:
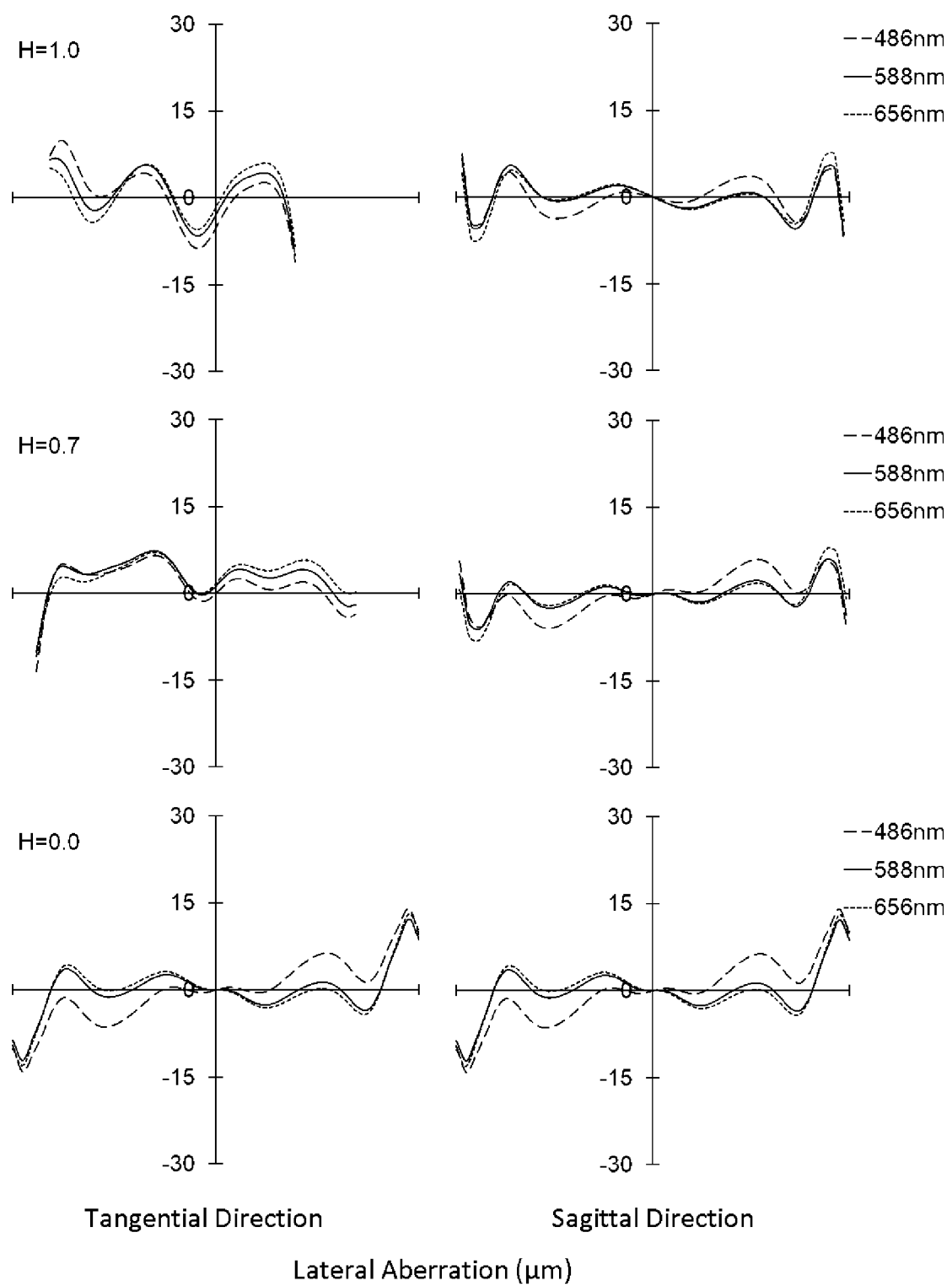
FIG. 3 is an aberration diagram showing a lateral aberration of the imaging lens of FIG. 1.
Figure 4:
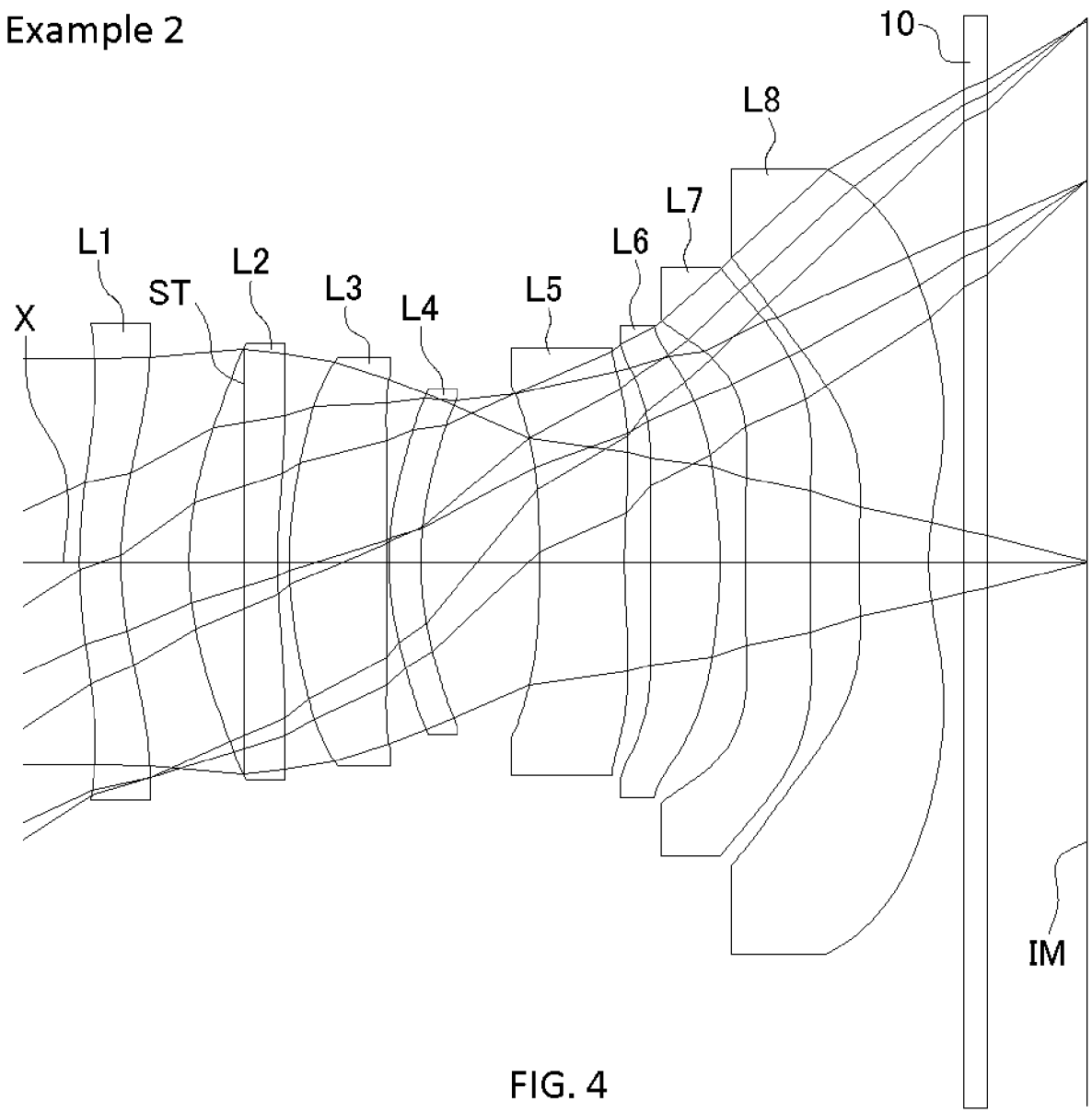
FIG. 4 is a sectional view of a schematic configuration of an imaging lens in Example 2 of the present invention.

FIG. 2 shows spherical aberration (mm), astigmatism (mm), and distortion (%) of the imaging lens in Example 1, respectively. The astigmatism diagram and distortion diagram show aberrations at the reference wavelength (588 nm). Furthermore, in the astigmatism diagram, a sagittal image surface (S) and a tangential image surface (T) are shown respectively (same for FIGS. 5, 8, 11, 14, 17, 20, 23, 26, 29, 32 and 35). FIG. 3 shows a lateral aberration corresponding to a ratio H of each image height to the maximum image height Hmax (hereinafter referred to as "image height ratio H"), which is divided into a tangential direction and a sagittal direction (same for FIGS. 6, 9, 12, 15, 18, 21, 24, 27, 30, 33 and 36). As shown in FIGS. 2 and 3, according to the imaging lens of the Example 1, aberrations can be properly corrected.

Example 2

The basic lens data is shown below in Table 3.

TABLE 3 f = 6.94 mm Fno = 1.9 ω = 33.8°

| | i | r | d | nd | vd | [mm] |
|---|---|---|---|---|---|---|
| | | ∞ | ∞ | | | |
| L1 | 1* | 4.460 | 0.362 | 1.6707 | 19.2 | f1 = -18.562 |
| | 2* | 3.177 | 1.067 | | | |
| | 3(ST) | ∞ | -0.472 | | | |
| L2 | 4* | 3.024 | 0.770 | 1.5445 | 56.4 | f2 = 11.954 |
| | 5* | 5.142 | 0.101 | | | |
| L3 | 6* | 3.565 | 0.843 | 1.5445 | 56.4 | f3 = 6.220 |
| | 7* | -62.067 | 0.023 | | | |
| L4 | 8* | 2.718 | 0.274 | 1.5348 | 55.7 | f4 = 100.389 |
| | 9* | 2.762 | 1.030 | | | |
| L5 | 10* | -14.541 | 0.739 | 1.6707 | 19.2 | f5 = -6.354 |
| | 11* | 6.152 | 0.227 | | | |
| L6 | 12* | 22.545 | 0.602 | 1.5348 | 55.7 | f6 = 6.773 |
| | 13* | -4.276 | 0.223 | | | |
| L7 | 14* | -80.300 | 0.559 | 1.6707 | 19.2 | f7 = -121.731 |
| | 15* | -4870.522 | 0.428 | | | |
| L8 | 16* | 6.229 | 0.606 | 1.5445 | 56.4 | f8 = -5.726 |
| | 17* | 2.006 | 0.300 | | | |
| | 18 | ∞ | 0.210 | 1.5168 | 64.2 | |
| | 19 | ∞ | 0.861 | | | |
| (IM) | | ∞ | | | | |

R1f=4.460 mm
R1r=3.177 mm
R4r=2.762 mm
R8f=6.229 mm
R8r=2.006 mm
D12=0.595 mm
D45=1.030 mm
D56=0.227 mm
D67=0.223 mm
D78=0.428 mm
T7=0.559 mm
T8=0.606 mm
TL=8.682 mm
Hmax=4.65 mm
Dep=3.610 mm

TABLE 4

Aspheric Surface Data

| i | k | A4 | A6 | A8 | A10 |
|---|---|---|---|---|---|
| 1 | 0.000E+00 | −1.988E−02 | −1.906E−03 | −1.034E−03 | 1.004E−03 |
| 2 | 0.000E+00 | −2.316E−02 | −6.128E−03 | 3.517E−03 | −3.092E−03 |
| 4 | −3.654E+00 | 4.564E−03 | −2.288E−03 | 3.095E−03 | −4.119E−03 |
| 5 | −1.000E+02 | 1.081E−02 | −4.615E−02 | 4.721E−02 | −2.991E−02 |
| 6 | −4.863E+00 | −2.226E−02 | 2.231E−02 | −2.287E−02 | 1.896E−02 |
| 7 | 0.000E+00 | 2.628E−02 | −1.960E−02 | −1.223E−02 | 2.472E−02 |
| 8 | 0.000E+00 | −2.954E−02 | 2.902E−02 | −6.277E−02 | 5.859E−02 |
| 9 | −4.880E+00 | −1.673E−02 | 4.451E−02 | −5.635E−02 | 3.964E−02 |
| 10 | 0.000E+00 | −5.018E−02 | 1.409E−02 | 1.841E−03 | −6.667E−03 |
| 11 | 0.000E+00 | −5.408E−02 | −2.097E−02 | 6.020E−02 | −6.730E−02 |
| 12 | 2.400E+01 | −1.744E−02 | 3.062E−03 | −1.992E−02 | 1.968E−02 |
| 13 | 1.985E+00 | 6.835E−02 | −5.936E−02 | 1.043E−02 | 1.212E−02 |
| 14 | 0.000E+00 | 9.310E−02 | −1.043E−01 | 3.932E−02 | −6.511E−03 |
| 15 | 0.000E+00 | 5.926E−02 | −7.386E−02 | 3.213E−02 | −8.520E−03 |
| 16 | 2.896E−03 | −1.512E−01 | 3.833E−02 | −6.095E−03 | 9.475E−04 |
| 17 | −1.072E+01 | −7.497E−02 | 2.501E−02 | −5.499E−03 | 8.384E−04 |

| i | A12 | A14 | A16 | A18 | A20 |
|---|---|---|---|---|---|
| 1 | −3.618E−04 | 8.266E−05 | −1.198E−05 | 1.008E−06 | −3.753E−08 |
| 2 | 2.044E−03 | −7.747E−04 | 1.703E−04 | −2.038E−05 | 1.038E−06 |
| 4 | 2.567E−03 | −8.969E−04 | 1.826E−04 | −2.037E−05 | 1.031E−06 |
| 5 | 1.318E−02 | −3.963E−03 | 7.557E−04 | −8.135E−05 | 3.841E−06 |
| 6 | −9.432E−03 | 2.951E−03 | −5.833E−04 | 6.669E−05 | −3.208E−06 |
| 7 | −1.566E−02 | 5.697E−03 | −1.280E−03 | 1.646E−04 | −8.556E−06 |
| 8 | −2.947E−02 | 9.011E−03 | −1.713E−03 | 1.999E−04 | −1.134E−05 |
| 9 | −1.525E−02 | 2.736E−03 | 8.753E−05 | −1.181E−04 | 1.515E−05 |
| 10 | 5.089E−03 | −2.518E−03 | 9.206E−04 | −2.197E−04 | 2.311E−05 |
| 11 | 4.544E−02 | −1.930E−03 | 5.042E−03 | −7.394E−04 | 4.671E−05 |
| 12 | −1.049E−02 | 3.120E−03 | −4.666E−04 | 2.374E−05 | 8.791E−07 |
| 13 | −9.763E−03 | 3.364E−03 | −6.224E−04 | 6.052E−05 | −2.421E−06 |
| 14 | −7.578E−04 | 5.848E−04 | −1.209E−04 | 1.148E−05 | −3.325E−07 |
| 15 | 1.448E−03 | −1.557E−04 | 1.027E−05 | −3.713E−07 | 4.572E−09 |
| 16 | −1.420E−04 | 1.454E−05 | −8.866E−07 | 3.659E−08 | −1.281E−09 |
| 17 | −8.925E−05 | 6.378E−06 | −2.876E−07 | 7.381E−09 | −8.694E−11 |

The values of the respective conditional expressions are as follows:

R1f/R1r=1.4
f1/f2=−1.6
D12/f=0.09
f2/f3=1.9
f3/f=0.9
R4r/f=0.4
D45/f=0.15
D56/D67=1.0
T7/T8=0.9
D78/f=0.06
f8/f=−0.8
R8f/f=0.9
R8r/f=0.3
TL/f=1.3
TL/Hmax=1.9
f/Dep=1.9
f4/f5=−15.8
f5/f=−0.9
f6/f=1.0

Accordingly, the imaging lens according to the Example 2 satisfies the above-described conditional expressions.

Figure 5:
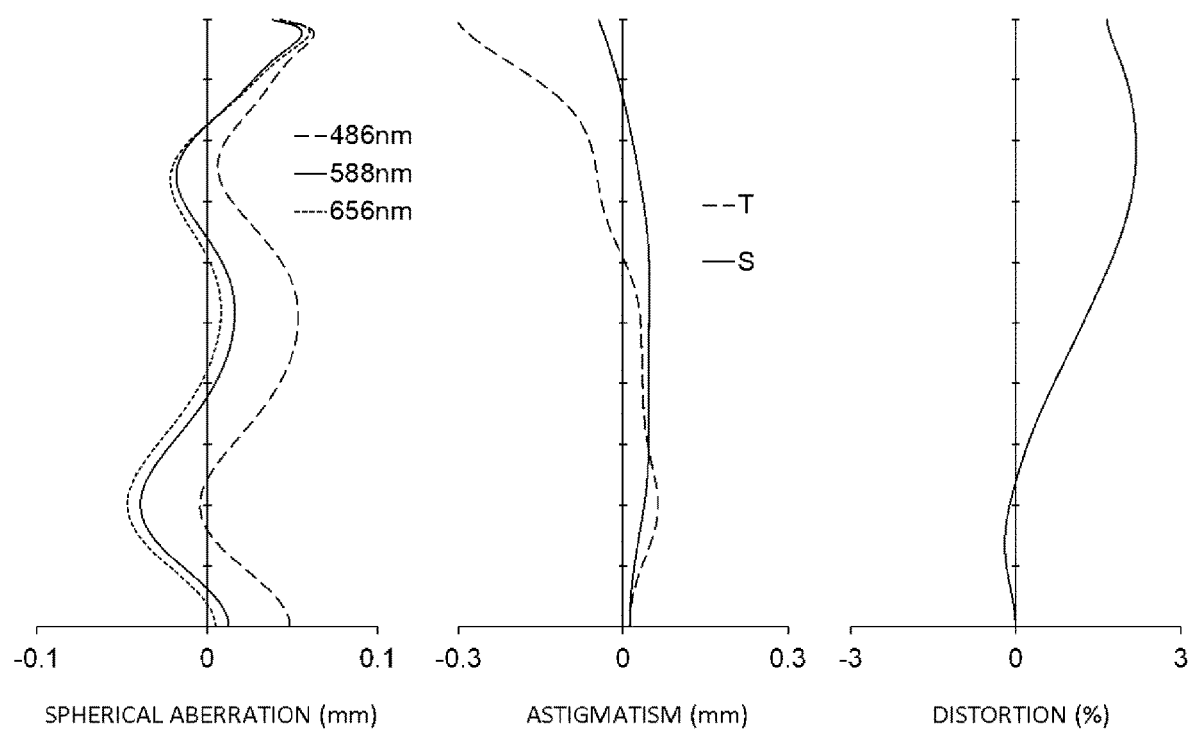
FIG. 5 is an aberration diagram showing spherical aberration, astigmatism, and distortion of the imaging lens of FIG. 4.
Figure 6:
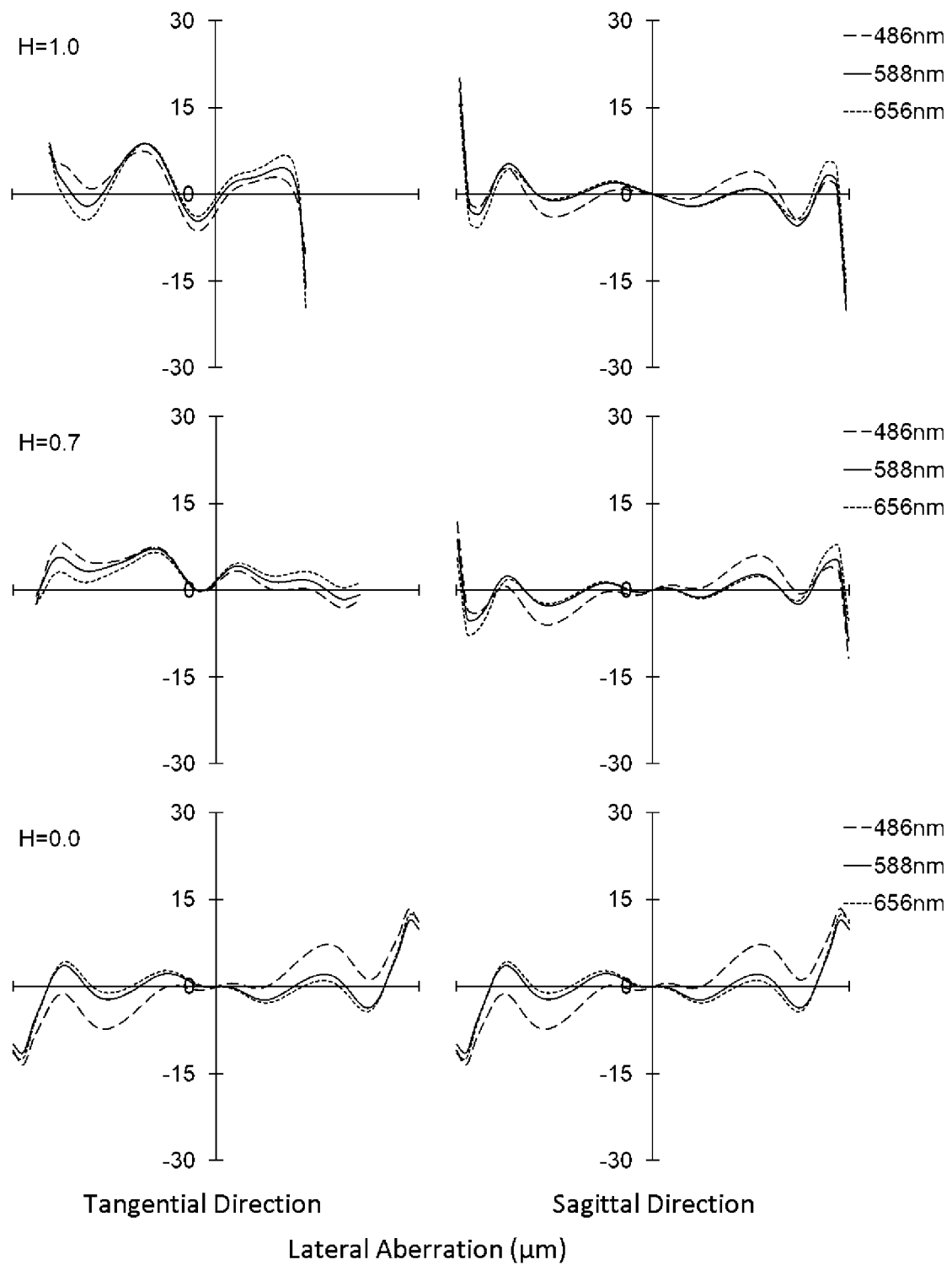
FIG. 6 is an aberration diagram showing a lateral aberration of the imaging lens of FIG. 4.
Figure 7:
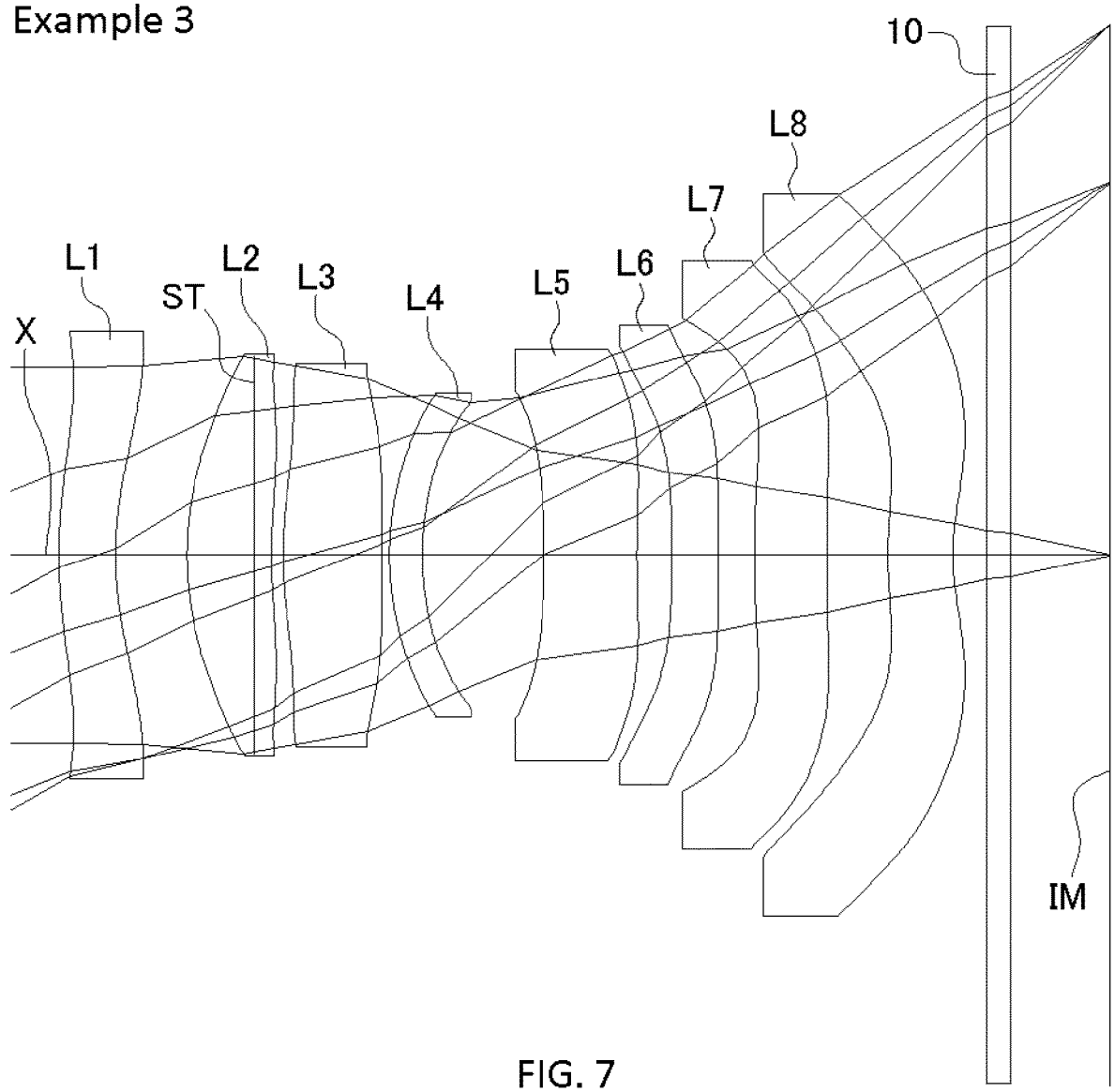
FIG. 7 is a sectional view of a schematic configuration of an imaging lens in Example 3 of the present invention.

FIG. 5 shows spherical aberration (mm), astigmatism (mm), and distortion (%), respectively. FIG. 6 shows a lateral aberration corresponding to the image height ratio H. As shown in FIGS. 5 and 6, according to the imaging lens of the Example 2, aberrations can be properly corrected.

Example 3

The basic lens data is shown below in Table 5.

TABLE 5 f = 8.02 mm Fno = 2.3 ω = 30.1°

| | i | r | d | nd | vd | [mm] |
|---|---|---|---|---|---|---|
| | 1* | ∞ | ∞ | | | |
| L1 | 1* | 4.724 | 0.506 | 1.6707 | 19.2 | f1 = −17.674 |
| | 2* | 3.233 | 1.225 | | | |
| | 3(ST) | ∞ | −0.595 | | | |
| L2 | 4* | 2.956 | 0.755 | 1.5445 | 56.4 | f2 = 11.645 |
| | 5* | 5.038 | 0.103 | | | |
| L3 | 6* | 3.464 | 0.884 | 1.5445 | 56.4 | f3 = 6.027 |
| | 7* | −56.675 | 0.063 | | | |
| L4 | 8* | 2.824 | 0.291 | 1.5348 | 55.7 | f4 = 139.894 |
| | 9* | 2.829 | 1.079 | | | |
| L5 | 10* | −13.878 | 0.827 | 1.6707 | 19.2 | f5 = −8.296 |
| | 11* | 9.511 | 0.315 | | | |
| L6 | 12* | −14.559 | 0.413 | 1.5348 | 55.7 | f6 = −104.291 |
| | 13* | −19.897 | 0.323 | | | |
| L7 | 14* | 36.905 | 0.642 | 1.6707 | 19.2 | f7 = 45.846 |
| | 15* | −183.124 | 0.541 | | | |
| L8 | 16* | 3.951 | 0.578 | 1.5348 | 55.7 | f8 = −9.975 |
| | 17* | 2.154 | 0.300 | | | |
| | 18 | ∞ | 0.210 | 1.5168 | 64.2 | |
| | 19 | ∞ | 0.889 | | | |
| (IM) | | ∞ | | | | |

R1f=4.724 mm
R1r=3.233 mm
R4r=2.829 mm
R8f=3.951 mm

R8r=2.154 mm
D12=0.630 mm
D45=1.079 mm
D56=0.315 mm
D67=0.323 mm
D78=0.541 mm
T7=0.642 mm
T8=0.578 mm
TL=9.277 mm
Hmax=4.65 mm
Dep=3.453 mm

TABLE 6

| | Aspheric Surface Data | | | | |
|---|---|---|---|---|---|
| i | k | A4 | A6 | A8 | A10 |
| 1 | 0.000E+00 | −1.856E−02 | −1.948E−03 | −1.073E−03 | 1.009E−03 |
| 2 | 0.000E+00 | −2.324E−02 | −5.969E−03 | 3.558E−03 | −3.094E−03 |
| 4 | −4.242E+00 | 1.172E−02 | −1.644E−03 | 2.424E−03 | −4.044E−03 |
| 5 | −1.000E+02 | −5.481E−03 | −4.383E−02 | 4.742E−02 | −3.017E−02 |
| 6 | −1.664E+01 | −3.171E−02 | 9.818E−03 | −2.148E−02 | 2.005E−02 |
| 7 | 0.000E+00 | −6.902E−03 | −1.634E−02 | −1.202E−02 | 2.527E−02 |
| 8 | 0.000E+00 | 2.149E−03 | 2.835E−02 | −6.321E−02 | 5.755E−02 |
| 9 | 9.291E−01 | 3.114E−03 | 4.310E−02 | −5.755E−02 | 3.900E−02 |
| 10 | 0.000E+00 | −5.757E−02 | 1.692E−02 | 1.598E−03 | −7.407E−03 |
| 11 | 0.000E+00 | −6.120E−02 | −1.738E−02 | 5.910E−02 | −6.730E−02 |
| 12 | 2.400E+01 | −4.111E−02 | 3.496E−03 | −1.888E−02 | 2.020E−02 |
| 13 | 4.894E+01 | 2.980E−02 | −5.571E−02 | 1.116E−02 | 1.206E−02 |
| 14 | 0.000E+00 | 8.850E−02 | −1.013E−01 | 3.931E−02 | −6.511E−03 |
| 15 | 0.000E+00 | 6.467E−02 | −7.227E−02 | 3.210E−02 | −8.545E−03 |
| 16 | −7.855E−01 | −1.466E−01 | 3.656E−02 | −6.203E−03 | 9.507E−04 |
| 17 | −1.008E+01 | −9.007E−02 | 2.776E−02 | −5.750E−03 | 8.345E−04 |

| i | A12 | A14 | A16 | A18 | A20 |
|---|---|---|---|---|---|
| 1 | −3.628E−04 | 8.220E−05 | −1.186E−05 | 1.021E−06 | −3.941E−08 |
| 2 | 2.045E−03 | −7.752E−04 | 1.701E−04 | −2.041E−05 | 1.059E−06 |
| 4 | 2.606E−03 | −8.935E−04 | 1.814E−04 | −2.111E−05 | 1.201E−06 |
| 5 | 1.325E−02 | −3.901E−03 | 7.532E−04 | −8.850E−05 | 4.864E−06 |
| 6 | −9.486E−03 | 2.891E−03 | −5.789E−04 | 7.010E−05 | −4.181E−06 |
| 7 | −1.578E−02 | 5.503E−03 | −1.270E−03 | 2.127E−04 | −2.019E−05 |
| 8 | −2.937E−02 | 9.317E−03 | −1.658E−03 | 1.161E−04 | 2.034E−06 |
| 9 | −1.548E−02 | 2.767E−03 | 2.514E−04 | −3.201E−06 | −4.949E−05 |
| 10 | 4.907E−03 | −2.556E−03 | 1.104E−03 | −2.212E−04 | −1.581E−06 |
| 11 | 4.549E−02 | −1.929E−02 | 5.046E−03 | −7.402E−04 | 4.582E−05 |
| 12 | −1.041E−02 | 3.121E−03 | −4.716E−04 | 2.178E−05 | 6.515E−07 |
| 13 | −9.774E−03 | 3.362E−03 | −6.224E−04 | 6.053E−05 | −2.437E−06 |
| 14 | −7.570E−04 | 5.814E−04 | −1.211E−04 | 1.147E−05 | −3.411E−07 |
| 15 | 1.445E−03 | −1.560E−04 | 1.024E−05 | −3.686E−07 | 6.308E−09 |
| 16 | −1.410E−04 | 1.466E−05 | −8.741E−07 | 3.641E−08 | −1.181E−09 |
| 17 | −8.779E−05 | 6.390E−06 | −2.903E−07 | 7.152E−09 | −7.421E−11 |

The values of the respective conditional expressions are as follows:
R1f/R1r=1.5
f1/f2=−1.5
D12/f=0.08
f2/f3=1.9
f3/f=0.8
R4r/f=0.4
D45/f=0.13
D56/D67=1.0
T7/T8=1.1
D78/f=0.07
f8/f=−1.2
R8f/f=0.5
R8r/f=0.3
TL/f=1.2
TL/Hmax=2.0
f/Dep=2.3
f4/f5=−16.9
f5/f=−1.0

Accordingly, the imaging lens according to the Example 3 satisfies the above-described conditional expressions.

Figure 8:
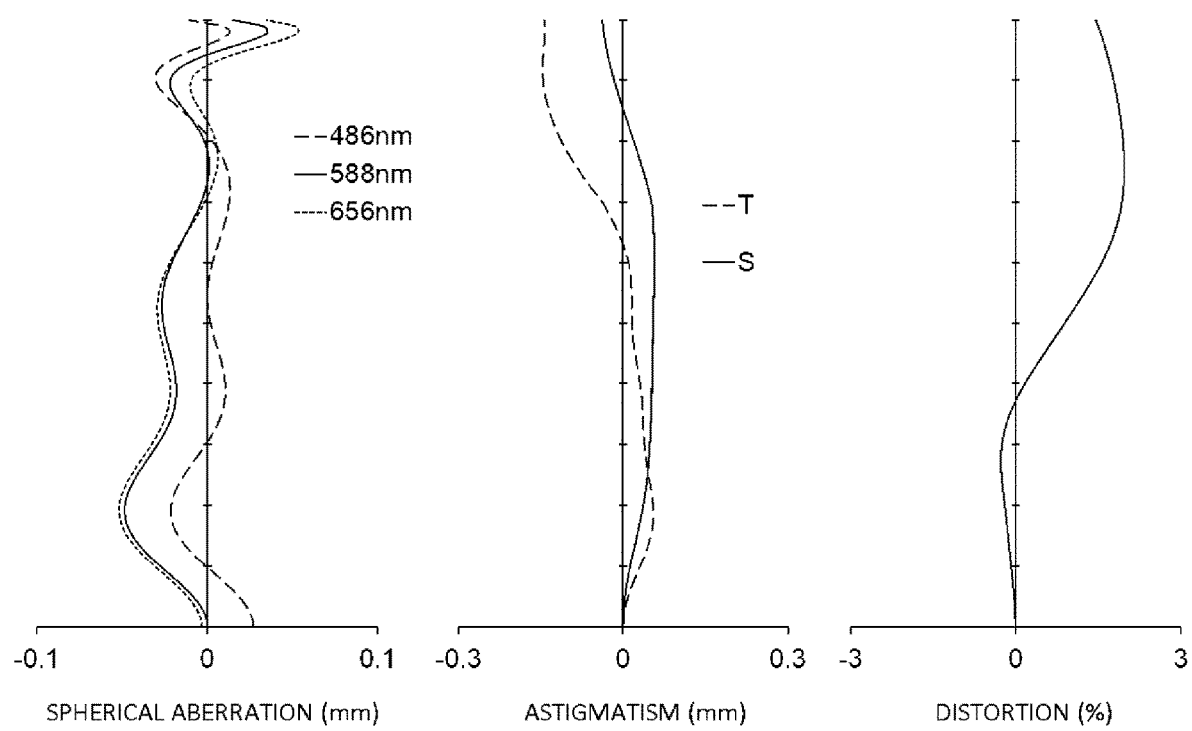
FIG. 8 is an aberration diagram showing spherical aberration, astigmatism, and distortion of the imaging lens of FIG. 7.
Figure 9:
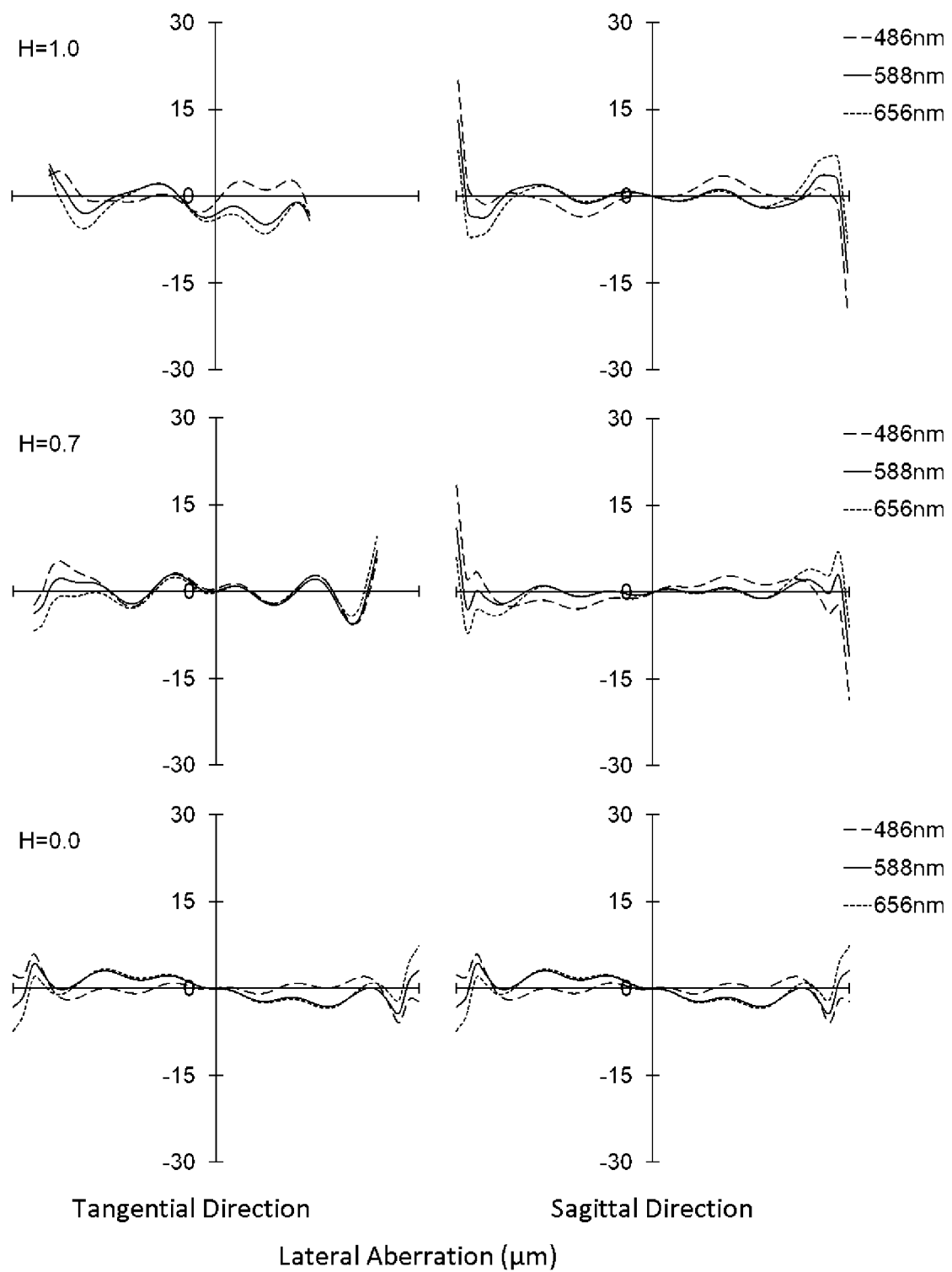
FIG. 9 is an aberration diagram showing a lateral aberration of the imaging lens of FIG. 7.
Figure 10:
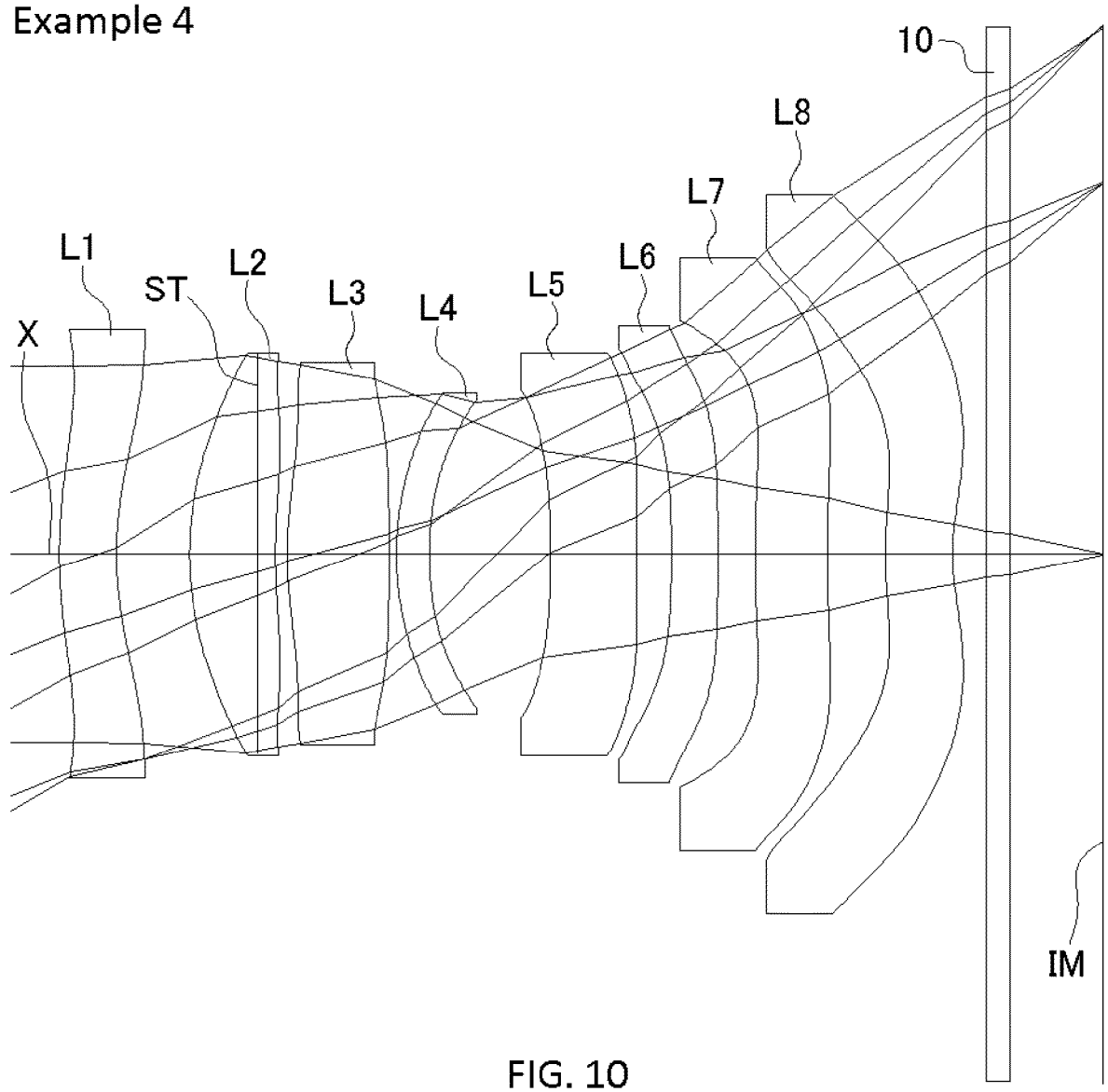
FIG. 10 is a sectional view of a schematic configuration of an imaging lens in Example 4 of the present invention.

FIG. 8 shows spherical aberration (mm), astigmatism (mm), and distortion (%), respectively. FIG. 9 shows a lateral aberration corresponding to the image height ratio H. As shown in FIGS. 8 and 9, according to the imaging lens of the Example 3, aberrations can be properly corrected.

Example 4

The basic lens data is shown below in Table 7.

TABLE 7

| | | f = 8.03 mm Fno = 2.3 ω = 30.1° | | | | |
|---|---|---|---|---|---|---|
| | i | r | d | nd | vd | [mm] |
| | 1* | ∞ | ∞ | | | |
| L1 | 1* | 4.721 | 0.511 | 1.6707 | 19.2 | f1 = −17.730 |
| | 2* | 3.232 | 1.255 | | | |
| | 3(ST) | ∞ | −0.608 | | | |
| L2 | 4* | 2.958 | 0.768 | 1.5445 | 56.4 | f2 = 11.603 |
| | 5* | 5.052 | 0.109 | | | |
| L3 | 6* | 3.457 | 0.905 | 1.5445 | 56.4 | f3 = 5.993 |
| | 7* | −52.812 | 0.067 | | | |
| L4 | 8* | 2.839 | 0.290 | 1.5348 | 55.7 | f4 = 102.797 |
| | 9* | 2.887 | 1.081 | | | |
| L5 | 10* | −12.934 | 0.762 | 1.6707 | 19.2 | f5 = −8.893 |
| | 11* | 11.333 | 0.317 | | | |

TABLE 7-continued

| | | f = 8.03 mm Fno = 2.3 ω = 30.1° | | | | |
|---|---|---|---|---|---|---|
| | i | r | d | nd | νd | [mm] |
| L6 | 12* | −14.097 | 0.412 | 1.5348 | 55.7 | f6 = −102.868 |
| | 13* | −19.146 | 0.341 | | | |
| L7 | 14* | −9161.188 | 0.641 | 1.6707 | 19.2 | f7 = −107.622 |
| | 15* | 72.762 | 0.513 | | | |
| L8 | 16* | 3.733 | 0.601 | 1.5348 | 55.7 | f8 = −11.288 |
| | 17* | 2.177 | 0.300 | | | |
| | 18 | ∞ | 0.210 | 1.5168 | 64.2 | |
| | 19 | ∞ | 0.831 | | | |
| (IM) | | ∞ | | | | | f67=−52.157 mm
R1f=4.721 mm
R1r=3.232 mm
R4r=2.887 mm
R8f=3.733 mm
R8r=2.177 mm
D12=0.647 mm
D45=1.081 mm
D56=0.317 mm
D67=0.341 mm
D78=0.513 mm
T7=0.641 mm
T8=0.601 mm
TL=9.235 mm
Hmax=4.65 mm
Dep=3.465 mm The values of the respective conditional expressions are as follows:

R1f/R1r=1.5
f1/f2=−1.5
D12/f=0.08
f2/f3=1.9
f3/f=0.7
R4r/f=0.4
D45/f=0.13
D56/D67=0.9
T7/T8=1.1
D78/f=0.06
f8/f=−1.4
R8f/f=0.5
R8r/f=0.3
TL/f=1.2
TL/Hmax=2.0
f/Dep=2.3
f4/f5=−11.6
f5/f=−1.1
f67/f=−6.5

Accordingly, the imaging lens according to the Example 4 satisfies the above-described conditional expressions.

Figure 11:
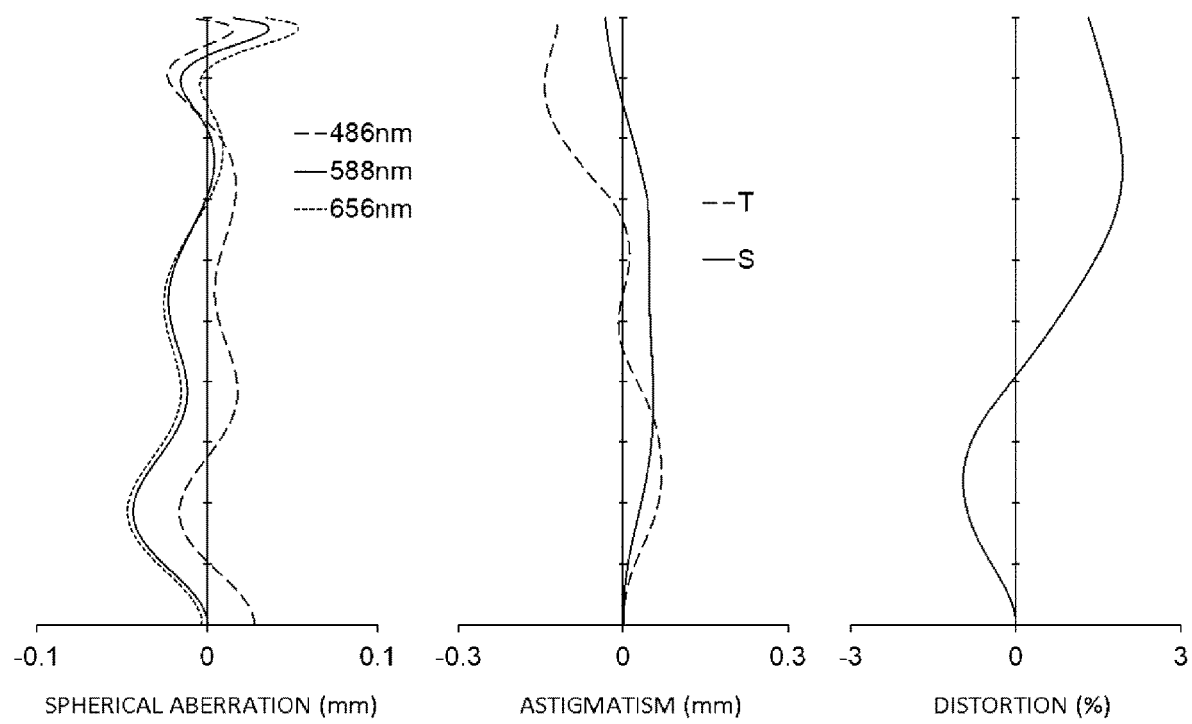
FIG. 11 is an aberration diagram showing spherical aberration, astigmatism, and distortion of the imaging lens of FIG. 10.
Figure 12:
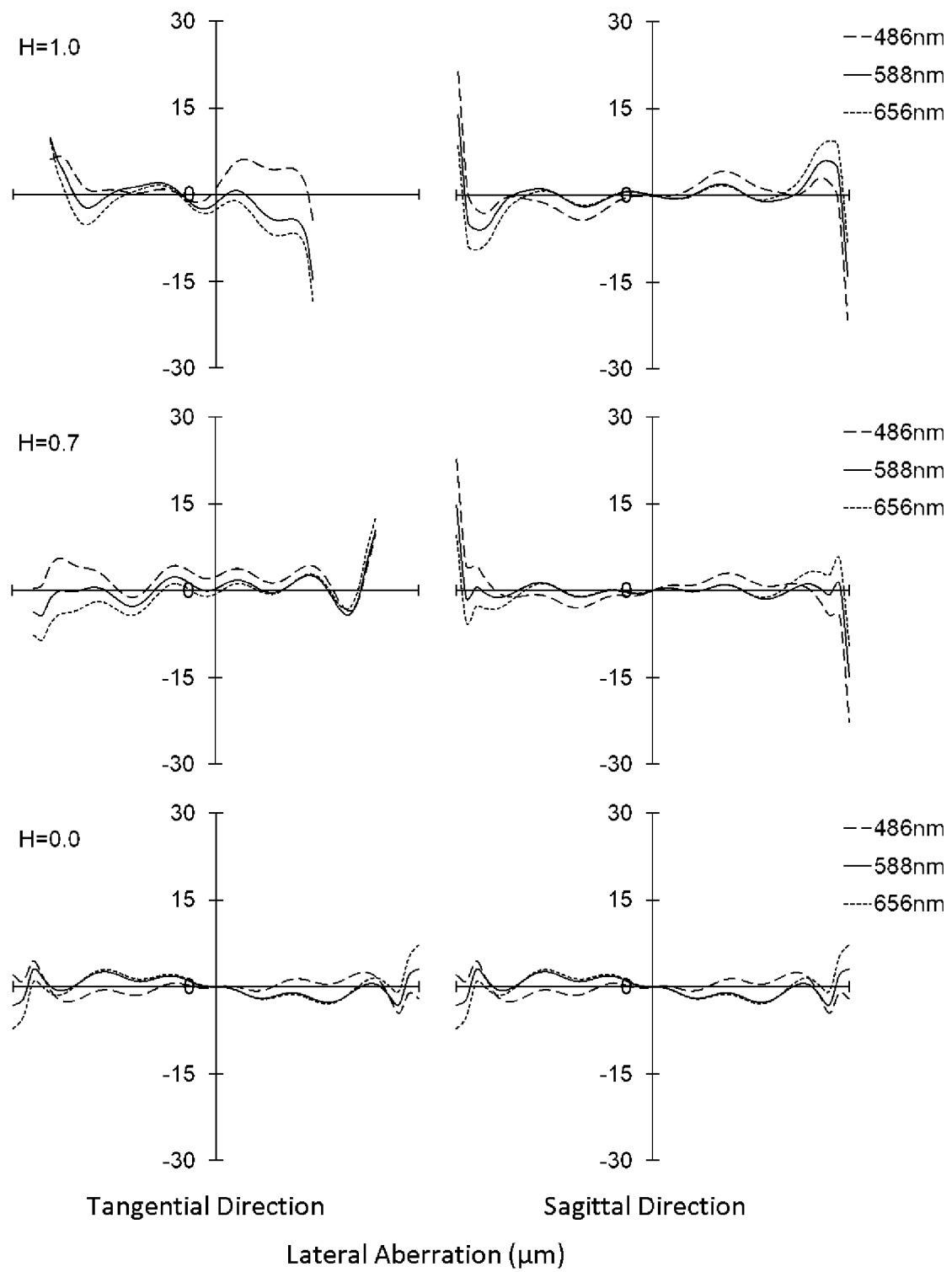
FIG. 12 is an aberration diagram showing a lateral aberration of the imaging lens of FIG. 10.
Figure 13:
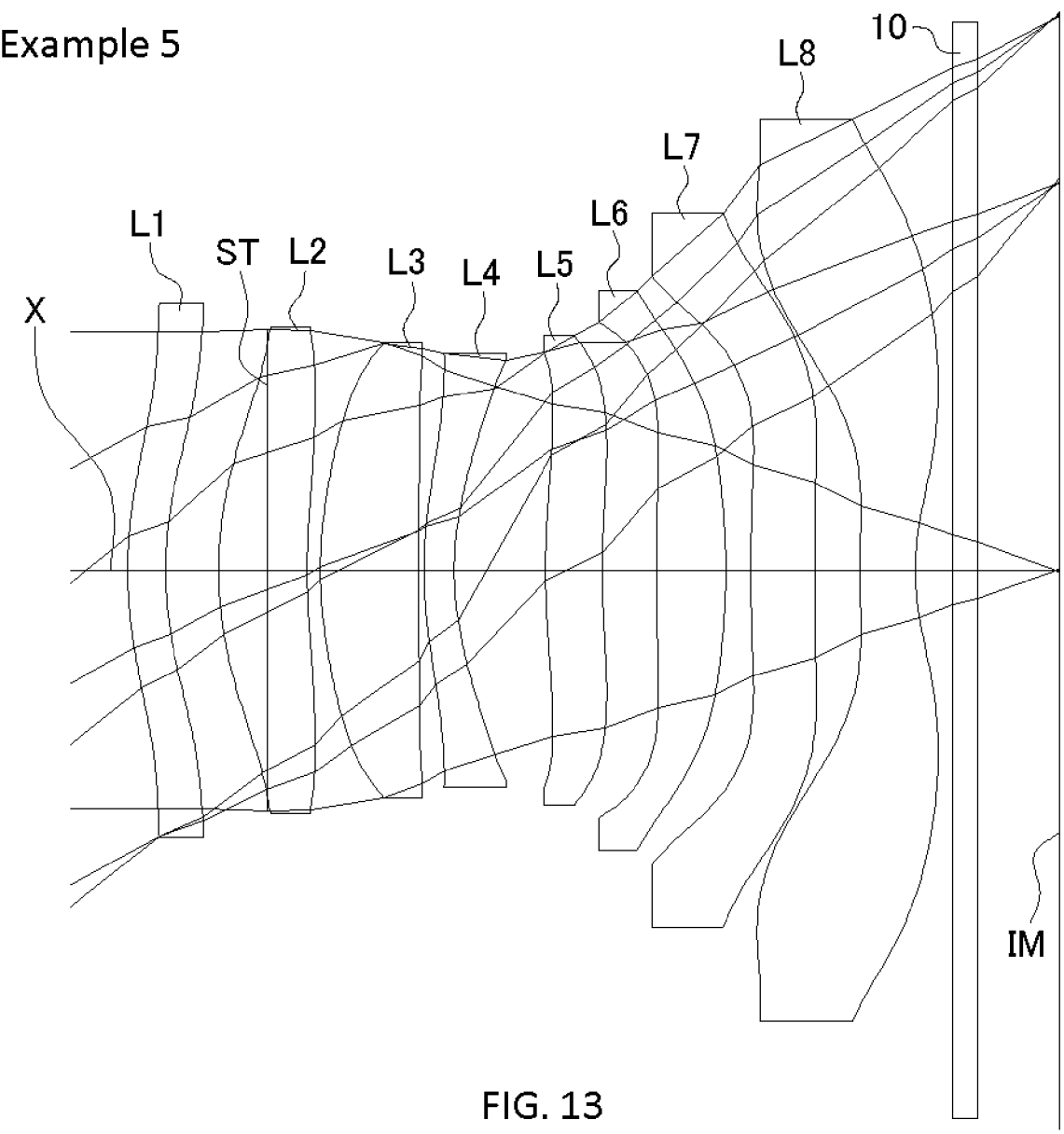
FIG. 13 is a sectional view of a schematic configuration of an imaging lens in Example 5 of the present invention.

FIG. 11 shows spherical aberration (mm), astigmatism (mm), and distortion (%), respectively. FIG. 12 shows a lateral aberration corresponding to the image height ratio H.

TABLE 8

| Aspheric Surface Data | | | | | |
|---|---|---|---|---|---|
| i | k | A4 | A6 | A8 | A10 |
| 1 | 0.000E+00 | −1.857E−02 | −1.953E−03 | −1.073E−03 | 1.009E−03 |
| 2 | 0.000E+00 | −2.322E−02 | −5.964E−03 | 3.559E−03 | −3.094E−03 |
| 4 | −4.222E+00 | 1.175E−02 | −1.640E−03 | 2.425E−03 | −4.044E−03 |
| 5 | −1.000E+02 | −5.478E−03 | −4.383E−02 | 4.742E−02 | −3.017E−02 |
| 6 | −1.662E+01 | −3.170E−02 | 9.821E−03 | −2.147E−02 | 2.005E−02 |
| 7 | 0.000E+00 | −6.909E−03 | −1.633E−02 | −1.202E−02 | 2.527E−02 |
| 8 | 0.000E+00 | 2.168E−03 | 2.838E−02 | −6.319E−02 | 5.756E−02 |
| 9 | 9.275E−01 | 3.110E−03 | 4.308E−02 | −5.755E−02 | 3.900E−02 |
| 10 | 0.000E+00 | −5.839E−02 | 1.707E−02 | 1.682E−03 | −7.393E−03 |
| 11 | 0.000E+00 | −6.018E−02 | −1.738E−02 | 5.909E−02 | −6.730E−02 |
| 12 | 2.400E+01 | −4.194E−02 | 3.431E−03 | −1.889E−02 | 2.020E−02 |
| 13 | 3.824E+01 | 3.058E−02 | −5.563E−02 | 1.116E−02 | 1.206E−02 |
| 14 | 0.000E+00 | 8.993E−02 | −1.015E−01 | 3.929E−02 | −6.512E−03 |
| 15 | 0.000E+00 | 6.415E−02 | −7.227E−02 | 3.210E−02 | −8.544E−03 |
| 16 | −7.442E−01 | −1.465E−01 | 3.656E−02 | −6.204E−03 | 9.506E−04 |
| 17 | −1.249E+01 | −9.026E−02 | 2.777E−02 | −5.748E−03 | 8.346E−04 |

| i | A12 | A14 | A16 | A18 | A20 |
|---|---|---|---|---|---|
| 1 | −3.628E−04 | 8.222E−05 | −1.186E−05 | 1.021E−06 | −3.962E−08 |
| 2 | 2.045E−03 | −7.752E−04 | 1.701E−04 | −2.041E−05 | 1.060E−06 |
| 4 | 2.606E−03 | −8.935E−04 | 1.814E−04 | −2.112E−05 | 1.198E−06 |
| 5 | 1.325E−02 | −3.901E−03 | 7.532E−04 | −8.849E−05 | 4.869E−06 |
| 6 | −9.486E−03 | 2.891E−03 | −5.789E−04 | 7.012E−05 | −4.172E−06 |
| 7 | −1.578E−02 | 5.503E−03 | −1.270E−03 | 2.127E−04 | −2.021E−05 |
| 8 | −2.937E−02 | 9.320E−03 | −1.656E−03 | 1.166E−04 | 2.119E−06 |
| 9 | −1.548E−02 | 2.769E−03 | 2.522E−04 | −2.590E−06 | −4.883E−05 |
| 10 | 4.902E−03 | −2.562E−03 | 1.101E−03 | −2.225E−04 | −1.916E−06 |
| 11 | 4.549E−02 | −1.929E−02 | 5.046E−03 | −7.402E−04 | 4.581E−05 |
| 12 | −1.041E−02 | 3.121E−03 | −4.716E−04 | 2.180E−05 | 6.610E−07 |
| 13 | −9.774E−03 | 3.362E−03 | −6.224E−04 | 6.052E−05 | −2.439E−06 |
| 14 | −7.571E−04 | 5.814E−04 | −1.211E−04 | 1.147E−05 | −3.409E−07 |
| 15 | 1.445E−03 | −1.560E−04 | 1.024E−05 | −3.686E−07 | 6.297E−09 |
| 16 | −1.410E−04 | 1.466E−05 | −8.741E−07 | 3.641E−08 | −1.182E−09 |
| 17 | −8.779E−05 | 6.390E−06 | −2.903E−07 | 7.146E−09 | −7.495E−11 |

As shown in FIGS. 11 and 12, according to the imaging lens of the Example 4, aberrations can be properly corrected.

Example 5

The basic lens data is shown below in Table 9.

TABLE 9

| | | f = 5.64 mm Fno = 1.4 ω = 38.5° | | | | |
|---|---|---|---|---|---|---|
| | i | r | d | nd | vd | [mm] |
| L1 | | ∞ | ∞ | | | |
| | 1* | 3.598 | 0.309 | 1.6707 | 19.2 | f1 = −33.507 |
| | 2* | 2.995 | 0.841 | | | |
| | 3(ST) | ∞ | −0.404 | | | |
| L2 | 4* | 3.164 | 0.726 | 1.5445 | 56.4 | f2 = 13.258 |
| | 5* | 5.176 | 0.107 | | | |
| L3 | 6* | 3.233 | 0.807 | 1.5445 | 56.4 | f3 = 5.912 |
| | 7* | −676.604 | 0.045 | | | |
| L4 | 8* | 3.763 | 0.250 | 1.6707 | 19.2 | f4 = −12.103 |
| | 9* | 2.502 | 0.749 | | | |
| L5 | 10* | 5.836 | 0.462 | 1.6503 | 21.5 | f5 = 101.092 |
| | 11* | 6.205 | 0.447 | | | |
| L6 | 12* | 18.614 | 0.567 | 1.5348 | 55.7 | f6 = 7.241 |
| | 13* | −4.838 | 0.210 | | | |
| L7 | 14* | 217.931 | 0.518 | 1.6707 | 19.2 | f7 = 100.205 |
| | 15* | −97.092 | 0.374 | | | |

TABLE 9-continued

| | | f = 5.64 mm Fno = 1.4 ω = 38.5° | | | | |
|---|---|---|---|---|---|---|
| | i | r | d | nd | vd | [mm] |
| L8 | 16* | 8.518 | 0.454 | 1.5445 | 56.4 | f8 = −4.477 |
| | 17* | 1.859 | 0.300 | | | |
| | 18 | ∞ | 0.210 | 1.5168 | 64.2 | |
| | 19 | ∞ | 0.667 | | | |
| (IM) | | ∞ | | | | | f56=7.009 mm
R1f=3.598 mm
R1r=2.995 mm
R4r=2.502 mm
R8f=8.518 mm
R8r=1.859 mm
D12=0.436 mm
D45=0.749 mm
D56=0.447 mm
D67=0.210 mm
D78=0.374 mm
T7=0.518 mm
T8=0.454 mm
TL=7.567 mm
Hmax=4.48 mm
Dep=3.998 mm

TABLE 10

Aspheric Surface Data

| i | k | A4 | A6 | A8 | A10 |
|---|---|---|---|---|---|
| 1 | 0.000E+00 | −1.948E−02 | −1.727E−03 | −1.073E−03 | 9.994E−04 |
| 2 | 0.000E+00 | −2.318E−02 | −6.038E−03 | 3.496E−03 | −3.106E−03 |
| 4 | −2.987E+00 | 5.632E−03 | −4.058E−03 | 2.882E−03 | −4.025E−03 |
| 5 | −1.000E+02 | 1.135E−02 | −4.621E−02 | 4.730E−02 | −3.002E−02 |
| 6 | −7.382E+00 | −2.371E−02 | 2.384E−02 | −2.266E−02 | 1.922E−02 |
| 7 | 0.000E+00 | 2.790E−02 | −2.096E−02 | −1.228E−02 | 2.471E−02 |
| 8 | 0.000E+00 | −3.284E−02 | 3.089E−02 | −6.451E−02 | 5.847E−02 |
| 9 | −5.081E+00 | −2.095E−02 | 4.359E−02 | −5.630E−02 | 3.963E−02 |
| 10 | 0.000E+00 | −4.855E−02 | 1.492E−02 | 9.433E−04 | −5.725E−03 |
| 11 | 0.000E+00 | −4.440E−02 | −2.247E−02 | 6.009E−02 | −6.733E−02 |
| 12 | 2.400E+01 | −1.154E−03 | −1.129E−03 | −1.910E−02 | 1.963E−02 |
| 13 | 2.259E+00 | 6.658E−02 | −5.792E−02 | 9.878E−03 | 1.220E−02 |
| 14 | 0.000E+00 | 8.386E−02 | −9.813E−02 | 3.910E−02 | −6.546E−03 |
| 15 | 0.000E+00 | 6.923E−02 | −7.426E−02 | 3.214E−02 | −8.517E−03 |
| 16 | 1.514E+00 | −1.338E−01 | 3.607E−02 | −6.174E−03 | 9.889E−04 |
| 17 | −6.675E+00 | −7.322E−02 | 2.456E−02 | −5.459E−03 | 8.383E−04 |

| i | A12 | A14 | A16 | A18 | A20 |
|---|---|---|---|---|---|
| 1 | −3.594E−04 | 8.200E−05 | −1.191E−05 | 1.003E−06 | −3.677E−08 |
| 2 | 2.043E−03 | −7.750E−04 | 1.704E−04 | −2.033E−05 | 1.025E−06 |
| 4 | 2.565E−03 | −9.007E−04 | 1.826E−04 | −2.017E−05 | 9.617E−07 |
| 5 | 1.323E−02 | −3.969E−03 | 7.510E−04 | −7.980E−05 | 3.628E−06 |
| 6 | −9.819E−03 | 3.283E−03 | −7.352E−04 | 1.003E−04 | −6.211E−06 |
| 7 | −1.564E−02 | 5.683E−03 | −1.271E−03 | 1.605E−04 | −8.662E−06 |
| 8 | −2.943E−02 | 9.068E−03 | −1.725E−03 | 1.864E−04 | −8.603E−06 |
| 9 | −1.528E−02 | 2.728E−03 | 9.171E−05 | −1.199E−04 | 1.451E−05 |
| 10 | 4.719E−03 | −2.668E−03 | 1.014E−03 | −2.224E−04 | 2.050E−05 |
| 11 | 4.542E−02 | −1.931E−02 | 5.043E−03 | −7.405E−04 | 4.678E−05 |
| 12 | −1.047E−02 | 3.098E−03 | −4.707E−04 | 2.511E−05 | 6.854E−07 |
| 13 | −9.776E−03 | 3.367E−03 | −6.234E−04 | 6.040E−05 | −2.411E−06 |
| 14 | −7.688E−04 | 5.865E−04 | −1.186E−04 | 1.156E−05 | −4.640E−07 |
| 15 | 1.447E−03 | −1.559E−04 | 1.025E−05 | −3.704E−07 | 5.501E−09 |
| 16 | −1.411E−04 | 1.439E−05 | −9.183E−07 | 3.265E−08 | −4.941E−10 |
| 17 | −8.924E−05 | 6.367E−06 | −2.866E−07 | 7.301E−09 | −7.963E−11 |

The values of the respective conditional expressions are as follows:
R1f/R1r=1.2
f1/f2=−2.5
D12/f=0.08
f2/f3=2.2
f3/f=1.0
R4r/f=0.4
D45/f=0.13
D56/D67=2.1
T7/T8=1.1
D78/f=0.07
f8/f=−0.8
R8f/f=1.5
R8r/f=0.3
TL/f=1.3
TL/Hmax=1.7
f/Dep=1.4
f6/f=1.3
f56/f=1.2

Accordingly, the imaging lens according to the Example 5 satisfies the above-described conditional expressions.

Figure 14:
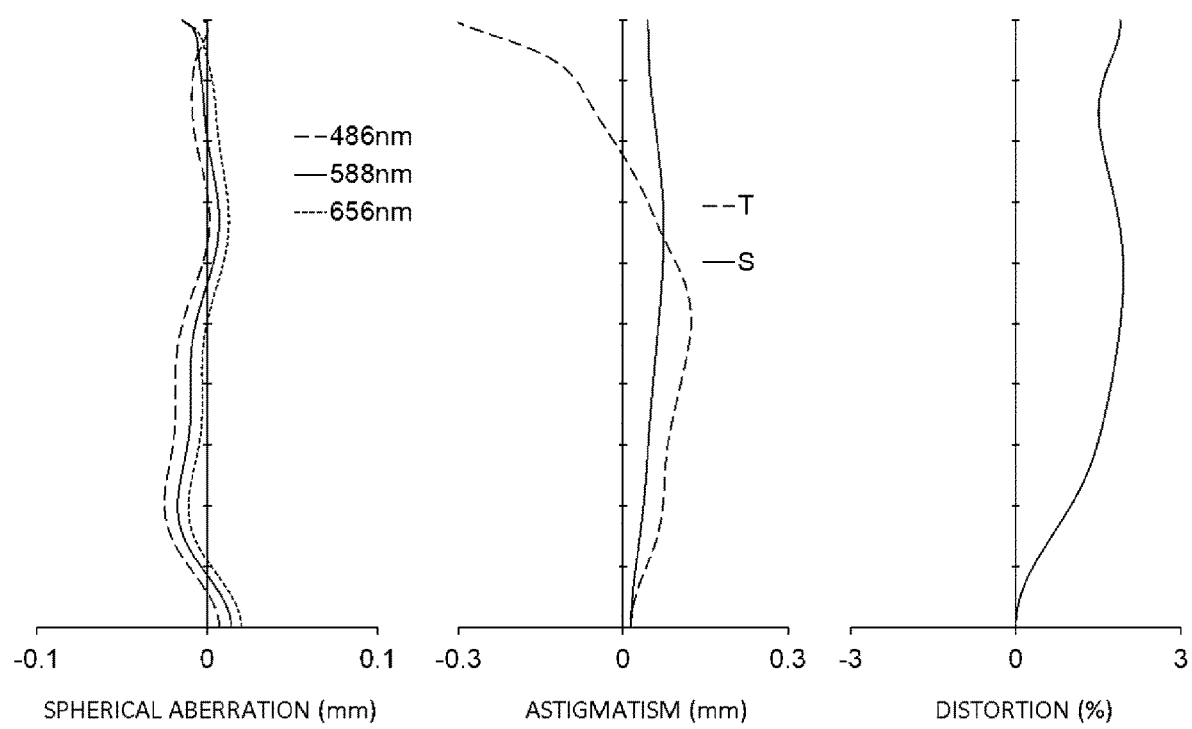
FIG. 14 is an aberration diagram showing spherical aberration, astigmatism, and distortion of the imaging lens of FIG. 13.
Figure 15:
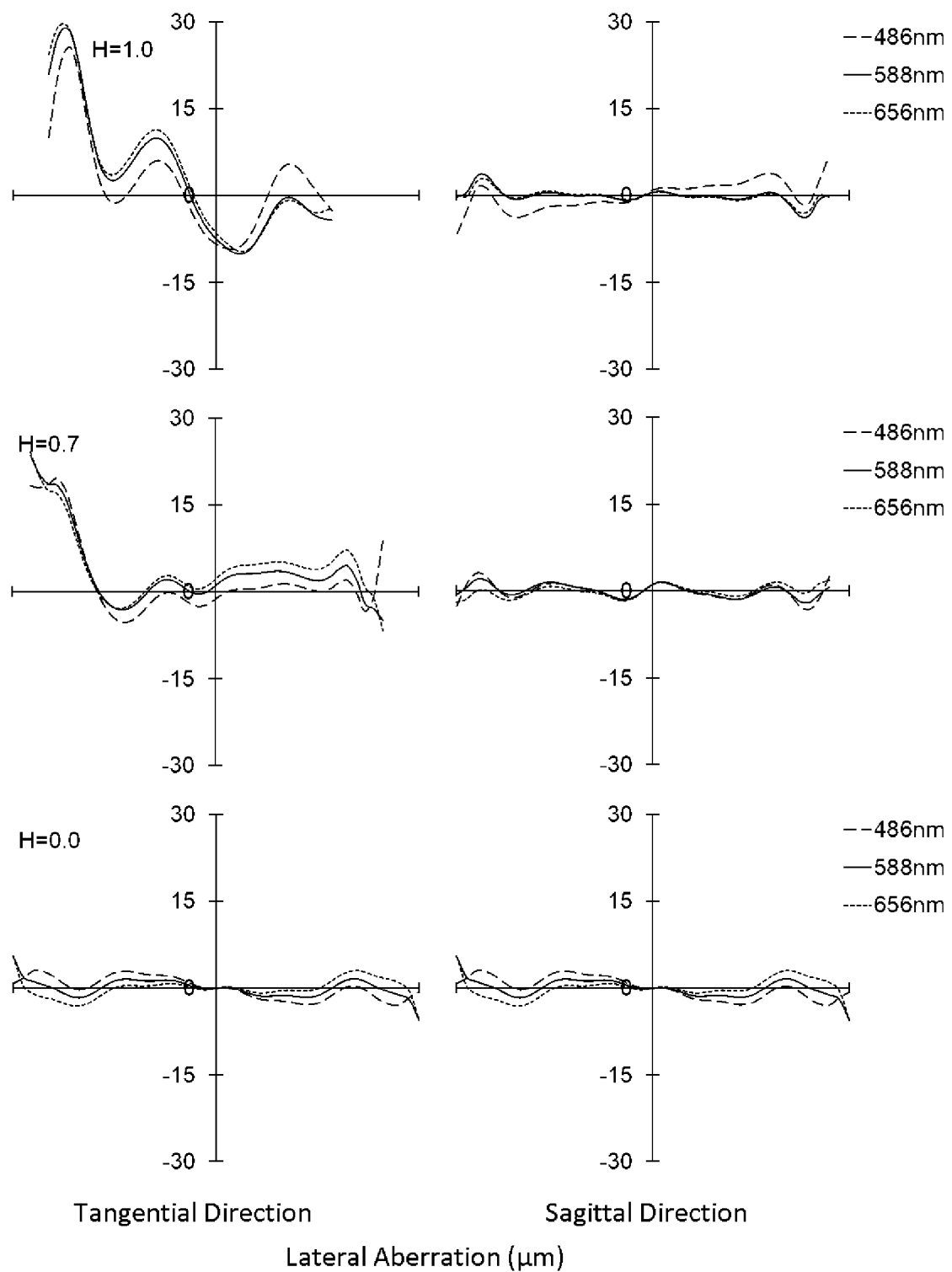
FIG. 15 is an aberration diagram a lateral aberration of the imaging lens of FIG. 13.
Figure 16:
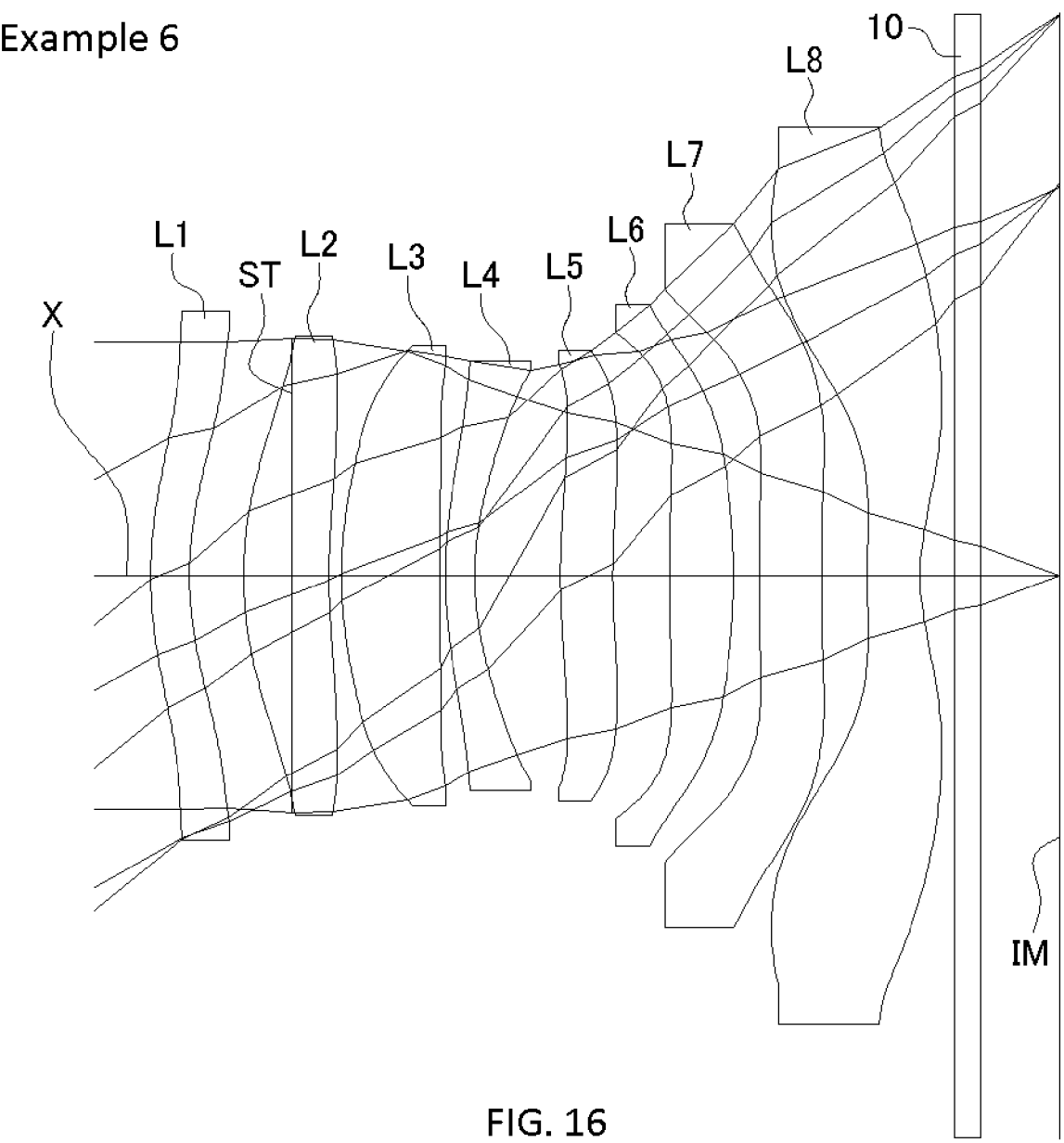
FIG. 16 is a sectional view of a schematic configuration of an imaging lens in Example 6 of the present invention.

FIG. 14 shows spherical aberration (mm), astigmatism (mm), and distortion (%), respectively. FIG. 15 shows a lateral aberration corresponding to the image height ratio H. As shown in FIGS. 14 and 15, according to the imaging lens of the Example 5, aberrations can be properly corrected.

Example 6

The basic lens data is shown below in Table 11.

TABLE 11 f = 5.69 mm Fno = 1.4 ω = 39.0°

|  | i | r | d | nd | vd | [mm] |
|---|---|---|---|---|---|---|
| L1 | 1* | ∞ | ∞ | | | |
| | | 3.569 | 0.327 | 1.6707 | 19.2 | f1 = −35.142 |
| | 2* | 2.986 | 0.854 | | | |
| | 3(ST) | ∞ | −0.403 | | | |

TABLE 11-continued f = 5.69 mm Fno = 1.4 ω = 39.0°

|  | i | r | d | nd | vd | [mm] |
|---|---|---|---|---|---|---|
| L2 | 4* | 3.171 | 0.714 | 1.5445 | 56.4 | f2 = 13.140 |
| | 5* | 5.245 | 0.102 | | | |
| L3 | 6* | 3.245 | 0.826 | 1.5445 | 56.4 | f3 = 5.920 |
| | 7* | −446.171 | 0.043 | | | |
| L4 | 8* | 3.708 | 0.250 | 1.6707 | 19.2 | f4 = −12.641 |
| | 9* | 2.510 | 0.717 | | | |
| L5 | 10* | 6.092 | 0.435 | 1.6503 | 21.5 | f5 = 100.984 |
| | 11* | 6.526 | 0.476 | | | |
| L6 | 12* | 18.534 | 0.535 | 1.5348 | 55.7 | f6 = 7.190 |
| | 13* | −4.803 | 0.219 | | | |
| L7 | 14* | −51.903 | 0.522 | 1.6707 | 19.2 | f7 = −97.803 |
| | 15* | −249.567 | 0.377 | | | |
| L8 | 16* | 8.124 | 0.444 | 1.5445 | 56.4 | f8 = −4.634 |
| | 17* | 1.888 | 0.289 | | | |
| | 18 | ∞ | 0.210 | 1.5168 | 64.2 | |
| | 19 | ∞ | 0.668 | | | |
| (IM) | | ∞ | | | | | f56=6.943 mm
R1f=3.569 mm
R1r=2.986 mm
R4r=2.510 mm
R8f=8.124 mm
R8r=1.888 mm
D12=0.451 mm
D45=0.717 mm
D56=0.476 mm
D67=0.219 mm
D78=0.377 mm
T7=0.522 mm
T8=0.444 mm
TL=7.532 mm
Hmax=4.60 mm
Dep=4.020 mm

TABLE 12

Aspheric Surface Data

| i | k | A4 | A6 | A8 | A10 |
|---|---|---|---|---|---|
| 1 | 0.000E+00 | −1.990E−02 | −1.703E−03 | −1.065E−03 | 9.999E−04 |
| 2 | 0.000E+00 | −2.301E−02 | −5.993E−03 | 3.499E−03 | −3.104E−03 |
| 4 | −3.623E+00 | 6.550E−03 | −3.665E−03 | 2.844E−03 | −4.051E−03 |
| 5 | −1.000E+02 | 1.139E−02 | −4.598E−02 | 4.735E−02 | −3.003E−02 |
| 6 | −7.378E+00 | −2.184E−02 | 2.345E−02 | −2.256E−02 | 1.923E−02 |
| 7 | 0.000E+00 | 2.607E−02 | −2.064E−02 | −1.199E−02 | 2.474E−02 |
| 8 | 0.000E+00 | −3.221E−02 | 3.262E−02 | −6.462E−02 | 5.845E−02 |
| 9 | −5.551E+00 | −1.519E−02 | 4.378E−02 | −5.636E−02 | 3.970E−02 |
| 10 | 0.000E+00 | −4.502E−02 | 1.405E−02 | 7.548E−04 | −5.688E−03 |
| 11 | 0.000E+00 | −3.994E−02 | −2.360E−02 | 6.026E−02 | −6.730E−02 |
| 12 | 2.400E+01 | −1.436E−03 | −6.798E−04 | −1.903E−02 | 1.959E−02 |
| 13 | 2.283E+00 | 6.753E−02 | −5.777E−02 | 9.722E−03 | 1.220E−02 |
| 14 | 0.000E+00 | 8.547E−02 | −9.852E−02 | 3.914E−02 | −6.531E−03 |
| 15 | 0.000E+00 | 6.863E−02 | −7.404E−02 | 3.215E−02 | −8.519E−03 |
| 16 | 1.480E+00 | −1.336E−01 | 3.613E−02 | −6.180E−03 | 9.884E−04 |
| 17 | −7.194E+00 | −7.302E−02 | 2.457E−02 | −5.452E−03 | 8.384E−04 |

| i | A12 | A14 | A16 | A18 | A20 |
|---|---|---|---|---|---|
| 1 | −3.593E−04 | 8.199E−05 | −1.191E−05 | 1.005E−06 | −3.759E−08 |
| 2 | 2.044E−03 | −7.751E−04 | 1.704E−04 | −2.033E−05 | 1.024E−06 |
| 4 | 2.570E−03 | −8.986E−04 | 1.826E−04 | −2.031E−05 | 9.699E−07 |
| 5 | 1.323E−02 | −3.968E−03 | 7.510E−04 | −7.980E−05 | 3.622E−06 |
| 6 | −9.816E−03 | 3.283E−03 | −7.353E−04 | 1.003E−04 | −6.217E−06 |
| 7 | −1.565E−02 | 5.683E−03 | −1.271E−03 | 1.603E−04 | −8.622E−06 |
| 8 | −2.943E−02 | 9.065E−03 | −1.725E−03 | 1.866E−04 | −8.605E−06 |

TABLE 12-continued

| | | Aspheric Surface Data | | |
|---|---|---|---|---|
| 9 | −1.529E−02 | 2.717E−03 | 9.145E−05 | −1.184E−04 | 1.448E−05 |
| 10 | 4.736E−03 | −2.669E−03 | 1.013E−03 | −2.224E−04 | 2.062E−05 |
| 11 | 4.540E−02 | −1.931E−02 | 5.044E−03 | −7.400E−04 | 4.676E−05 |
| 12 | −1.048E−02 | 3.098E−03 | −4.704E−04 | 2.518E−05 | 7.033E−07 |
| 13 | −9.774E−03 | 3.368E−03 | −6.233E−04 | 6.041E−05 | −2.417E−06 |
| 14 | −7.665E−04 | 5.864E−04 | −1.186E−04 | 1.155E−05 | −4.646E−07 |
| 15 | 1.447E−03 | −1.560E−04 | 1.025E−05 | −3.702E−07 | 5.482E−09 |
| 16 | −1.411E−04 | 1.439E−05 | −9.181E−07 | 3.266E−08 | −4.956E−10 |
| 17 | −8.926E−05 | 6.366E−06 | −2.866E−07 | 7.302E−09 | −7.956E−11 |

The values of the respective conditional expressions are as follows:

R1f/R1r=1.2
f1/f2=−2.7
D12/f=0.08
f2/f3=2.2
f3/f=1.0
R4r/f=0.4
D45/f=0.13
D56/D67=2.2
T7/T8=1.2
D78/f=0.07
f8/f=−0.8
R8f/f=1.4
R8r/f=0.3
TL/f=1.3
TL/Hmax=1.6
f/Dep=1.4
f6/f=1.3
f56/f=1.2

Accordingly, the imaging lens according to the Example 6 satisfies the above-described conditional expressions.

Figure 17:
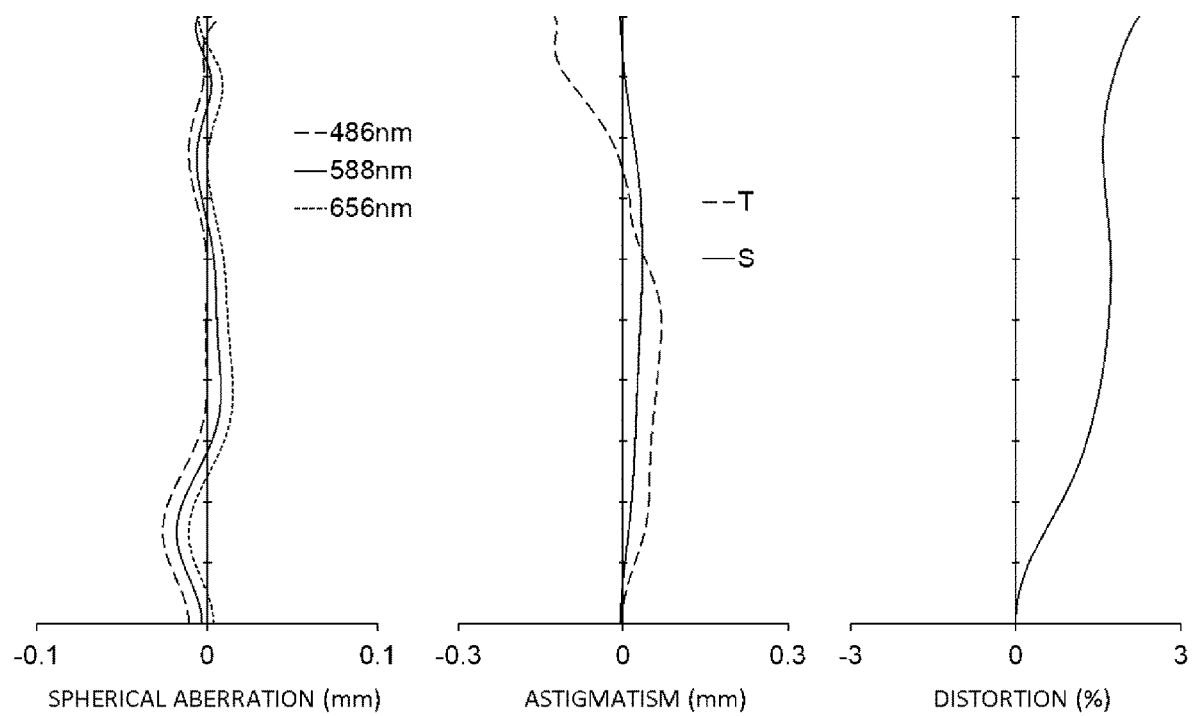
FIG. 17 is an aberration diagram showing spherical aberration, astigmatism, and distortion of the imaging lens of FIG. 16.
Figure 18:
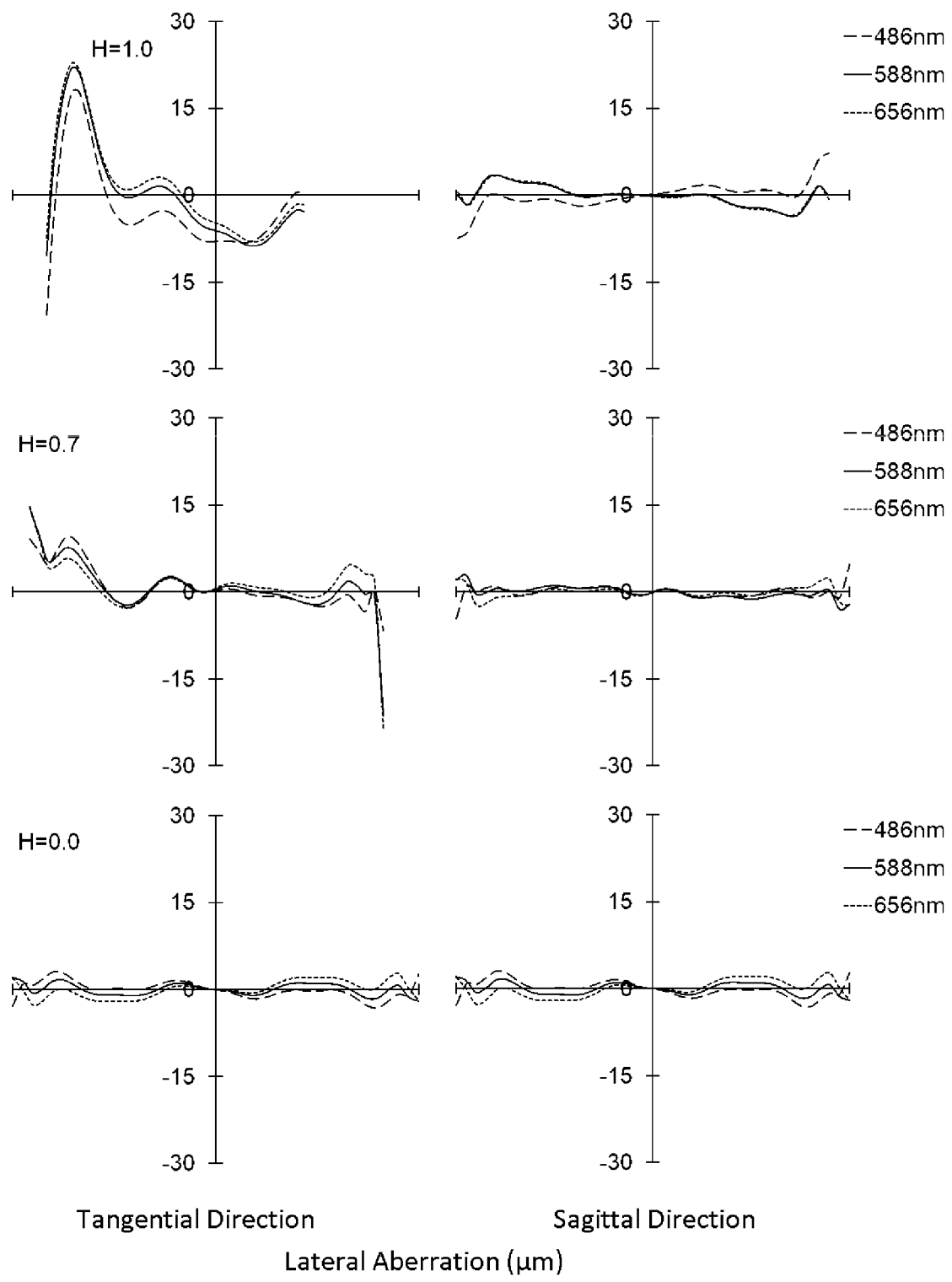
FIG. 18 is an aberration diagram showing a lateral aberration of the imaging lens of FIG. 16.
Figure 19:
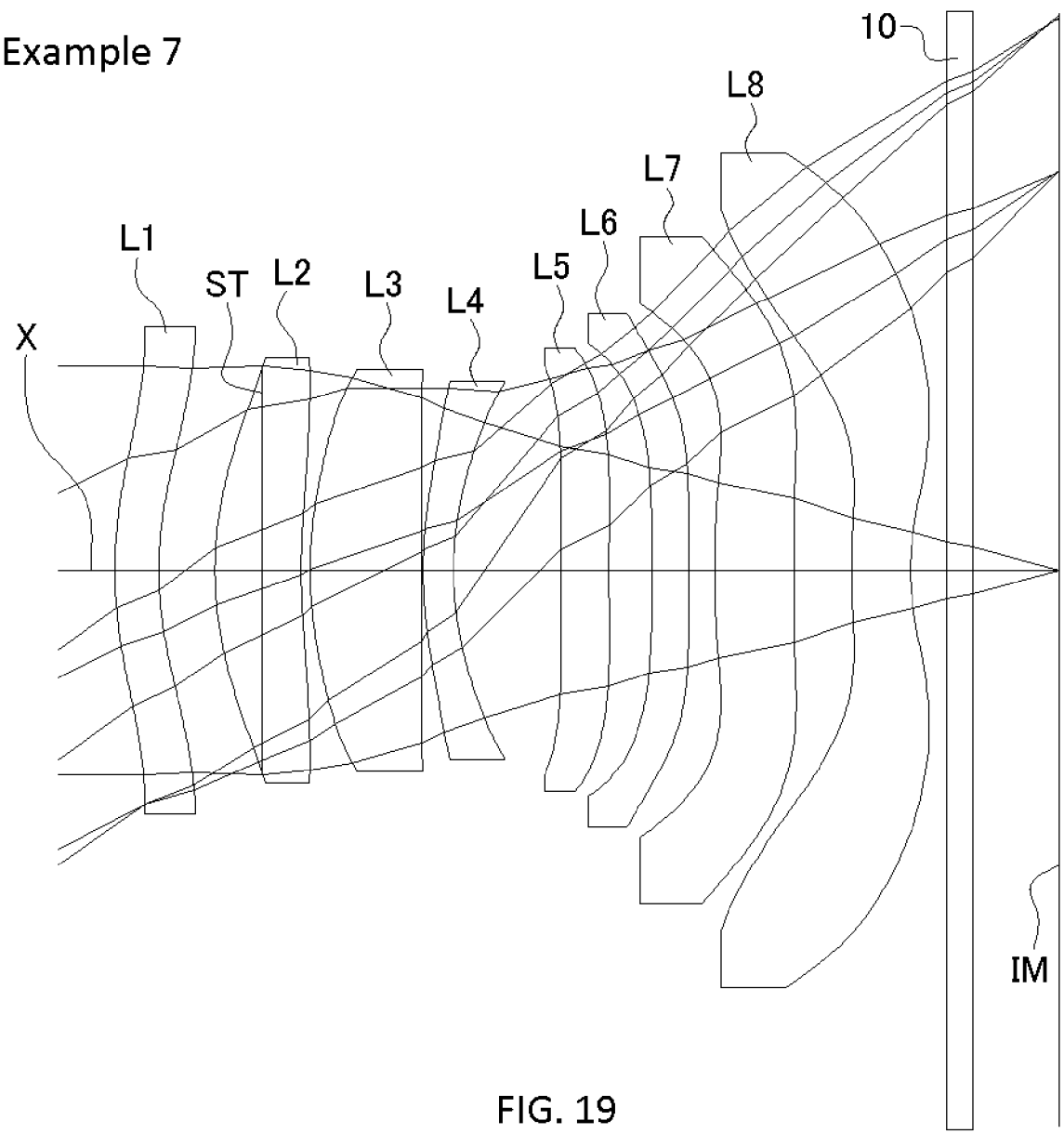
FIG. 19 is a sectional view of a schematic configuration of an imaging lens in Example 7 of the present invention.

FIG. 17 shows spherical aberration (mm), astigmatism (mm), and distortion (%), respectively. FIG. 18 shows a lateral aberration corresponding to the image height ratio H. As shown in FIGS. 17 and 18, according to the imaging lens of the Example 6, aberrations can be properly corrected.

Example 7

The basic lens data is shown below in Table 13.

TABLE 13

| | | f = 6.29 mm Fno = 1.8 ω = 35.5° | | | | |
|---|---|---|---|---|---|---|
| | i | r | d | nd | vd | [mm] |
| L1 | 1* | ∞ | ∞ | | | |
| | | 3.535 | 0.358 | 1.6707 | 19.2 | f1 = −38.714 |
| | 2* | 2.985 | 0.853 | | | |
| | 3(ST) | ∞ | −0.389 | | | |

TABLE 13-continued

| | | f = 6.29 mm Fno = 1.8 ω = 35.5° | | | | |
|---|---|---|---|---|---|---|
| | i | r | d | nd | vd | [mm] |
| L2 | 4* | 3.094 | 0.709 | 1.5445 | 56.4 | f2 = 12.229 |
| | 5* | 5.314 | 0.072 | | | |
| L3 | 6* | 3.132 | 0.916 | 1.5445 | 56.4 | f3 = 5.691 |
| | 7* | −263.456 | 0.014 | | | |
| L4 | 8* | 3.670 | 0.250 | 1.6707 | 19.2 | f4 = −13.555 |
| | 9* | 2.543 | 0.881 | | | |
| L5 | 10* | 16.842 | 0.396 | 1.6503 | 21.5 | f5 = 113.857 |
| | 11* | 21.598 | 0.359 | | | |
| L6 | 12* | −18.277 | 0.300 | 1.5348 | 55.7 | f6 = −99.854 |
| | 13* | −27.946 | 0.210 | | | |
| L7 | 14* | 12.335 | 0.650 | 1.6707 | 19.2 | f7 = 18.115 |
| | 15* | −796.136 | 0.478 | | | |
| L8 | 16* | 4.883 | 0.482 | 1.5445 | 56.4 | f8 = −5.770 |
| | 17* | 1.845 | 0.300 | | | |
| | 18 | ∞ | 0.210 | 1.5168 | 64.2 | |
| | 19 | ∞ | 0.713 | | | |
| (IM) | | ∞ | | | | |

R1f=3.535 mm
R1r=2.985 mm
R4r=2.543 mm
R8f=4.883 mm
R8r=1.845 mm
D12=0.464 mm
D45=0.881 mm
D56=0.359 mm
D67=0.210 mm
D78=0.478 mm
T7=0.650 mm
T8=0.482 mm
TL=7.689 mm
Hmax=4.48 mm
Dep=3.424 mm

TABLE 14

| | | Aspheric Surface Data | | | |
|---|---|---|---|---|---|
| i | k | A4 | A6 | A8 | A10 |
| 1 | 0.000E+00 | −1.977E−02 | −1.720E−03 | −1.113E−03 | 9.964E−04 |
| 2 | 0.000E+00 | −2.292E−02 | −6.076E−03 | 3.509E−03 | −3.110E−03 |
| 4 | −2.744E+00 | 7.156E−03 | −4.365E−03 | 3.127E−03 | −4.035E−03 |
| 5 | −1.000E+02 | 1.264E−02 | −4.618E−02 | 4.729E−02 | −2.989E−02 |
| 6 | −6.332E+00 | −2.181E−02 | 2.427E−02 | −2.283E−02 | 1.897E−02 |
| 7 | 0.000E+00 | 2.398E−02 | −2.053E−02 | −1.212E−02 | 2.477E−02 |
| 8 | 0.000E+00 | −3.070E−02 | 3.175E−02 | −6.400E−02 | 5.858E−02 |

TABLE 14-continued

| | | Aspheric Surface Data | | |
|---|---|---|---|---|
| 9 | −4.281E+00 | −1.710E−02 | 4.544E−02 | −5.586E−02 | 3.961E−02 |
| 10 | 0.000E+00 | −4.101E−02 | 1.291E−02 | 5.504E−04 | −5.734E−03 |
| 11 | 0.000E+00 | −3.170E−02 | −2.466E−02 | 5.981E−02 | −6.729E−02 |
| 12 | 0.000E+00 | −1.129E−02 | 1.650E−04 | −1.935E−02 | 1.965E−02 |
| 13 | 0.000E+00 | 2.916E−02 | −5.543E−02 | 1.044E−02 | 1.225E−02 |
| 14 | 0.000E+00 | 7.378E−02 | −9.799E−02 | 3.939E−02 | −6.552E−03 |
| 15 | 0.000E+00 | 6.938E−02 | −7.390E−02 | 3.208E−02 | −8.522E−03 |
| 16 | −3.491E+00 | −1.399E−01 | 3.585E−02 | −6.161E−03 | 9.909E−04 |
| 17 | −7.203E+00 | −8.144E−02 | 2.526E−02 | −5.474E−03 | 8.373E−04 |

| i | A12 | A14 | A16 | A18 | A20 |
|---|---|---|---|---|---|
| 1 | −3.595E−04 | 8.184E−05 | −1.186E−05 | 1.029E−06 | −3.923E−08 |
| 2 | 2.043E−03 | −7.757E−04 | 1.706E−04 | −2.031E−05 | 1.029E−06 |
| 4 | 2.567E−03 | −8.999E−04 | 1.816E−04 | −2.046E−05 | 1.068E−06 |
| 5 | 1.317E−02 | −3.966E−03 | 7.542E−04 | −8.154E−05 | 3.911E−06 |
| 6 | −9.435E−03 | 2.935E−03 | −5.806E−04 | 6.887E−05 | −4.103E−06 |
| 7 | −1.563E−02 | 5.688E−03 | −1.268E−03 | 1.598E−04 | −9.812E−06 |
| 8 | −2.942E−02 | 9.078E−03 | −1.725E−03 | 1.846E−04 | −9.067E−06 |
| 9 | −1.526E−02 | 2.739E−03 | 9.482E−05 | −1.202E−04 | 1.417E−05 |
| 10 | 4.722E−03 | −2.657E−03 | 1.019E−03 | −2.215E−04 | 1.977E−05 |
| 11 | 4.543E−02 | −1.930E−02 | 5.043E−03 | −7.406E−04 | 4.685E−05 |
| 12 | −1.044E−02 | 3.104E−03 | −4.724E−04 | 2.461E−05 | 7.088E−07 |
| 13 | −9.783E−03 | 3.365E−03 | −6.238E−04 | 6.037E−05 | −2.396E−06 |
| 14 | −7.740E−04 | 5.850E−04 | −1.187E−04 | 1.157E−05 | −4.529E−07 |
| 15 | 1.447E−03 | −1.560E−04 | 1.025E−05 | −3.700E−07 | 5.596E−09 |
| 16 | −1.410E−04 | 1.439E−05 | −9.185E−07 | 3.259E−08 | −4.961E−10 |
| 17 | −8.927E−05 | 6.366E−06 | −2.865E−07 | 7.247E−09 | −7.625E−11 |

The values of the respective conditional expressions are as follows:
R1f/R1r=1.2
f1/f2=−3.2
D12/f=0.07
f2/f3=2.1
f3/f=0.9
R4r/f=0.4
D45/f=0.14
D56/D67=1.7
T7/T8=1.3
D78/f=0.08
f8/f=−0.9
R8f/f=0.8
R8r/f=0.3
TL/f=1.2
TL/Hmax=1.7
f/Dep=1.8

Accordingly, the imaging lens according to the Example 7 satisfies the above-described conditional expressions.

Figure 20:
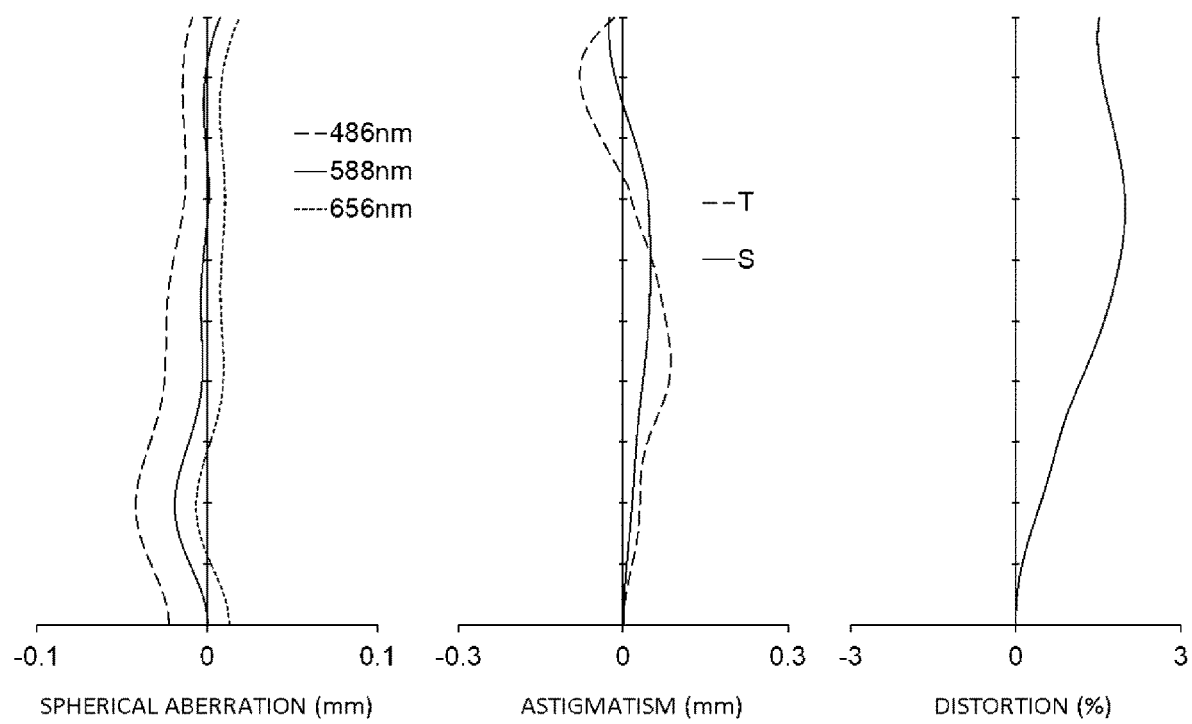
FIG. 20 is an aberration diagram showing spherical aberration, astigmatism, and distortion of the imaging lens of FIG. 19.
Figure 21:
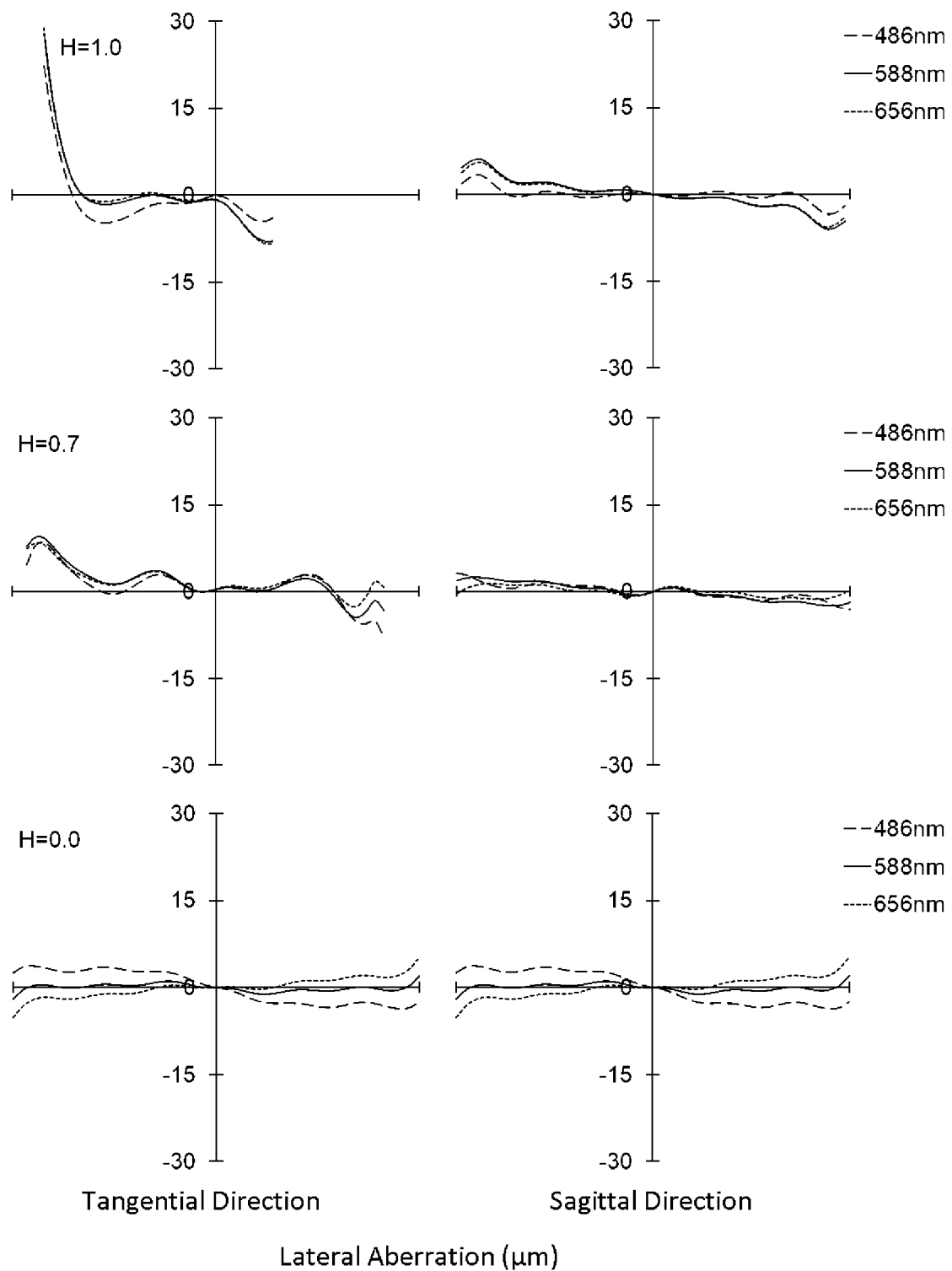
FIG. 21 is an aberration diagram showing a lateral aberration of the imaging lens of FIG. 19.
Figure 22:
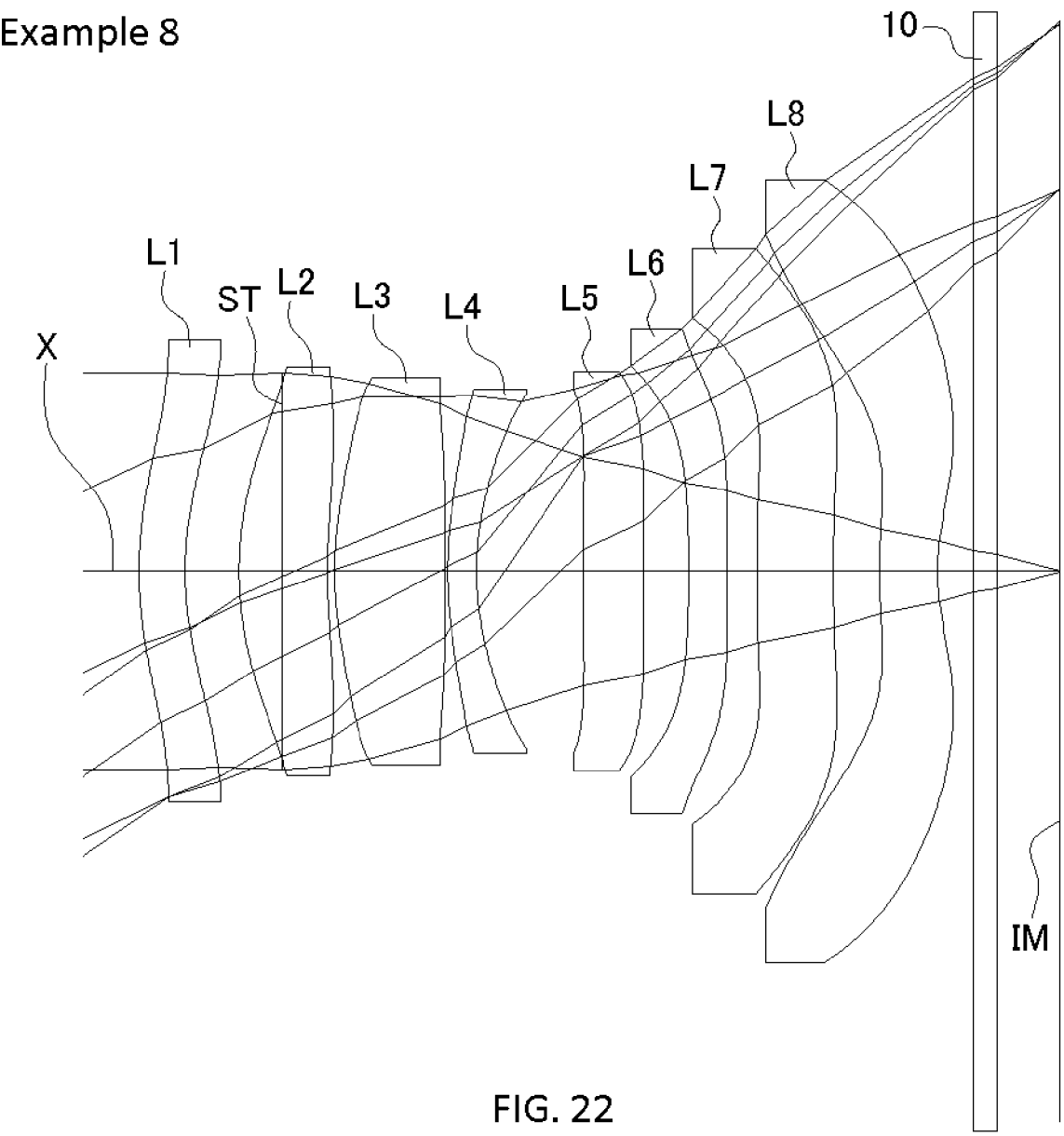
FIG. 22 is a sectional view of a schematic configuration of an imaging lens in Example 8 of the present invention.

FIG. 20 shows spherical aberration (mm), astigmatism (mm), and distortion (%), respectively. FIG. 21 shows a lateral aberration corresponding to the image height ratio H. As shown in FIGS. 20 and 21, according to the imaging lens of the Example 7, aberrations can be properly corrected.

Example 8

The basic lens data is shown below in Table 15.

TABLE 15

| | | f = 6.61 mm Fno = 1.9 ω = 34.8° | | | | |
|---|---|---|---|---|---|---|
| | i | r | d | nd | vd | [mm] |
| L1 | 1* | ∞ | ∞ | | | |
| | | 3.511 | 0.398 | 1.6707 | 19.2 | f1 = −41.926 |
| | 2* | 2.980 | 0.836 | | | |
| | 3(ST) | ∞ | −0.376 | | | |

TABLE 15-continued

| | | f = 6.61 mm Fno = 1.9 ω = 34.8° | | | | |
|---|---|---|---|---|---|---|
| | i | r | d | nd | vd | [mm] |
| L2 | 4* | 3.073 | 0.757 | 1.5445 | 56.4 | f2 = 11.966 |
| | 5* | 5.313 | 0.061 | | | |
| L3 | 6* | 3.107 | 0.943 | 1.5445 | 56.4 | f3 = 5.648 |
| | 7* | −265.412 | 0.026 | | | |
| L4 | 8* | 3.607 | 0.250 | 1.6707 | 19.2 | f4 = −14.050 |
| | 9* | 2.536 | 0.909 | | | |
| L5 | 10* | 15.986 | 0.521 | 1.6503 | 21.5 | f5 = 80.390 |
| | 11* | 22.731 | 0.386 | | | |
| L6 | 12* | −18.398 | 0.331 | 1.5348 | 55.7 | f6 = −100.528 |
| | 13* | −28.144 | 0.257 | | | |
| L7 | 14* | −413.646 | 0.657 | 1.6707 | 19.2 | f7 = −104.039 |
| | 15* | 83.999 | 0.390 | | | |
| L8 | 16* | 4.478 | 0.500 | 1.5445 | 56.4 | f8 = −6.327 |
| | 17* | 1.870 | 0.300 | | | |
| | 18 | ∞ | 0.210 | 1.5168 | 64.2 | |
| | 19 | ∞ | 0.531 | | | |
| (IM) | | ∞ | | | | | f67=−50.825 mm
R1f=3.511 mm
R1r=2.980 mm
R4r=2.536 mm
R8f=4.478 mm
R8r=1.870 mm
D12=0.460 mm
D45=0.909 mm
D56=0.386 mm
D67=0.257 mm
D78=0.390 mm
T7=0.657 mm
T8=0.500 mm
TL=7.816 mm
Hmax=4.60 mm
Dep=3.489 mm

TABLE 16

Aspheric Surface Data

| i | k | A4 | A6 | A8 | A10 |
|---|---|---|---|---|---|
| 1 | 0.000E+00 | −1.966E−02 | −1.733E−03 | −1.116E−03 | 9.966E−04 |
| 2 | 0.000E+00 | −2.298E−02 | −6.102E−03 | 3.512E−03 | −3.104E−03 |
| 4 | −2.544E+00 | 7.875E−03 | −3.746E−03 | 2.936E−03 | −4.121E−03 |
| 5 | −1.000E+02 | 7.204E−03 | −4.595E−02 | 4.705E−02 | −3.010E−02 |
| 6 | −8.194E+00 | −2.531E−02 | 2.119E−02 | −2.369E−02 | 1.966E−02 |
| 7 | 0.000E+00 | 2.605E−03 | −1.370E−02 | −1.113E−02 | 2.406E−02 |
| 8 | 0.000E+00 | −4.244E−02 | 3.816E−02 | −6.352E−02 | 5.819E−02 |
| 9 | −4.474E+00 | −1.379E−02 | 4.613E−02 | −5.579E−02 | 3.937E−02 |
| 10 | 0.000E+00 | −2.918E−02 | 7.880E−03 | 5.528E−04 | −5.484E−03 |
| 11 | 0.000E+00 | −2.281E−02 | −2.799E−02 | 6.022E−02 | −6.733E−02 |
| 12 | 0.000E+00 | −3.316E−02 | 3.677E−03 | −1.900E−02 | 1.944E−02 |
| 13 | 0.000E+00 | 3.172E−02 | −5.518E−02 | 1.050E−02 | 1.225E−02 |
| 14 | 0.000E+00 | 9.067E−02 | −1.001E−01 | 3.955E−02 | −6.532E−03 |
| 15 | 0.000E+00 | 7.004E−02 | −7.360E−02 | 3.203E−02 | −8.520E−03 |
| 16 | −1.383E+00 | −1.399E−01 | 3.569E−02 | −6.165E−03 | 9.907E−04 |
| 17 | −9.175E+00 | −8.272E−02 | 2.568E−02 | −5.490E−03 | 8.362E−04 |

| i | A12 | A14 | A16 | A18 | A20 |
|---|---|---|---|---|---|
| 1 | −3.590E−04 | 8.182E−05 | −1.184E−05 | 1.030E−06 | −3.970E−08 |
| 2 | 2.043E−03 | −7.752E−04 | 1.706E−04 | −2.030E−05 | 1.030E−06 |
| 4 | 2.535E−03 | −9.002E−04 | 1.834E−04 | −1.829E−05 | 6.324E−07 |
| 5 | 1.321E−02 | −3.948E−03 | 7.570E−04 | −8.198E−05 | 3.704E−06 |
| 6 | −9.421E−03 | 2.883E−03 | −5.818E−04 | 7.648E−05 | −5.172E−06 |
| 7 | −1.582E−02 | 5.637E−03 | −1.219E−03 | 1.797E−04 | −1.554E−05 |
| 8 | −2.964E−02 | 9.037E−03 | −1.738E−03 | 2.437E−04 | −2.201E−05 |
| 9 | −1.530E−02 | 2.743E−03 | 1.038E−04 | −1.180E−04 | 1.513E−05 |
| 10 | 4.742E−03 | −2.665E−03 | 1.011E−03 | −2.284E−04 | 2.156E−05 |
| 11 | 4.540E−02 | −1.930E−02 | 5.043E−03 | −7.405E−04 | 4.680E−05 |
| 12 | −1.047E−02 | 3.118E−03 | −4.692E−04 | 2.462E−05 | 6.424E−07 |
| 13 | −9.781E−03 | 3.365E−03 | −6.238E−04 | 6.035E−05 | −2.392E−06 |
| 14 | −7.781E−04 | 5.842E−04 | −1.188E−04 | 1.160E−05 | −4.539E−07 |
| 15 | 1.447E−03 | −1.559E−04 | 1.025E−05 | −3.701E−07 | 5.532E−09 |
| 16 | −1.410E−04 | 1.439E−05 | −9.178E−07 | 3.262E−08 | −5.005E−10 |
| 17 | −8.927E−05 | 6.366E−06 | −2.863E−07 | 7.263E−09 | −7.628E−11 |

The values of the respective conditional expressions are as follows:

R1f/R1r=1.2 f1/f2=−3.5

D12/f=0.07 f2/f3=2.1 f3/f=0.9

R4r/f=0.4

D45/f=0.14

D56/D67=1.5

T7/T8=1.3

D78/f=0.06 f8/f=−1.0

R8f/f=0.7

R8r/f=0.3

TL/f=1.2

TL/Hmax=1.7 f/Dep=1.9 f67/f=−7.7

Accordingly, the imaging lens according to the Example 8 satisfies the above-described conditional expressions.

Figure 23:
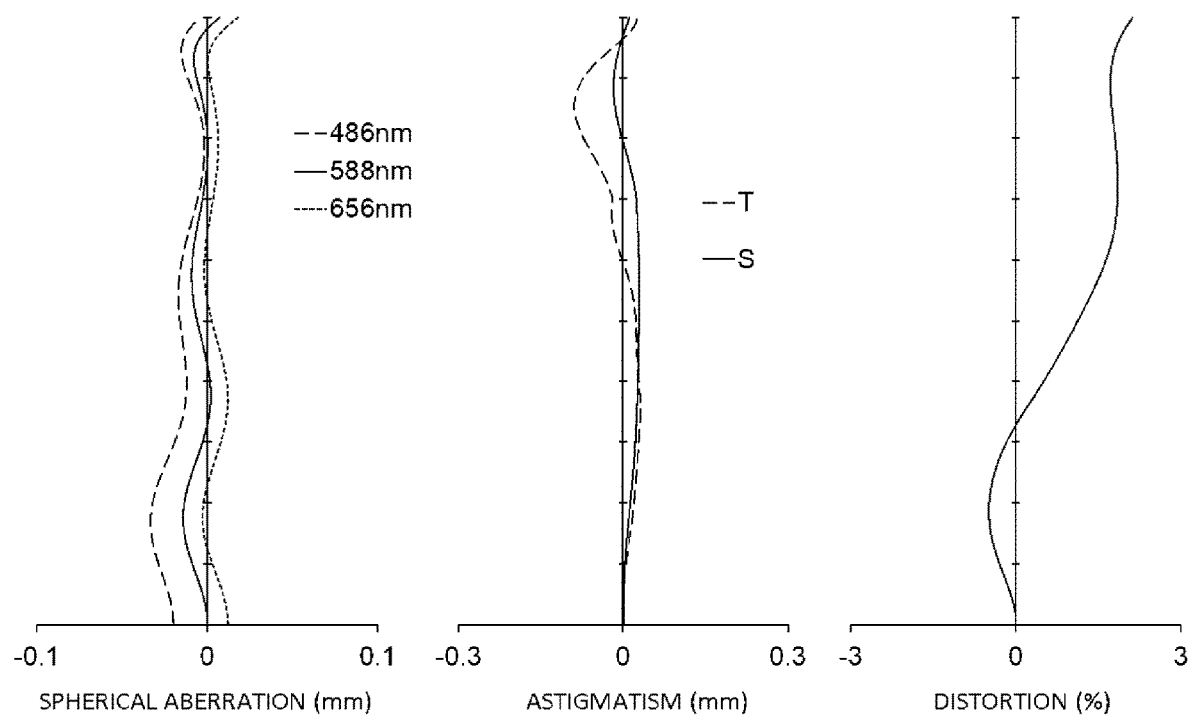
FIG. 23 is an aberration diagram showing spherical aberration, astigmatism, and distortion of the imaging lens of FIG. 22.
Figure 24:
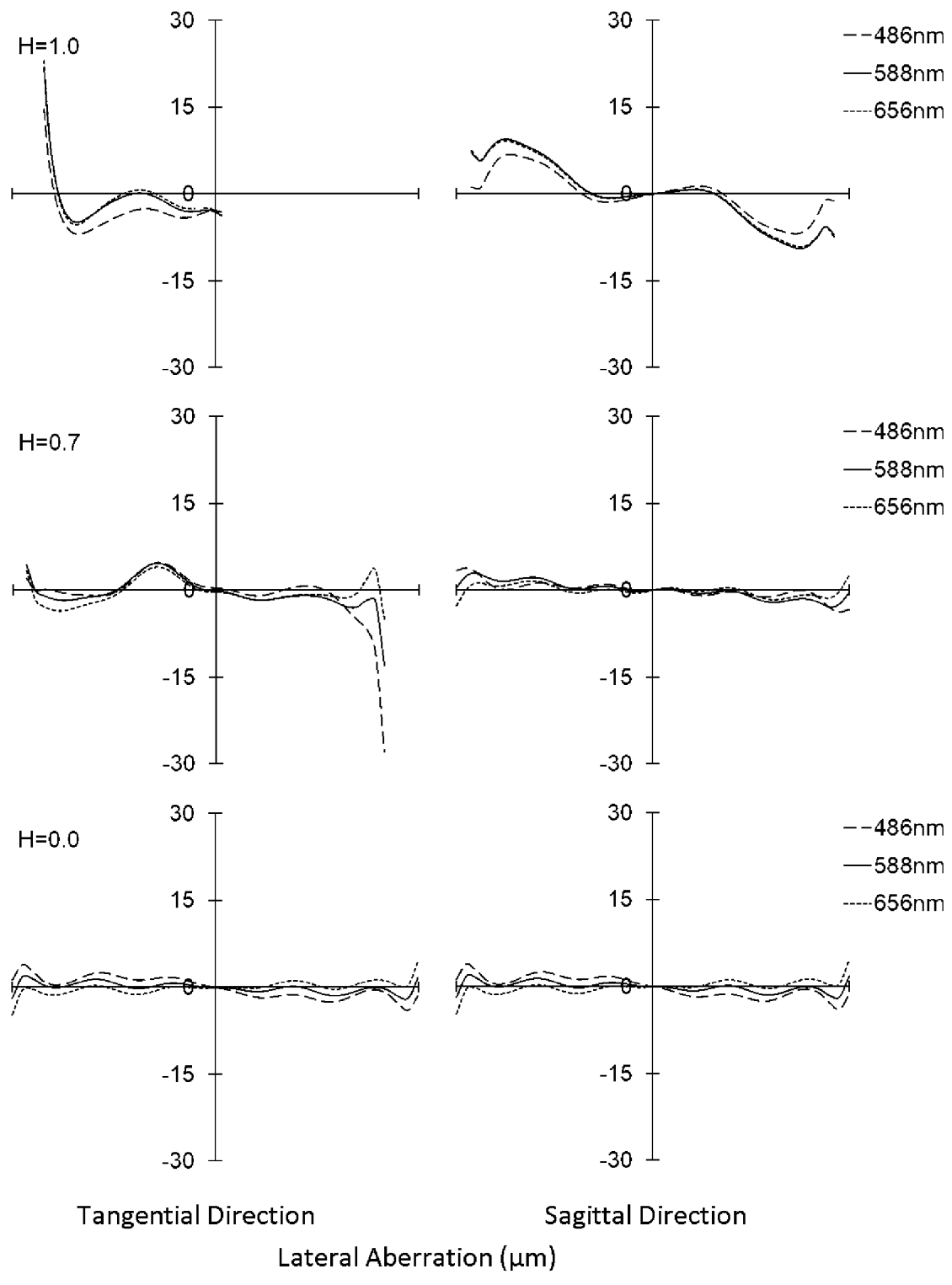
FIG. 24 is an aberration diagram showing a lateral aberration of the imaging lens of FIG. 22.
Figure 25:
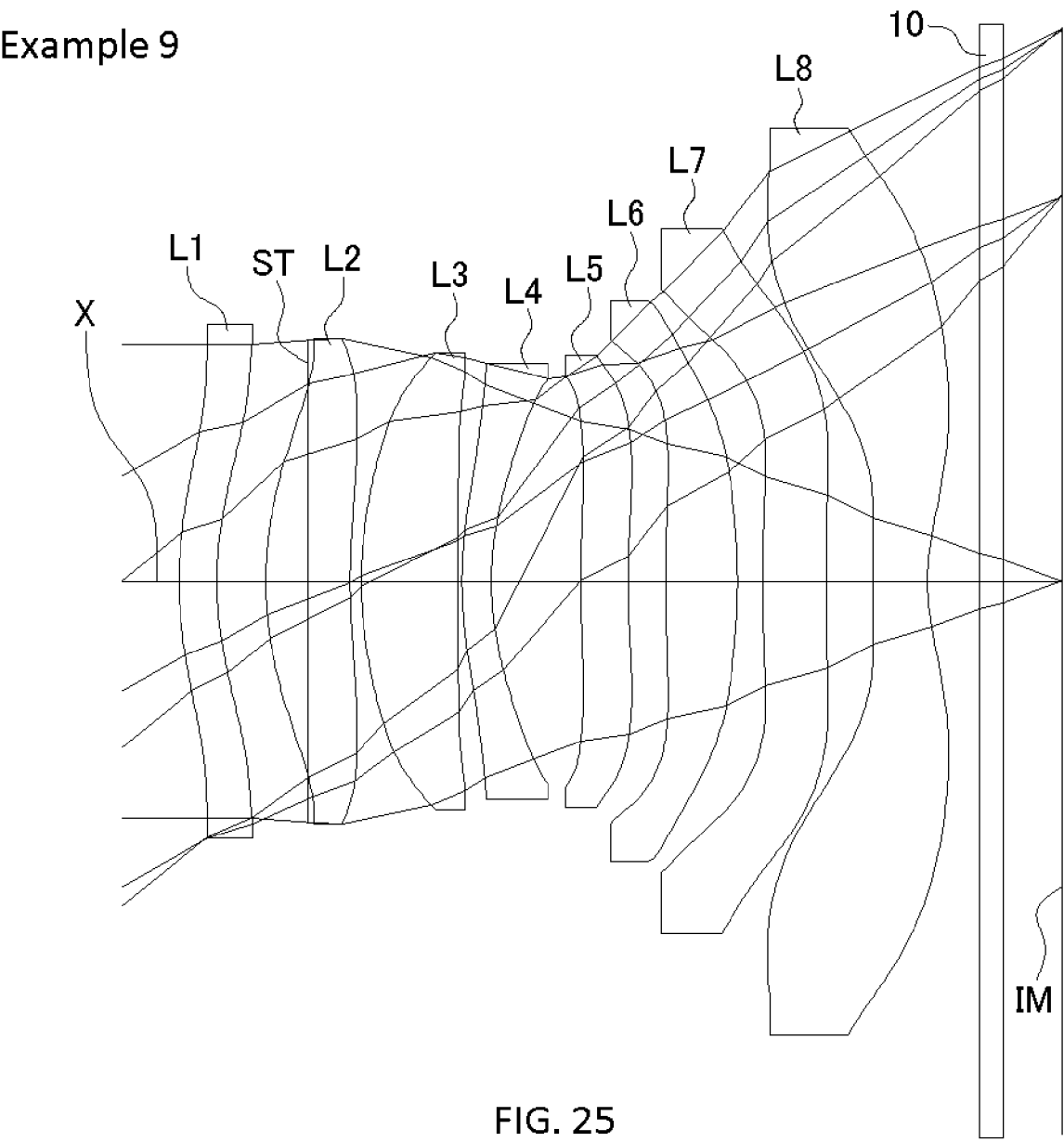
FIG. 25 is a sectional view of a schematic configuration of an imaging lens in Example 9 of the present invention.

FIG. 23 shows spherical aberration (mm), astigmatism (mm), and distortion (%), respectively. FIG. 24 shows a lateral aberration corresponding to the image height ratio H. As shown in FIGS. 23 and 24, according to the imaging lens of the Example 8, aberrations can be properly corrected.

Example 9

The basic lens data is shown below in Table 17.

TABLE 17 f = 5.72 mm Fno = 1.4 ω = 39.1°

| | i | r | d | nd | vd | [mm] |
|---|---|---|---|---|---|---|
| | | ∞ | ∞ | | | |
| L1 | 1* | 3.577 | 0.324 | 1.6707 | 19.2 | f1 = −41.234 |
| | 2* | 3.052 | 0.781 | | | |
| | 3(ST) | ∞ | −0.362 | | | |
| L2 | 4* | 3.153 | 0.723 | 1.5445 | 56.4 | f2 = 12.612 |
| | 5* | 5.359 | 0.097 | | | |
| L3 | 6* | 3.215 | 0.831 | 1.5445 | 56.4 | f3 = 5.876 |
| | 7* | −590.771 | 0.038 | | | |
| L4 | 8* | 3.730 | 0.250 | 1.6707 | 19.2 | f4 = −13.103 |
| | 9* | 2.548 | 0.769 | | | |
| L5 | 10* | 9.027 | 0.403 | 1.6503 | 21.5 | f5 = −35.197 |
| | 11* | 6.360 | 0.329 | | | |
| L6 | 12* | 16.661 | 0.616 | 1.5348 | 55.7 | f6 = 6.906 |
| | 13* | −4.685 | 0.220 | | | |
| L7 | 14* | 217.206 | 0.546 | 1.6707 | 19.2 | f7 = 104.327 |
| | 15* | −103.133 | 0.394 | | | |
| L8 | 16* | 8.181 | 0.471 | 1.5445 | 56.4 | f8 = −4.627 |
| | 17* | 1.887 | 0.442 | | | |
| | 18 | ∞ | 0.210 | 1.5168 | 64.2 | |
| | 19 | ∞ | 0.500 | | | |
| (IM) | | ∞ | | | | | f56=8.584 mm
R1f=3.577 mm
R1r=3.052 mm
R4r=2.548 mm
R8f=8.181 mm
R8r=1.887 mm
D12=0.420 mm
D45=0.769 mm
D56=0.329 mm
D67=0.220 mm
D78=0.394 mm
T7=0.546 mm
T8=0.471 mm
TL=7.510 mm
Hmax=4.65 mm
Dep=4.215 mm R8f/f=1.4
R8r/f=0.3
TL/f=1.3
TL/Hmax=1.6
f/Dep=1.4
f6/f=1.2
f56/f=1.5

Accordingly, the imaging lens according to the Example 9 satisfies the above-described conditional expressions.

Figure 26:
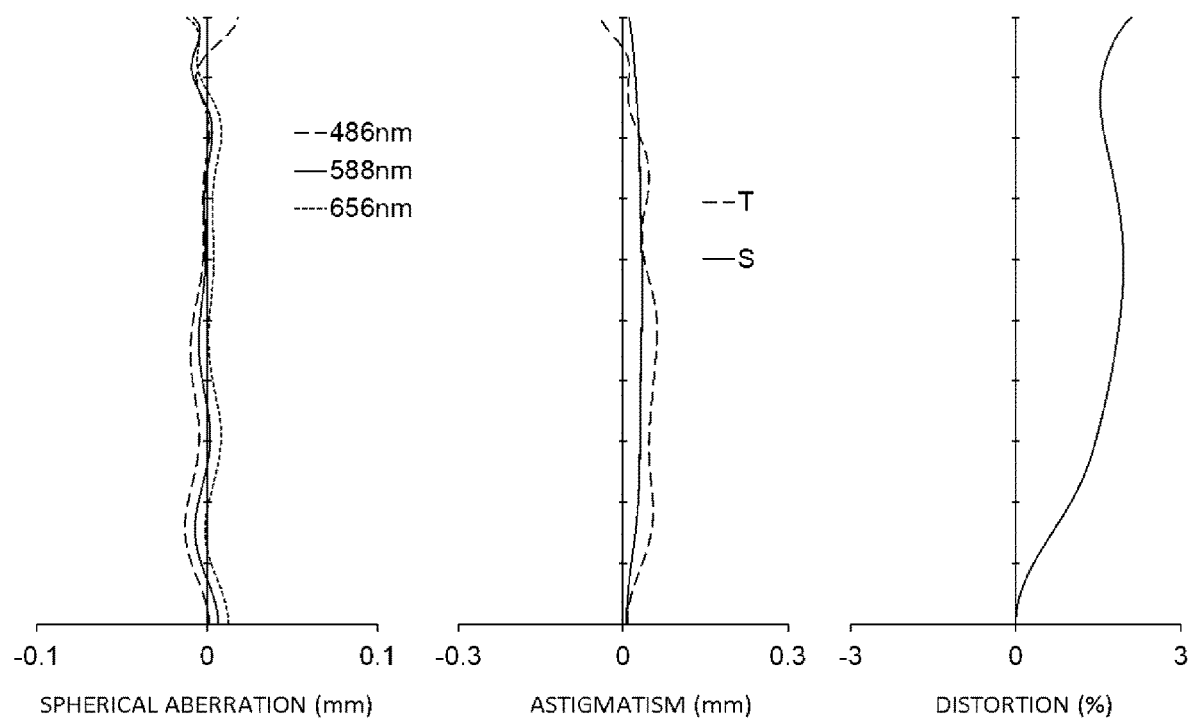
FIG. 26 is an aberration diagram showing spherical aberration, astigmatism, and distortion of the imaging lens of FIG. 25.
Figure 27:
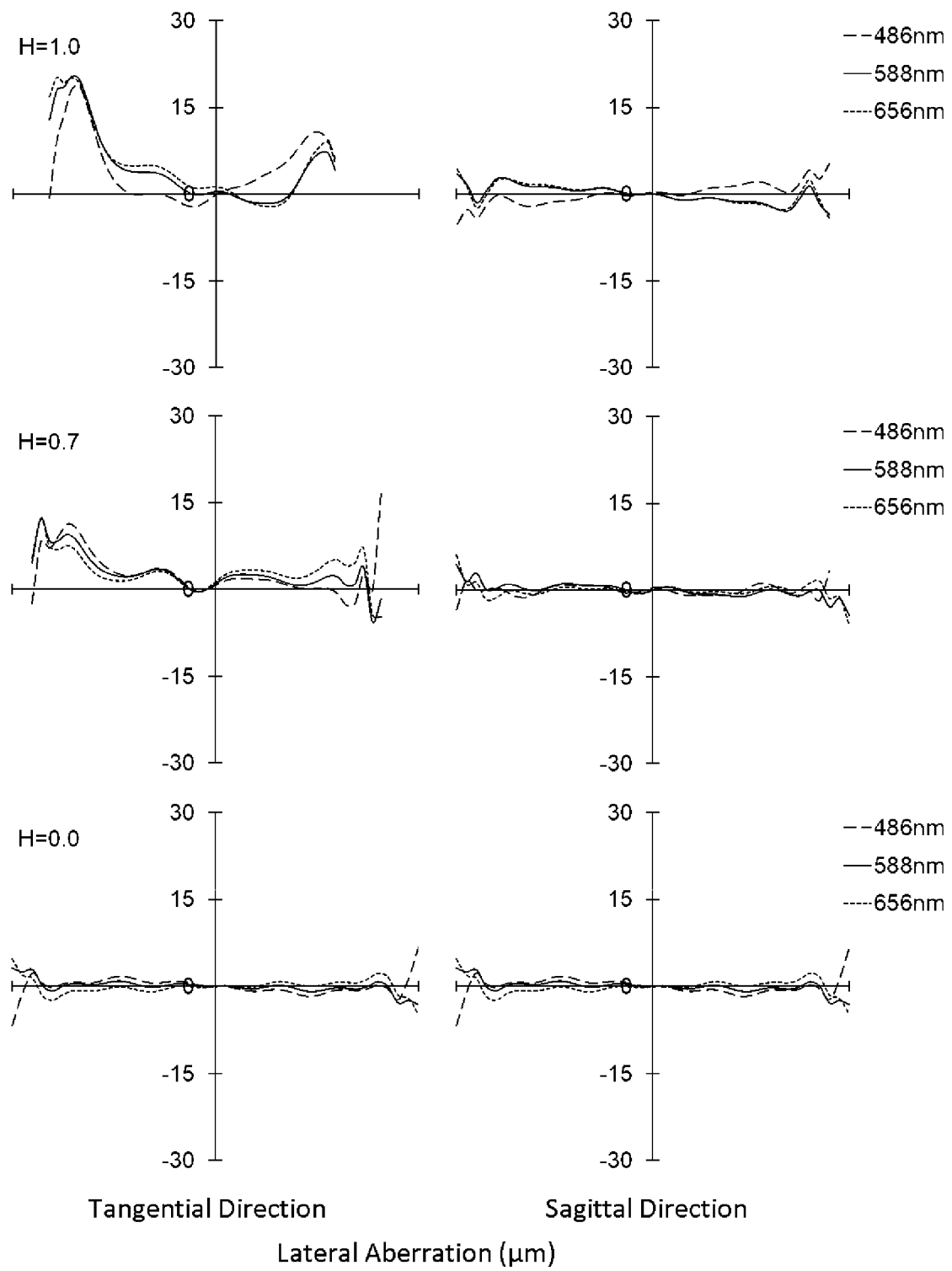
FIG. 27 is an aberration diagram showing a lateral aberration of the imaging lens of FIG. 25.
Figure 28:
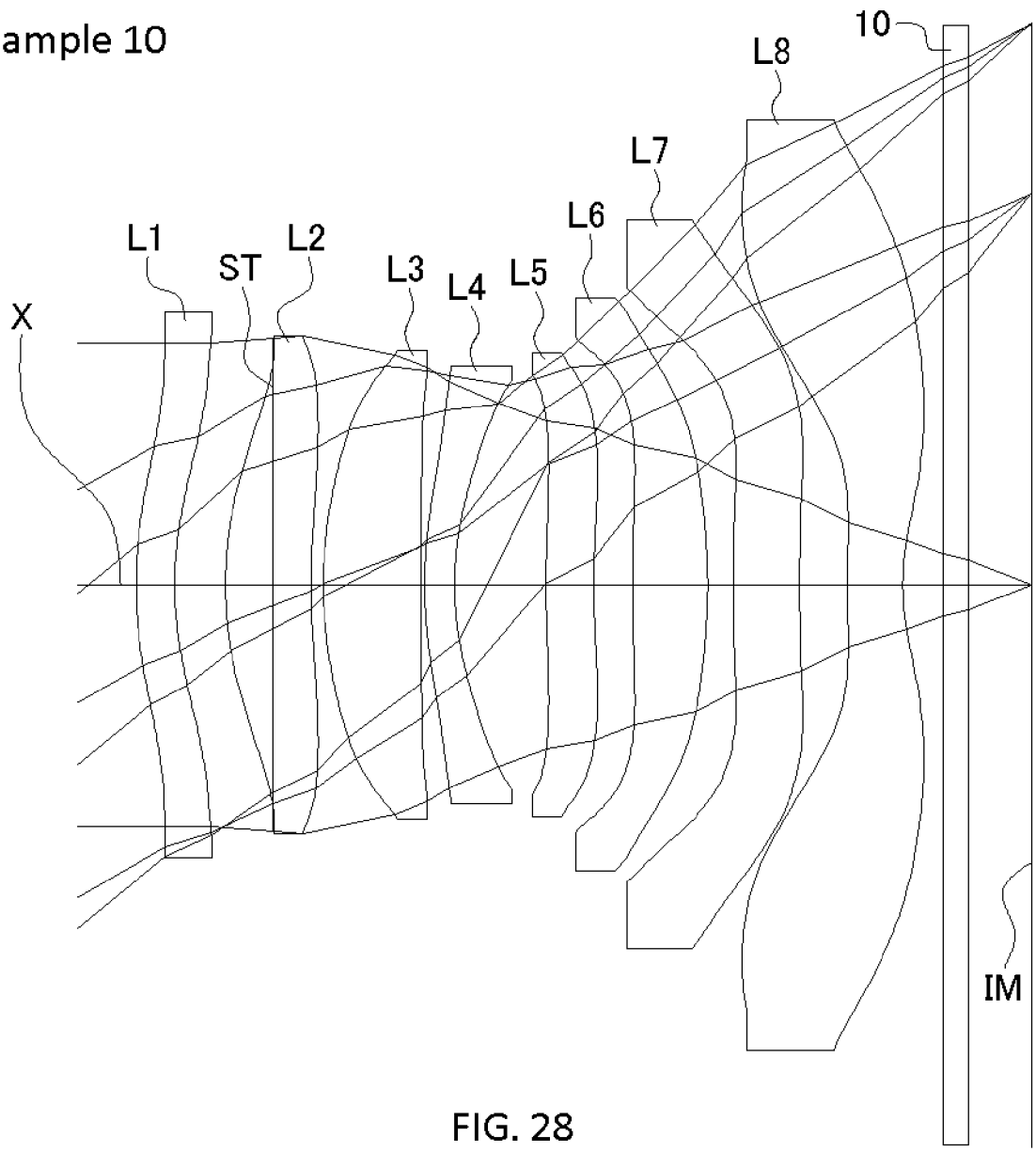
FIG. 28 is a sectional view of a schematic configuration of an imaging lens in Example 10 of the present invention.

FIG. 26 shows spherical aberration (mm), astigmatism (mm), and distortion (%), respectively. FIG. 27 shows a lateral aberration corresponding to the image height ratio H. As shown in FIGS. 26 and 27, according to the imaging lens of the Example 9, aberrations can be properly corrected.

TABLE 18

| | | Aspheric Surface Data | | | |
|---|---|---|---|---|---|
| i | k | A4 | A6 | A8 | A10 |
| 1 | 0.000E+00 | −1.970E−02 | −1.794E−03 | −1.085E−03 | 9.962E−04 |
| 2 | 0.000E+00 | −2.255E−02 | −5.998E−03 | 3.500E−03 | −3.105E−03 |
| 4 | −3.161E+00 | 6.025E−03 | −3.877E−03 | 2.913E−03 | −4.019E−03 |
| 5 | −1.000E+02 | 1.118E−02 | −4.663E−02 | 4.724E−02 | −3.002E−02 |
| 6 | −5.786E+00 | −2.294E−02 | 2.393E−02 | −2.268E−02 | 1.920E−02 |
| 7 | 0.000E+00 | 2.807E−02 | −1.958E−02 | −1.222E−02 | 2.468E−02 |
| 8 | 0.000E+00 | −3.065E−02 | 3.034E−02 | −6.433E−02 | 5.853E−02 |
| 9 | −4.546E+00 | −1.882E−02 | 4.374E−02 | −5.641E−02 | 3.968E−02 |
| 10 | 0.000E+00 | −4.675E−02 | 1.383E−02 | 1.132E−02 | −5.714E−03 |
| 11 | 0.000E+00 | −4.825E−02 | −2.183E−02 | 6.000E−02 | −6.732E−02 |
| 12 | 2.400E+01 | −4.602E−03 | −4.081E−04 | −1.894E−02 | 1.961E−02 |
| 13 | 1.829E+00 | 6.830E−02 | −5.783E−02 | 9.966E−03 | 1.220E−02 |
| 14 | 0.000E+00 | 8.714E−02 | −9.826E−02 | 3.907E−02 | −6.544E−03 |
| 15 | 0.000E+00 | 6.907E−02 | −7.424E−02 | 3.212E−02 | −8.518E−03 |
| 16 | 1.589E−01 | −1.342E−01 | 3.605E−02 | −6.174E−03 | 9.889E−04 |
| 17 | −7.030E+00 | −7.293E−02 | 2.461E−02 | −5.461E−03 | 8.381E−04 |

| i | A12 | A14 | A16 | A18 | A20 |
|---|---|---|---|---|---|
| 1 | −3.592E−04 | 8.206E−05 | −1.193E−05 | 1.004E−06 | −3.683E−08 |
| 2 | 2.042E−03 | −7.751E−04 | 1.704E−04 | −2.034E−05 | 1.025E−06 |
| 4 | 2.565E−03 | −9.015E−04 | 1.823E−04 | −2.023E−05 | 9.760E−07 |
| 5 | 1.323E−02 | −3.969E−03 | 7.509E−04 | −7.981E−05 | 3.622E−06 |
| 6 | −9.822E−03 | 3.284E−03 | −7.347E−04 | 1.004E−04 | −6.248E−06 |
| 7 | −1.565E−02 | 5.683E−03 | −1.271E−03 | 1.606E−04 | −8.684E−06 |
| 8 | −2.943E−02 | 9.066E−03 | −1.725E−03 | 1.863E−04 | −8.632E−06 |
| 9 | −1.525E−02 | 2.731E−03 | 8.976E−05 | −1.207E−04 | 1.476E−05 |
| 10 | 4.699E−03 | −2.667E−03 | 1.014E−03 | −2.223E−04 | 2.045E−05 |
| 11 | 4.542E−02 | −1.931E−02 | 5.042E−03 | −7.406E−04 | 4.689E−05 |
| 12 | −1.046E−02 | 3.097E−03 | −4.708E−04 | 2.513E−05 | 6.982E−07 |
| 13 | −9.777E−03 | 3.367E−03 | −6.234E−04 | 6.040E−05 | −2.410E−06 |
| 14 | −7.690E−04 | 5.864E−04 | −1.186E−04 | 1.155E−05 | −4.632E−07 |
| 15 | 1.447E−03 | −1.559E−04 | 1.025E−05 | −3.704E−07 | 5.504E−09 |
| 16 | −1.411E−04 | 1.439E−05 | −9.183E−07 | 3.265E−08 | −4.943E−10 |
| 17 | −8.925E−05 | 6.367E−06 | −2.866E−07 | 7.301E−09 | −7.962E−11 |

The values of the respective conditional expressions are as follows:
R1f/R1r=1.2
f1/f2=−3.3
D12/f=0.07
f2/f3=2.1
f3/f=1.0
R4r/f=0.4
D45/f=0.13
D56/D67=1.5
T7/T8=1.2
D78/f=0.07
f8/f=−0.8

Example 10

The basic lens data is shown below in Table 19.

TABLE 19

| | | f = 5.65 mm Fno = 1.4 ω = 39.3° | | | | |
|---|---|---|---|---|---|---|
| | i | r | d | nd | vd | [mm] |
| | | ∞ | ∞ | | | |
| L1 | 1* | 3.562 | 0.325 | 1.6707 | 19.2 | f1 = −43.257 |
| | 2* | 3.056 | 0.825 | | | |
| | 3(ST) | ∞ | −0.401 | | | |

TABLE 19-continued

| | | f = 5.65 mm Fno = 1.4 ω = 39.3° | | | | |
|---|---|---|---|---|---|---|
| | i | r | d | nd | vd | [mm] |
| L2 | 4* | 3.150 | 0.717 | 1.5445 | 56.4 | f2 = 12.496 |
| | 5* | 5.395 | 0.104 | | | |
| L3 | 6* | 3.217 | 0.822 | 1.5445 | 56.4 | f3 = 5.868 |
| | 7* | −421.060 | 0.031 | | | |
| L4 | 8* | 3.741 | 0.250 | 1.6707 | 19.2 | f4 = −13.320 |
| | 9* | 2.566 | 0.768 | | | |
| L5 | 10* | 8.848 | 0.398 | 1.6503 | 21.5 | f5 = −39.555 |
| | 11* | 6.467 | 0.329 | | | |
| L6 | 12* | 15.818 | 0.631 | 1.5348 | 55.7 | f6 = 6.680 |
| | 13* | −4.551 | 0.217 | | | |
| L7 | 14* | −211.622 | 0.556 | 1.6707 | 19.2 | f7 = −125.268 |
| | 15* | 139.499 | 0.397 | | | |
| L8 | 16* | 8.053 | 0.466 | 1.5445 | 56.4 | f8 = −4.620 |
| | 17* | 1.878 | 0.337 | | | |
| | 18 | ∞ | 0.210 | 1.5168 | 64.2 | |
| | 19 | ∞ | 0.532 | | | |
| (IM) | | ∞ | | | | | f56=8.050 mm
R1f=3.562 mm
R1r=3.056 mm
R4r=2.566 mm
R8f=8.053 mm
R8r=1.878 mm
D12=0.424 mm
D45=0.768 mm
D56=0.329 mm
D67=0.217 mm
D78=0.397 mm
T7=0.556 mm
T8=0.466 mm
TL=7.444 mm
Hmax=4.63 mm
Dep=4.066 mm

TABLE 20

| Aspheric Surface Data | | | | | |
|---|---|---|---|---|---|
| i | k | A4 | A6 | A8 | A10 |
| 1 | 0.000E+00 | −1.983E−02 | −1.780E−03 | −1.087E−03 | 9.969E−04 |
| 2 | 0.000E+00 | −2.251E−02 | −5.987E−03 | 3.507E−03 | −3.105E−03 |
| 4 | −3.375E+00 | 6.057E−03 | −3.815E−03 | 2.913E−03 | −4.016E−03 |
| 5 | −1.000E+02 | 1.102E−02 | −4.654E−02 | 4.724E−02 | −3.002E−02 |
| 6 | −5.517E+00 | −2.302E−02 | 2.394E−02 | −2.268E−02 | 1.919E−02 |
| 7 | 0.000E+00 | 2.738E−02 | −1.957E−02 | −1.225E−02 | 2.467E−02 |
| 8 | 0.000E+00 | −3.018E−02 | 3.027E−02 | −6.427E−02 | 5.856E−02 |
| 9 | −4.473E+00 | −1.927E−02 | 4.390E−02 | −5.629E−02 | 3.969E−02 |
| 10 | 0.000E+00 | −4.589E−02 | 1.348E−02 | 1.045E−03 | −5.711E−03 |
| 11 | 0.000E+00 | −4.787E−02 | −2.182E−02 | 5.996E−02 | −6.732E−02 |
| 12 | 2.400E+01 | −7.043E−03 | −2.625E−04 | −1.891E−02 | 1.961E−02 |
| 13 | 1.795E+00 | 6.844E−02 | −5.789E−02 | 9.982E−03 | 1.220E−02 |
| 14 | 0.000E+00 | 8.737E−02 | −9.811E−02 | 3.903E−02 | −6.547E−03 |
| 15 | 0.000E+00 | 6.925E−02 | −7.430E−02 | 3.212E−02 | −8.519E−03 |
| 16 | 1.258E−01 | −1.341E−01 | 3.605E−02 | −6.174E−03 | 9.889E−04 |
| 17 | −7.386E+00 | −7.298E−02 | 2.465E−02 | −5.460E−03 | 8.381E−04 |
| i | A12 | A14 | A16 | A18 | A20 |
| 1 | −3.593E−04 | 8.208E−05 | −1.193E−05 | 1.005E−06 | −3.695E−08 |
| 2 | 2.042E−03 | −7.751E−04 | 1.704E−04 | −2.034E−05 | 1.025E−06 |
| 4 | 2.565E−03 | −9.017E−04 | 1.822E−04 | −2.025E−05 | 9.830E−07 |
| 5 | 1.323E−02 | −3.969E−03 | 7.509E−04 | −7.982E−05 | 3.624E−06 |
| 6 | −9.825E−03 | 3.283E−03 | −7.345E−04 | 1.004E−04 | −6.269E−06 |
| 7 | −1.565E−02 | 5.683E−03 | −1.271E−03 | 1.607E−04 | −8.716E−06 |
| 8 | −2.943E−02 | 9.066E−03 | −1.725E−03 | 1.863E−04 | −8.616E−06 |
| 9 | −1.524E−02 | 2.732E−03 | 8.950E−05 | −1.208E−04 | 1.482E−05 |
| 10 | 4.707E−03 | −2.666E−03 | 1.014E−03 | −2.225E−04 | 2.050E−05 |
| 11 | 4.542E−02 | −1.931E−02 | 5.042E−03 | −7.406E−04 | 4.688E−05 |
| 12 | −1.047E−02 | 3.096E−03 | −4.708E−04 | 2.517E−05 | 7.027E−07 |
| 13 | −9.777E−03 | 3.367E−03 | −6.234E−04 | 6.040E−05 | −2.410E−06 |
| 14 | −7.688E−04 | 5.865E−04 | −1.186E−04 | 1.155E−05 | −4.634E−07 |
| 15 | 1.447E−03 | −1.559E−04 | 1.025E−05 | −3.703E−07 | 5.497E−09 |
| 16 | −1.411E−04 | 1.439E−05 | −9.183E−07 | 3.265E−08 | −4.943E−10 |
| 17 | −8.925E−05 | 6.367E−06 | −2.866E−07 | 7.301E−09 | −7.960E−11 |

The values of the respective conditional expressions are as follows:

R1f/R1r=1.2
f1/f2=−3.5
D12/f=0.08
f2/f3=2.1
f3/f=1.0
R4r/f=0.5
D45/f=0.14
D56/D67=1.5
T7/T8=1.2
D78/f=0.07
f8/f=−0.8
R8f/f=1.4
R8r/f=0.3
TL/f=1.3
TL/Hmax=1.6
f/Dep=1.4
f6/f=1.2
f56/f=1.4

Accordingly, the imaging lens according to the Example 10 satisfies the above-described conditional expressions.

Figure 29:
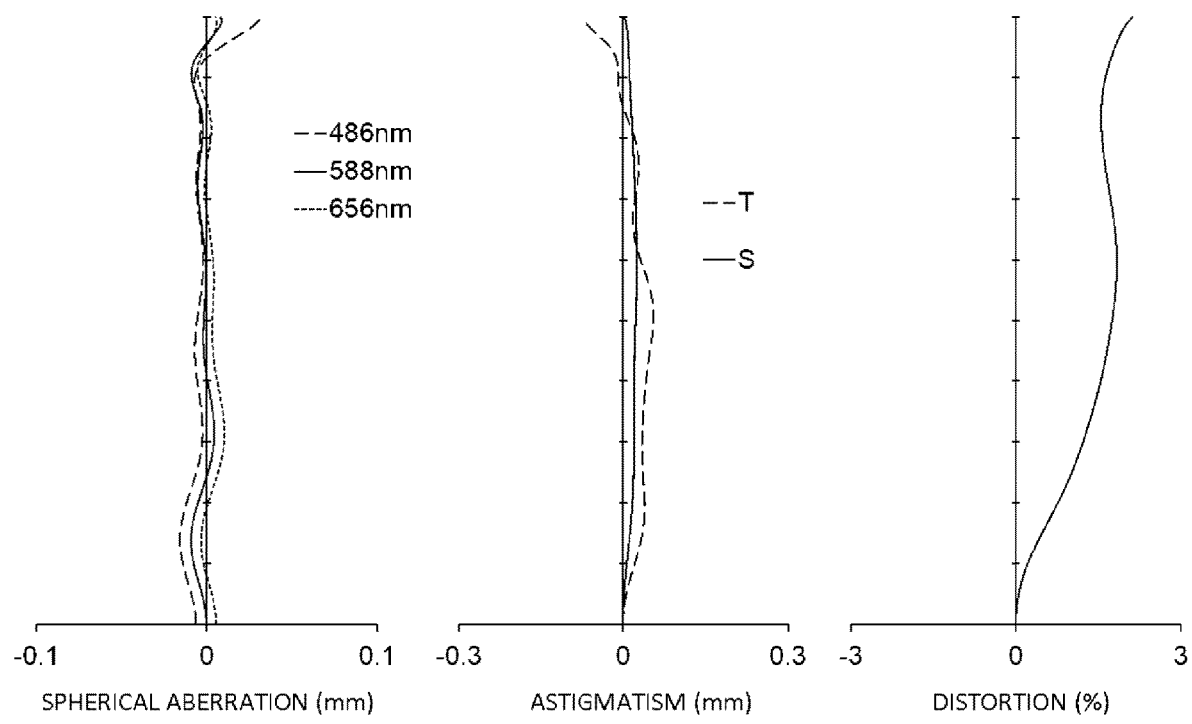
FIG. 29 is an aberration diagram showing spherical aberration, astigmatism, and distortion of the imaging lens of FIG. 28.
Figure 30:
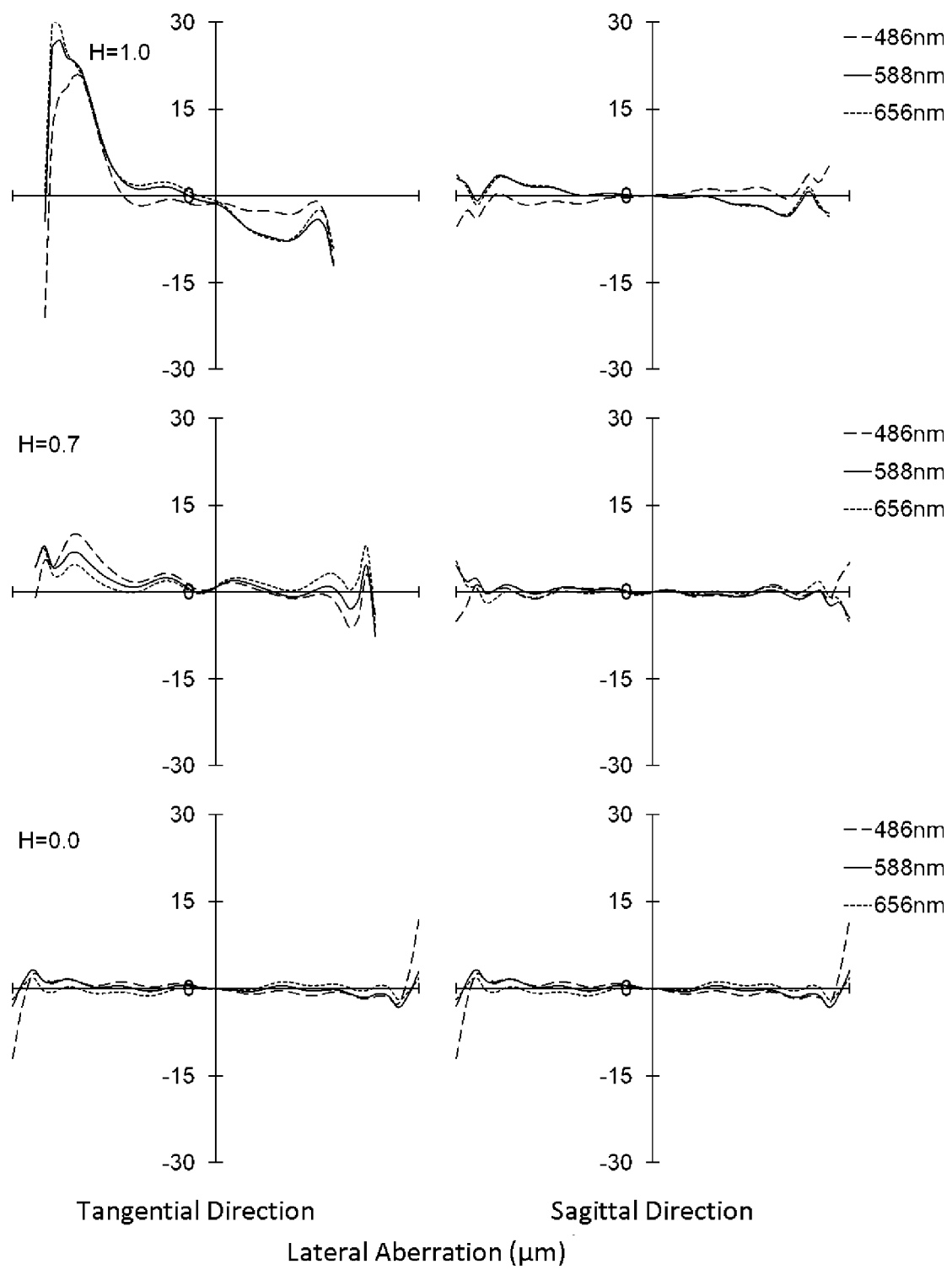
FIG. 30 is an aberration diagram showing a lateral aberration of the imaging lens of FIG. 28.
Figure 31:
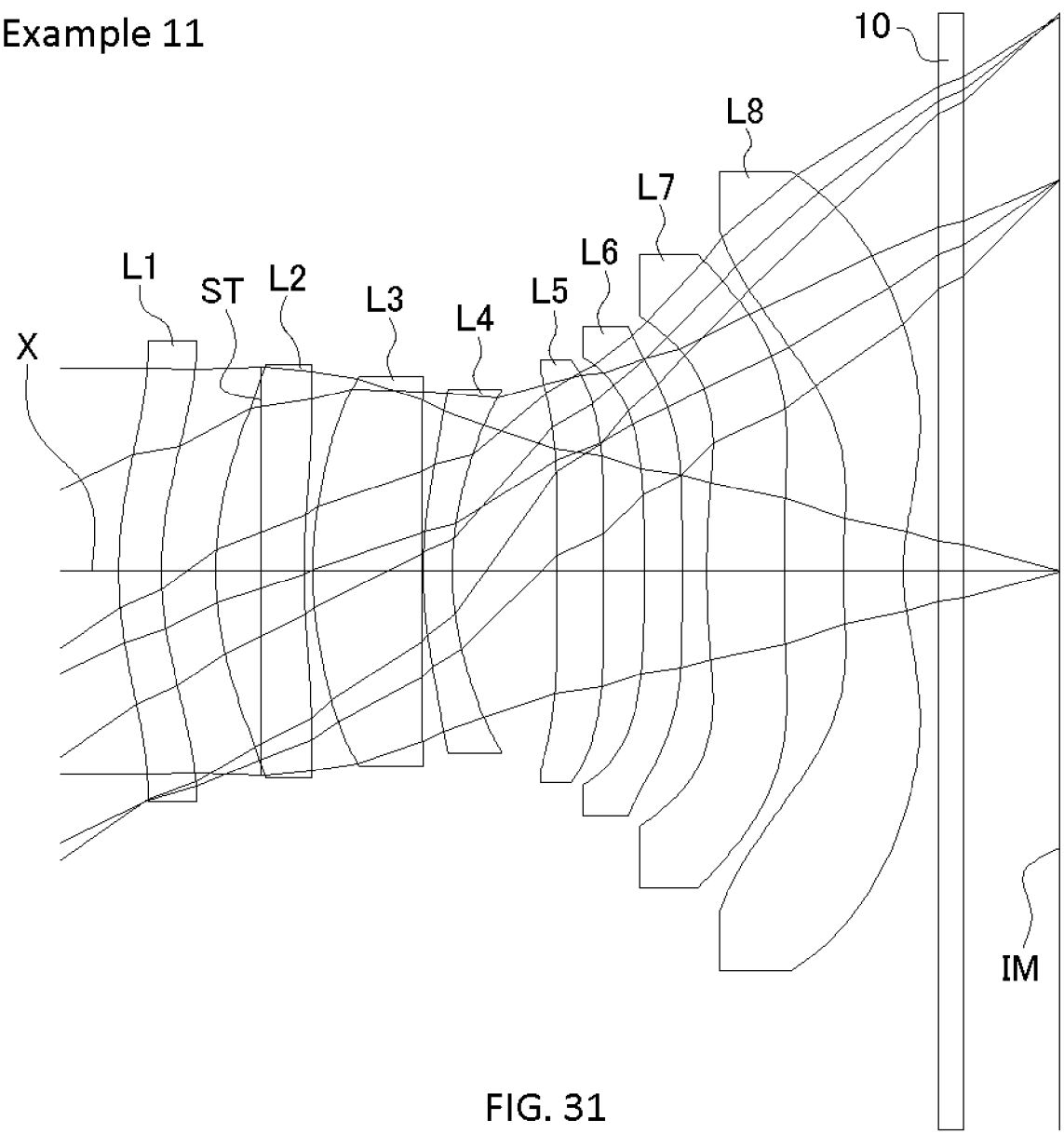
FIG. 31 is a sectional view of a schematic configuration of an imaging lens in Example 11 of the present invention.

FIG. 29 shows spherical aberration (mm), astigmatism (mm), and distortion (%), respectively. FIG. 30 shows a lateral aberration corresponding to the image height ratio H. As shown in FIGS. 29 and 30, according to the imaging lens of the Example 10, aberrations can be properly corrected.

Example 11

The basic lens data is shown below in Table 21.

TABLE 21

| | | | | | | |
|---|---|---|---|---|---|---|
| f = 6.66 mm Fno = 1.9 ω = 34.8° | | | | | | |
| | i | r | d | nd | vd | [mm] |
| | | ∞ | ∞ | | | |
| L1 | 1* | 3.523 | 0.358 | 1.6707 | 19.2 | f1 = −39.777 |
| | 2* | 2.985 | 0.846 | | | |
| | 3(ST) | ∞ | −0.382 | | | |

TABLE 21-continued

| | | | | | | |
|---|---|---|---|---|---|---|
| f = 6.66 mm Fno = 1.9 ω = 34.8° | | | | | | |
| | i | r | d | nd | vd | [mm] |
| L2 | 4* | 3.082 | 0.746 | 1.5445 | 56.4 | f2 = 12.080 |
| | 5* | 5.305 | 0.073 | | | |
| L3 | 6* | 3.133 | 0.922 | 1.5445 | 56.4 | f3 = 5.692 |
| | 7* | −260.625 | 0.012 | | | |
| L4 | 8* | 3.674 | 0.250 | 1.6707 | 19.2 | f4 = −13.657 |
| | 9* | 2.550 | 0.887 | | | |
| L5 | 10* | 39.993 | 0.385 | 1.6503 | 21.5 | f5 = −101.220 |
| | 11* | 24.784 | 0.354 | | | |
| L6 | 12* | −18.412 | 0.318 | 1.5348 | 55.7 | f6 = −100.655 |
| | 13* | −28.151 | 0.207 | | | |
| L7 | 14* | 12.139 | 0.658 | 1.6707 | 19.2 | f7 = 17.539 |
| | 15* | −372.925 | 0.499 | | | |
| L8 | 16* | 4.871 | 0.503 | 1.5445 | 56.4 | f8 = −5.844 |
| | 17* | 1.855 | 0.300 | | | |
| | 18 | ∞ | 0.210 | 1.5168 | 64.2 | |
| | 19 | ∞ | 0.815 | | | |
| (IM) | | ∞ | | | | |

R1f=3.523 mm

R1r=2.985 mm

R4r=2.550 mm

R8f=4.871 mm

R8r=1.855 mm

D12=0.463 mm

D45=0.887 mm

D56=0.354 mm

D67=0.207 mm

D78=0.499 mm

T7=0.658 mm

T8=0.503 mm

TL=7.887 mm

Hmax=4.63 mm

Dep=3.529 mm

TABLE 22

| Aspheric Surface Data | | | | | |
|---|---|---|---|---|---|
| i | k | A4 | A6 | A8 | A10 |
| 1 | 0.000E+00 | −1.974E−02 | −1.716E−03 | −1.116E−03 | 9.962E−04 |
| 2 | 0.000E+00 | −2.270E−02 | −5.992E−03 | 3.513E−03 | −3.103E−03 |
| 4 | −2.839E+00 | 7.212E−03 | −4.181E−03 | 3.159E−03 | −4.026E−03 |
| 5 | −1.000E+02 | 1.224E−02 | −4.638E−02 | 4.725E−02 | −2.989E−02 |
| 6 | −6.091E+00 | −2.166E−02 | 2.433E−02 | −2.281E−02 | 1.897E−02 |
| 7 | 0.000E+00 | 2.405E−02 | −2.010E−02 | −1.203E−02 | 2.474E−02 |
| 8 | 0.000E+00 | −3.023E−02 | 3.136E−02 | −6.414E−02 | 5.857E−02 |
| 9 | −4.102E+00 | −1.690E−02 | 4.553E−02 | −5.570E−02 | 3.961E−02 |
| 10 | 0.000E+00 | −4.092E−02 | 1.334E−02 | 6.728E−04 | −5.723E−03 |
| 11 | 0.000E+00 | −3.221E−02 | −2.474E−02 | 5.981E−02 | −6.728E−02 |
| 12 | 0.000E+00 | −1.261E−02 | 9.419E−05 | −1.940E−02 | 1.963E−02 |
| 13 | 0.000E+00 | 2.904E−02 | −5.550E−02 | 1.045E−02 | 1.225E−02 |
| 14 | 0.000E+00 | 7.452E−02 | −9.795E−02 | 3.936E−02 | −6.555E−03 |
| 15 | 0.000E+00 | 6.919E−02 | −7.392E−02 | 3.208E−02 | −8.523E−03 |
| 16 | −3.766E+00 | −1.400E−01 | 3.585E−02 | −6.161E−03 | 9.909E−04 |
| 17 | −8.170E+00 | −8.079E−02 | 2.526E−02 | −5.474E−03 | 8.372E−04 |

| i | A12 | A14 | A16 | A18 | A20 |
|---|---|---|---|---|---|
| 1 | −3.584E−04 | 8.193E−05 | −1.195E−05 | 1.011E−06 | −3.508E−08 |
| 2 | 2.043E−03 | −7.758E−04 | 1.705E−04 | −2.032E−05 | 1.027E−06 |
| 4 | 2.570E−03 | −8.997E−04 | 1.814E−04 | −2.052E−05 | 1.076E−06 |
| 5 | 1.318E−02 | −3.963E−03 | 7.549E−04 | −8.147E−05 | 3.835E−06 |
| 6 | −9.439E−03 | 2.934E−03 | −5.799E−04 | 6.937E−05 | −3.907E−06 |
| 7 | −1.565E−02 | 5.684E−03 | −1.267E−03 | 1.615E−04 | −8.857E−06 |

TABLE 22-continued

Aspheric Surface Data

| 8 | -2.942E-02 | 9.073E-03 | -1.728E-03 | 1.844E-04 | -7.808E-06 |
|---|---|---|---|---|---|
| 9 | -1.529E-02 | 2.727E-03 | 9.274E-05 | -1.197E-04 | 1.494E-05 |
| 10 | 4.720E-03 | -2.656E-03 | 1.021E-03 | -2.208E-04 | 1.979E-05 |
| 11 | 4.543E-02 | -1.931E-02 | 5.042E-03 | -7.406E-04 | 4.694E-05 |
| 12 | -1.045E-02 | 3.103E-03 | -4.725E-04 | 2.453E-05 | 6.173E-07 |
| 13 | -9.782E-03 | 3.366E-03 | -6.237E-04 | 6.038E-05 | -2.399E-06 |
| 14 | -7.740E-04 | 5.850E-04 | -1.187E-04 | 1.157E-05 | -4.538E-07 |
| 15 | 1.447E-03 | -1.560E-04 | 1.025E-05 | -3.700E-07 | 5.580E-09 |
| 16 | -1.410E-04 | 1.439E-05 | -9.183E-07 | 3.260E-08 | -5.003E-10 |
| 17 | -8.927E-05 | 6.367E-06 | -2.865E-07 | 7.248E-09 | -7.660E-11 |

The values of the respective conditional expressions are as follows:
R1f/R1r=1.2
f1/f2=−3.3
D12/f=0.07
f2/f3=2.1
f3/f=0.9
R4r/f=0.4
D45/f=0.13
D56/D67=1.7
T7/T8=1.3
D78/f=0.07
f8/f=−0.9
R8f/f=0.7
R8r/f=0.3
TL/f=1.2
TL/Hmax=1.7
f/Dep=1.9

Accordingly, the imaging lens according to the Example 11 satisfies the above-described conditional expressions.

Figure 32:
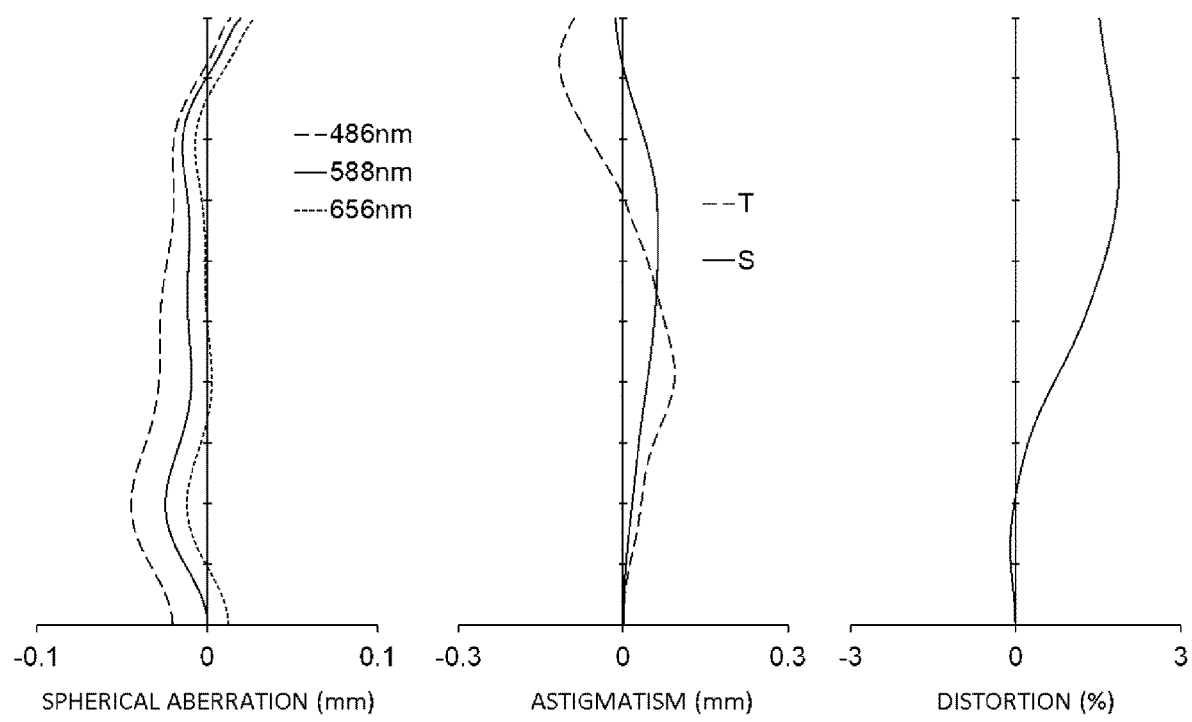
FIG. 32 is an aberration diagram showing spherical aberration, astigmatism, and distortion of the imaging lens of FIG. 31.
Figure 33:
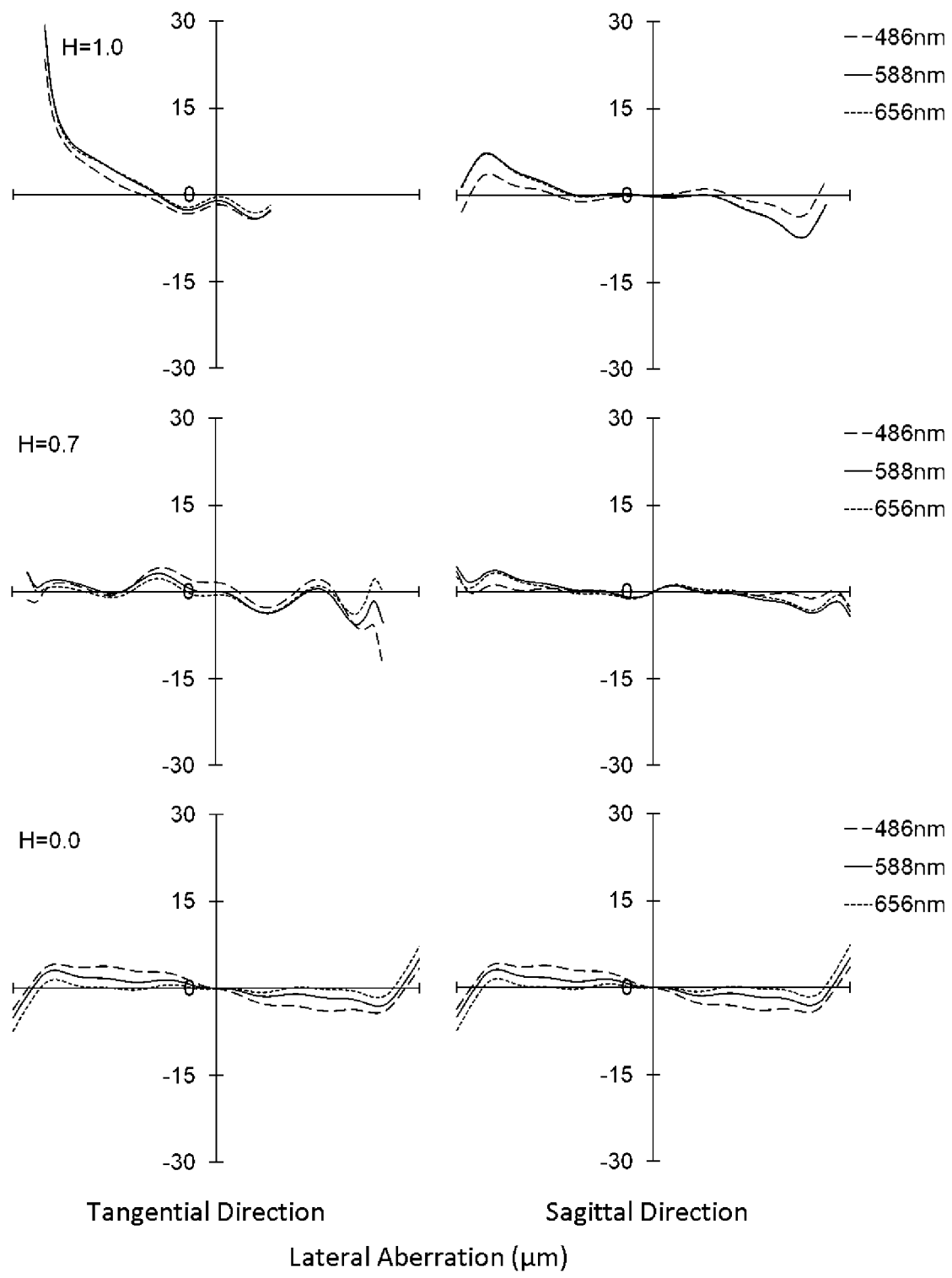
FIG. 33 is an aberration diagram showing a lateral aberration of the imaging lens of FIG. 31.
Figure 34:
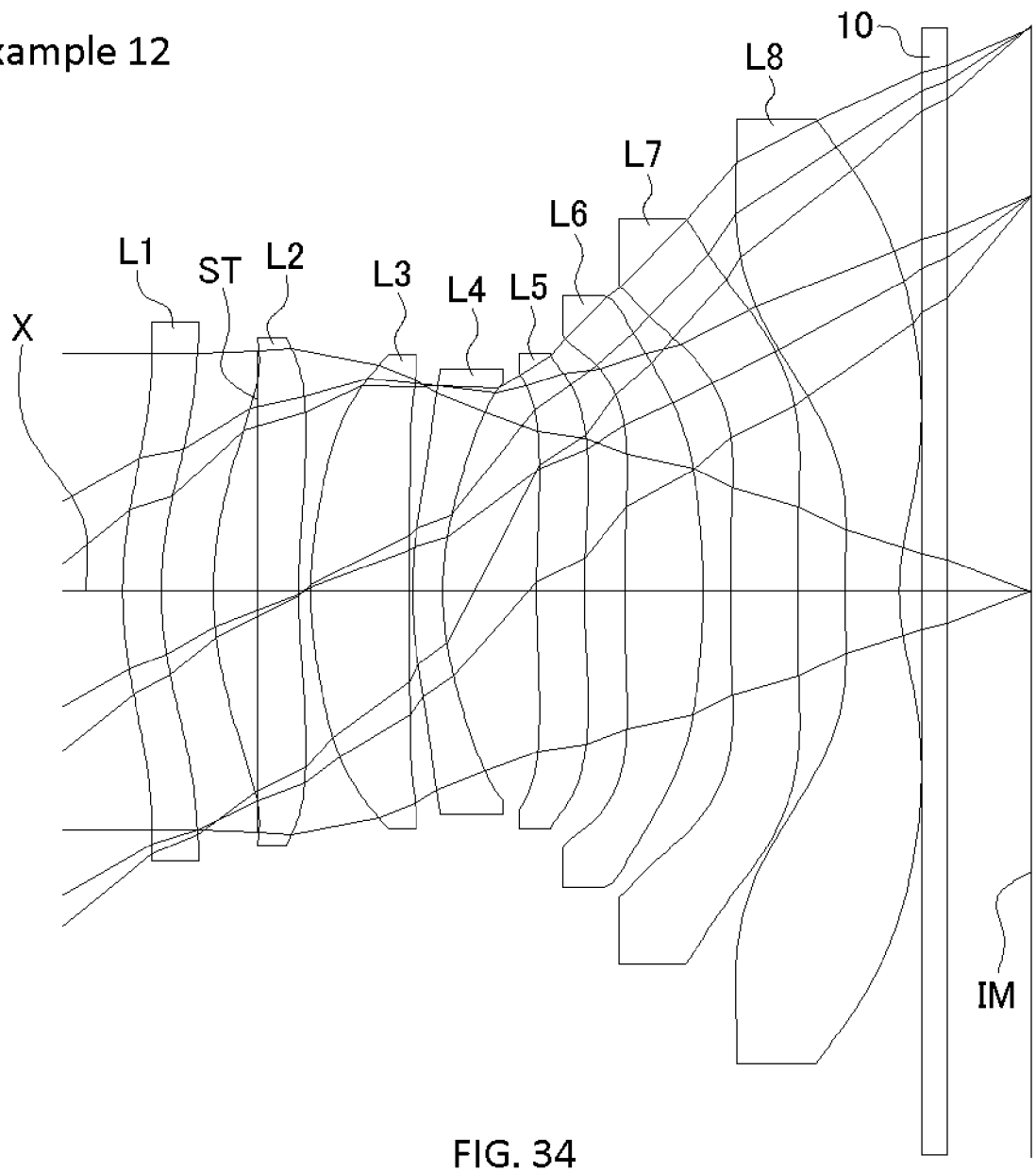
FIG. 34 is a sectional view of a schematic configuration of an imaging lens in Example 12 of the present invention.

FIG. 32 shows spherical aberration (mm), astigmatism (mm), and distortion (%), respectively. FIG. 33 shows a lateral aberration corresponding to the image height ratio H. As shown in FIGS. 32 and 33, according to the imaging lens of the Example 11, aberrations can be properly corrected.

Example 12

The basic lens data is shown below in Table 23.

TABLE 23 f = 5.62 mm Fno = 1.4 ω = 39.2°

| | i | r | d | nd | vd | [mm] |
|---|---|---|---|---|---|---|
| | | ∞ | ∞ | | | |
| L1 | 1* | 3.562 | 0.321 | 1.6707 | 19.2 | f1 = −42.511 |
| | 2* | 3.051 | 0.790 | | | |
| | 3(ST) | ∞ | -0.362 | | | |
| L2 | 4* | 3.164 | 0.703 | 1.5445 | 56.4 | f2 = 12.619 |
| | 5* | 5.406 | 0.099 | | | |
| L3 | 6* | 3.217 | 0.813 | 1.5445 | 56.4 | f3 = 5.844 |
| | 7* | -264.928 | 0.030 | | | |
| L4 | 8* | 3.730 | 0.250 | 1.6707 | 19.2 | f4 = −13.345 |
| | 9* | 2.562 | 0.774 | | | |
| L5 | 10* | 8.762 | 0.391 | 1.6503 | 21.5 | f5 = −39.864 |
| | 11* | 6.434 | 0.336 | | | |
| L6 | 12* | 15.014 | 0.650 | 1.5348 | 55.7 | f6 = 6.818 |
| | 13* | -4.743 | 0.223 | | | |
| L7 | 14* | ∞ | 0.553 | 1.6707 | 19.2 | f7 = ∞ |
| | 15* | ∞ | 0.391 | | | |
| L8 | 16* | 8.041 | 0.450 | 1.5445 | 56.4 | f8 = −4.631 |
| | 17* | 1.882 | 0.184 | | | |
| | 18 | ∞ | 0.210 | 1.5168 | 64.2 | |
| | 19 | ∞ | 0.696 | | | |
| (IM) | | ∞ | | | | | f56=8.234 mm
R1f=3.562 mm
R1r=3.051 mm
R4r=2.562 mm
R8f=8.041 mm
R8r=1.882 mm
D12=0.428 mm
D45=0.774 mm
D56=0.336 mm
D67=0.223 mm
D78=0.391 mm
T7=0.553 mm
T8=0.450 mm
TL=7.430 mm
Hmax=4.58 mm
Dep=4.052 mm

TABLE 24

Aspheric Surface Data

| i | k | A4 | A6 | A8 | A10 |
|---|---|---|---|---|---|
| 1 | 0.000E+00 | -1.974E-02 | -1.744E-03 | -1.087E-03 | 9.968E-04 |
| 2 | 0.000E+00 | -2.244E-02 | -5.975E-03 | 3.502E-03 | -3.105E-03 |
| 4 | -3.575E+00 | 6.445E-03 | -4.223E-03 | 2.984E-03 | -4.059E-03 |
| 5 | -1.000E+02 | 1.100E-02 | -4.654E-02 | 4.713E-02 | -2.993E-02 |
| 6 | -5.390E+00 | -2.270E-02 | 2.420E-02 | -2.264E-02 | 1.900E-02 |
| 7 | 0.000E+00 | 2.748E-02 | -1.962E-02 | -1.224E-02 | 2.468E-02 |
| 8 | 0.000E+00 | -3.052E-02 | 3.029E-02 | -6.422E-02 | 5.856E-02 |
| 9 | -4.441E+00 | -1.908E-02 | 4.390E-02 | -5.626E-02 | 3.969E-02 |
| 10 | 0.000E+00 | -4.604E-02 | 1.365E-02 | 9.298E-04 | -5.675E-03 |
| 11 | 0.000E+00 | -4.768E-02 | -2.181E-02 | 5.994E-02 | -6.733E-02 |

TABLE 24-continued

| Aspheric Surface Data | | | | | |
|---|---|---|---|---|---|
| 12 | 2.400E+01 | −5.571E−03 | −6.458E−04 | −1.890E−02 | 1.964E−02 |
| 13 | 1.725E+00 | 6.809E−02 | −5.814E−02 | 1.001E−02 | 1.220E−02 |
| 14 | 0.000E+00 | 8.691E−02 | −9.818E−02 | 3.905E−02 | −6.549E−03 |
| 15 | 0.000E+00 | 6.944E−02 | −7.433E−02 | 3.212E−02 | −8.519E−03 |
| 16 | 1.012E−01 | −1.343E−01 | 3.606E−02 | −6.175E−03 | 9.890E−04 |
| 17 | −7.134E+00 | −7.312E−02 | 2.464E−02 | −5.459E−03 | 8.381E−04 |

| i | A12 | A14 | A16 | A18 | A20 |
|---|---|---|---|---|---|
| 1 | −3.595E−04 | 8.203E−05 | −1.195E−05 | 1.007E−06 | −3.656E−08 |
| 2 | 2.043E−03 | −7.757E−04 | 1.704E−04 | −2.032E−05 | 1.026E−06 |
| 4 | 2.568E−03 | −8.987E−04 | 1.819E−04 | −2.045E−05 | 1.016E−06 |
| 5 | 1.317E−02 | −3.962E−03 | 7.557E−04 | −8.134E−05 | 3.752E−06 |
| 6 | −9.440E−03 | 2.930E−03 | −5.815E−04 | 6.906E−05 | −3.800E−06 |
| 7 | −1.565E−02 | 5.683E−03 | −1.269E−03 | 1.601E−04 | −8.659E−06 |
| 8 | −2.944E−02 | 9.066E−03 | −1.725E−03 | 1.871E−04 | −8.790E−06 |
| 9 | −1.524E−02 | 2.726E−03 | 8.878E−05 | −1.191E−04 | 1.459E−05 |
| 10 | 4.702E−03 | −2.667E−03 | 1.014E−03 | −2.224E−04 | 2.046E−05 |
| 11 | 4.542E−02 | −1.931E−02 | 5.043E−03 | −7.406E−04 | 4.687E−05 |
| 12 | −1.048E−02 | 3.100E−03 | −4.709E−04 | 2.514E−05 | 6.868E−07 |
| 13 | −9.778E−03 | 3.367E−03 | −6.234E−04 | 6.041E−05 | −2.410E−06 |
| 14 | −7.683E−04 | 5.865E−04 | −1.186E−04 | 1.155E−05 | −4.635E−07 |
| 15 | 1.447E−03 | −1.559E−04 | 1.025E−05 | −3.703E−07 | 5.500E−09 |
| 16 | −1.411E−04 | 1.439E−05 | −9.181E−07 | 3.265E−08 | −4.945E−10 |
| 17 | −8.925E−05 | 6.367E−06 | −2.866E−07 | 7.302E−09 | −7.966E−11 |

The values of the respective conditional expressions are as follows:
R1f/R1r=1.2
f1/f2=−3.4
D12/f=0.08
f2/f3=2.2
f3/f=1.0
R4r/f=0.5
D45/f=0.14
D56/D67=1.5
T7/T8=1.2
D78/f=0.07
f8/f=−0.8
R8f/f=1.4
R8r/f=0.3
TL/f=1.3
TL/Hmax=1.6
f/Dep=1.4
f6/f=1.2
f56/f=1.5

Accordingly, the imaging lens according to the Example 12 satisfies the above-described conditional expressions.

Figure 35:
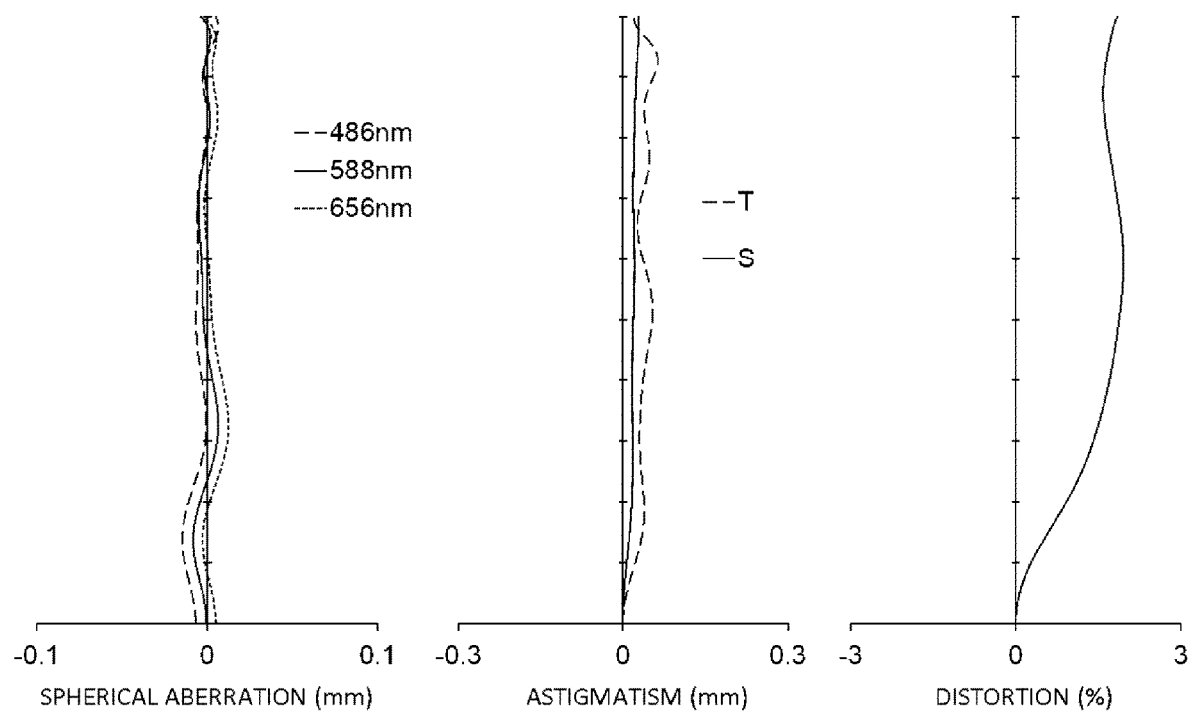
FIG. 35 is an aberration diagram showing spherical aberration, astigmatism, and distortion of the imaging lens of FIG. 34.
Figure 36:
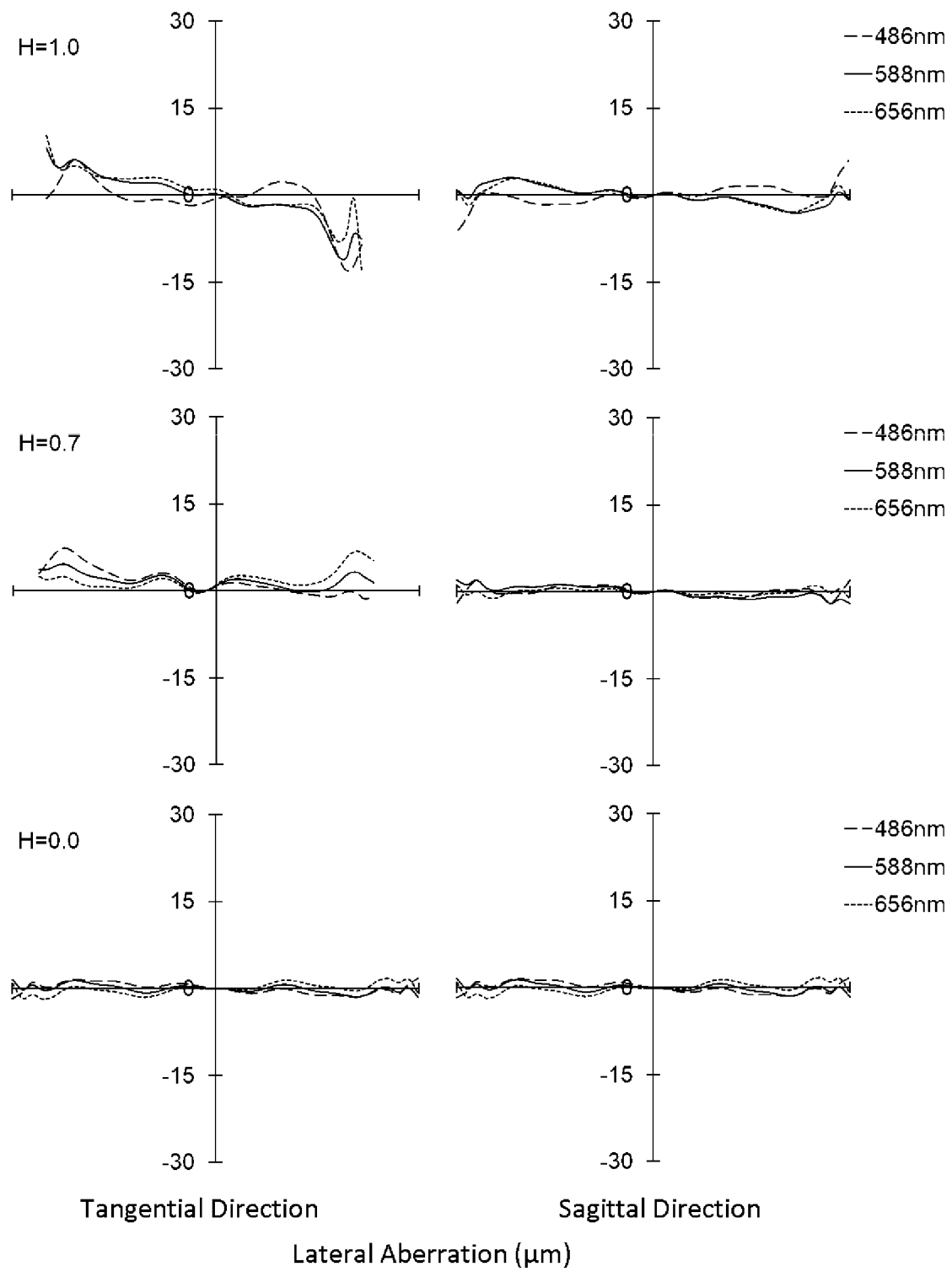
FIG. 36 is an aberration diagram showing a lateral aberration of the imaging lens of FIG. 34.

FIG. 35 shows spherical aberration (mm), astigmatism (mm), and distortion (%), respectively. FIG. 36 shows a lateral aberration corresponding to the image height ratio H. As shown in FIGS. 35 and 36, according to the imaging lens of the Example 12, aberrations can be properly corrected.

As described above, the imaging lens according to the present examples has a very wide field of view (2ω) of 60° or more. More specifically, the imaging lenses of Examples 1 to 12 have fields of view (2ω) of 60.2° to 78.6°. According to the imaging lens of the present embodiments, it is possible to take an image over a wider range than that taken by a conventional imaging lens.

In recent years, with advancement in digital-zoom technology to enlarge any range of an image obtained through an imaging lens by image processing, an image sensor with higher pixel count has been often applied in combination with an imaging lens of higher resolution. In the case of the image sensor with the higher pixel count, a light-receiving area per pixel often decreases, so that an image tends to be dark. The imaging lenses of Examples 1 to 12 have Fnos as small as 1.4 to 2.3. According to the imaging lenses of the present embodiments, it is possible to take a sufficiently bright image responding to the image sensor with the higher pixel count as mentioned above.

Therefore, when the imaging lens of the above-described embodiment is applied in an imaging optical system such as cameras built in mobile devices, namely, smartphones, cellular phones, and mobile information terminals, digital still cameras, security cameras, onboard cameras, and network cameras, it is possible to attain both high performance and downsizing of the cameras.

The present invention is applicable in an imaging lens that is mounted in a relatively small-sized camera, such as cameras built in mobile devices, namely smartphones, cellular phones and mobile information terminals, digital still cameras, security cameras, onboard cameras, and network cameras.

DESCRIPTION OF REFERENCE NUMERALS

X: optical axis
ST: aperture stop
L1: first lens
L2: second lens
L3: third lens
L4: fourth lens
L5: fifth lens
L6: sixth lens
L7: seventh lens
L8: eighth lens
10: filter
IM: image plane

What is claimed is:

1. An imaging lens comprising, in order from an object side to an image side,
a first lens having negative refractive power,
a second lens having positive refractive power,
a third lens having positive refractive power,
a fourth lens,
a fifth lens, a sixth lens,
a seventh lens, and
an eighth lens having negative refractive power,
wherein said eighth lens has an aspheric image-side surface having at least one inflection point, and
wherein the following conditional expression is satisfied:

$$-3.0 < f8/f < -0.3$$

where
f: a focal length of the overall optical system of the imaging lens, and
f8: a focal length of the eighth lens.

2. The imaging lens according to claim 1, wherein the following conditional expression is satisfied:

$$-10.0 < f1/f2 < -0.8$$

where
f1: a focal length of the first lens, and
f2: a focal length of the second lens.

3. The imaging lens according to claim 1, wherein the following conditional expression is satisfied:

$$0.05 < D12/f < 0.20$$

where
f: a focal length of the overall optical system of the imaging lens, and
D12: a distance along the optical axis between the first lens and the second lens.

4. The imaging lens according to claim 1, wherein the following conditional expression is satisfied:

$$1.0 < f2/f3 < 6.5$$

where
f2: a focal length of the second lens, and
f3: a focal length of the third lens.

5. The imaging lens according to claim 1, wherein the following conditional expression is satisfied:

$$0.3 < f3/f < 3.5$$

where
f: a focal length of the overall optical system of the imaging lens, and
f3: a focal length of the third lens.

6. The imaging lens according to claim 1, wherein the following conditional expression is satisfied:

$$0.2 < R4r/f < 1.0$$

where
f: a focal length of the overall optical system of the imaging lens, and
R4r: a curvature radius of an image-side surface of the fourth lens.

7. The imaging lens according to claim 1, wherein the following conditional expression is satisfied:

$$0.08 < D45/f < 0.20$$

where
f: a focal length of the overall optical system of the imaging lens, and
D45: a distance along the optical axis between the fourth lens and the fifth lens.

8. The imaging lens according to claim 1, wherein the following conditional expression is satisfied:

$$0.5 < D56/D67 < 4.0$$

where
D56: a distance along the optical axis between the fifth lens and the sixth lens, and
D67: a distance along the optical axis between the sixth lens and the seventh lens.

9. The imaging lens according to claim 1, wherein the following conditional expression is satisfied:

$$0.2 < R8f/f < 1.8$$

where
f: a focal length of the overall optical system of the imaging lens, and
R8f: a curvature radius of an object-side surface of the eighth lens.

* * * * *